US012352933B2

(12) United States Patent
Matsumura et al.

(10) Patent No.: US 12,352,933 B2
(45) Date of Patent: Jul. 8, 2025

(54) LENS SYSTEM, IMAGING DEVICE, AND IMAGING SYSTEM

(71) Applicant: Panasonic Intellectual Property Management Co., Ltd., Osaka (JP)

(72) Inventors: Yoshio Matsumura, Osaka (JP); Hiroyuki Shobayashi, Hyogo (JP); Takuya Imaoka, Kanagawa (JP); Tomoko Iiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 597 days.

(21) Appl. No.: 17/703,192

(22) Filed: Mar. 24, 2022

(65) Prior Publication Data

US 2022/0214528 A1 Jul. 7, 2022

Related U.S. Application Data

(63) Continuation of application No. PCT/JP2020/023599, filed on Jun. 16, 2020.

(30) Foreign Application Priority Data

Sep. 30, 2019 (JP) ................. 2019-179910

(51) Int. Cl.
*G02B 13/08* (2006.01)
*G02B 9/64* (2006.01)
(Continued)

(52) U.S. Cl.
CPC ............... *G02B 13/08* (2013.01); *G02B 9/64* (2013.01); *G02B 13/0045* (2013.01);
(Continued)

(58) Field of Classification Search
CPC ........ G02B 13/08; G02B 13/14; G02B 13/18; H04N 23/55; H04N 23/80
(Continued)

(56) References Cited

U.S. PATENT DOCUMENTS 6,052,236 A 4/2000 Nakasuji et al.
2004/0169726 A1 9/2004 Moustier et al.
(Continued)

FOREIGN PATENT DOCUMENTS

JP 2006-11093 1/2006
JP 2007-4063 1/2007
(Continued)

OTHER PUBLICATIONS

Akira Yabe, "Representation of Freeform Surfaces Suitable for Optimization", Applied Optics, vol. 51, No. 15, May 20, 2012, pp. 3054-3058.
(Continued)

*Primary Examiner* — Wyatt A Stoffa
*Assistant Examiner* — Grant A Gagnon
(74) *Attorney, Agent, or Firm* — Wenderoth, Lind & Ponack, L.L.P.

(57) ABSTRACT

A lens system includes lens elements and a diaphragm. The lens elements include freeform lenses each having a freeform surface asymmetrical with respect to first and second directions. At least one freeform lens is placed on the image plane side of the diaphragm. The lens system satisfies a following conditional expression (1);

$$0.0075 < \left| \frac{\sum_{k=1}^{N} \{(SAG1_k - SAG2_k) \times \Delta nd_k\}}{Y2 \times \tan\Theta 1} \right| \quad (1)$$

(Continued)

where N: a total number of the freeform surfaces on the object side of the diaphragm, k: a number indicating a freeform surface among the N freeform surfaces, $SAG1_k$, $SAG2_k$: a sag amount at a position where a height of a k-th freeform surface in the first or second direction is 40% of an image height in the first direction, Y2: an image height in the second direction, $\Theta1$: a full angle of view in the first direction, and $\Delta nd_k$: a difference between refractive indexes on the both sides of the k-th freeform surface.

20 Claims, 62 Drawing Sheets

(51) Int. Cl.
    *G02B 13/00*     (2006.01)
    *G02B 13/14*     (2006.01)
    *G02B 13/18*     (2006.01)
    *H04N 5/225*     (2006.01)
    *H04N 23/55*     (2023.01)

(52) U.S. Cl.
    CPC ............. *G02B 13/14* (2013.01); *G02B 13/18* (2013.01); *H04N 23/55* (2023.01)

(58) Field of Classification Search
    USPC .......................................................... 359/668
    See application file for complete search history.

(56) References Cited

U.S. PATENT DOCUMENTS

| | | |
|---|---|---|
| 2006/0291069 A1 | 12/2006 | Yoshida et al. |
| 2007/0133107 A1 | 6/2007 | Ohzawa et al. |
| 2009/0073577 A1 | 3/2009 | Jung et al. |
| 2010/0060992 A1 | 3/2010 | Hirose |
| 2010/0079874 A1 | 4/2010 | Kamei |
| 2010/0302647 A1 | 12/2010 | Hirose |
| 2017/0212334 A1 | 7/2017 | Imaoka |
| 2020/0110245 A1 | 4/2020 | Matsumura |
| 2020/0110249 A1 | 4/2020 | Matsumura |
| 2020/0116982 A1 | 4/2020 | Matsumura |

FOREIGN PATENT DOCUMENTS

| | | |
|---|---|---|
| JP | 2007-163549 | 6/2007 |
| JP | 2008-292800 | 12/2008 |
| JP | 2010-85849 | 4/2010 |
| JP | 2010-276755 | 12/2010 |
| JP | 2013-109268 | 6/2013 |
| JP | 2016-148725 | 8/2016 |
| JP | 2017-134394 | 8/2017 |
| WO | 03/010599 | 2/2003 |
| WO | 2008/062661 | 5/2008 |
| WO | 2013-065391 | 5/2013 |
| WO | 2018/230033 | 12/2018 |
| WO | 2018/230034 | 12/2018 |
| WO | 2018/230035 | 12/2018 |

OTHER PUBLICATIONS

Extended European Search Report issued Nov. 4, 2022 in European Patent Application No. 20872808.9.
International Search Report issued Sep. 24, 2020 in International (PCT) Application No. PCT/JP2020/023599.
International Preliminary Report on Patentability dated Mar. 31, 2022 in International (PCT) Application No. PCT/JP2020/023590.
International Preliminary Report on Patentability dated Mar. 31, 2022 in International (PCT) Application No. PCT/JP2020/023599.
First Office Action issued Sep. 14, 2023 in corresponding Chinese Patent Application No. 202080068087.x, with English language translation.
First Office Action issued Sep. 14, 2023 in corresponding Chinese Patent Application No. 202080067982.x, with English language translaiton.
Office Action issued Sep. 20, 2024 in U.S. Appl. No. 17/705,745.

FIG. 5

| s | SURFACE TYPE | r | d | nd | vd |
|---|---|---|---|---|---|
| | 1ST NUMERICAL EXAMPLE | | | | |
| 1 | XY-polynomial surface | -285.544 | 2.775 | 1.64769 | 33.8 |
| 2 | Aspherical surface | -84.190 | 11.510 | | |
| 3 | Aspherical surface | -27.046 | 1.500 | 1.64769 | 33.8 |
| 4 | XY-polynomial surface | -67.282 | 0.999 | | |
| 5 | Spherical surface | 35.518 | 3.811 | 1.88300 | 40.8 |
| 6 | Spherical surface | -35.518 | 0.200 | | |
| 7 | Spherical surface | 22.847 | 2.731 | 1.88300 | 40.8 |
| 8 | Spherical surface | 148.000 | 0.641 | | |
| 9 | Plane | Diaphragm | 0.200 | | |
| 10 | Spherical surface | 13.529 | 2.440 | 1.84666 | 23.8 |
| 11 | Spherical surface | 7.900 | 4.531 | 1.77250 | 49.6 |
| 12 | Spherical surface | 11.500 | 1.888 | | |
| 13 | Aspherical surface | -14.711 | 1.600 | 1.52779 | 56.5 |
| 14 | XY-polynomial surface | -10.492 | 2.650 | | |
| 15 | XY-polynomial surface | 74.740 | 2.750 | 1.52779 | 56.5 |
| 16 | XY-polynomial surface | 7.600 | 5.430 | | |

FIG. 6

| 1ST NUMERICAL EXAMPLE | |
|---|---|
| F number | 1.40 |
| Vertical half angle of view | 5.1 |
| Horizontal half angle of view | 15 |
| Vertical image height | 2.697 |
| Horizontal image height | 3.599 |

FIG. 7

| s1 | (1ST NUMERICAL EXAMPLE) | | | | |
|---|---|---|---|---|---|
| C1 | 0.00000E+00 | C23 | 0.00000E+00 | C45 | 8.80862E-10 |
| C2 | 0.00000E+00 | C24 | 3.05492E-07 | C46 | 0.00000E+00 |
| C3 | 0.00000E+00 | C25 | 0.00000E+00 | C47 | 0.00000E+00 |
| C4 | -2.70236E-02 | C26 | 2.44960E-07 | C48 | 0.00000E+00 |
| C5 | 0.00000E+00 | C27 | 0.00000E+00 | C49 | 0.00000E+00 |
| C6 | 8.51935E-03 | C28 | 3.11195E-08 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 7.86287E-06 | C33 | 0.00000E+00 | C55 | 0.00000E+00 |
| C12 | 0.00000E+00 | C34 | 0.00000E+00 | C56 | 4.91362E-12 |
| C13 | -4.04123E-05 | C35 | 0.00000E+00 | C57 | 0.00000E+00 |
| C14 | 0.00000E+00 | C36 | 0.00000E+00 | C58 | -1.51128E-11 |
| C15 | -1.93941E-05 | C37 | -5.30581E-10 | C59 | 0.00000E+00 |
| C16 | 0.00000E+00 | C38 | 0.00000E+00 | C60 | -2.44202E-12 |
| C17 | 0.00000E+00 | C39 | 2.71118E-09 | C61 | 0.00000E+00 |
| C18 | 0.00000E+00 | C40 | 0.00000E+00 | C62 | -1.12406E-12 |
| C19 | 0.00000E+00 | C41 | 2.47067E-09 | C63 | 0.00000E+00 |
| C20 | 0.00000E+00 | C42 | 0.00000E+00 | C64 | -1.27543E-13 |
| C21 | 0.00000E+00 | C43 | 2.07032E-09 | C65 | 0.00000E+00 |
| C22 | 1.99248E-07 | C44 | 0.00000E+00 | C66 | -5.24474E-13 |

FIG. 8

| s2 (1ST NUMERICAL EXAMPLE) | |
|---|---|
| K | 0.00000E+00 |
| A4 | -1.32400E-06 |
| A6 | -6.66340E-10 |
| A8 | 9.21469E-10 |
| A10 | 0.00000E+00 |
| A12 | 0.00000E+00 |
| A14 | 0.00000E+00 |
| A16 | 0.00000E+00 |
| A18 | 0.00000E+00 |
| A20 | 0.00000E+00 |

FIG. 9

| s3 (1ST NUMERICAL EXAMPLE) | |
|---|---|
| K | 0.00000E+00 |
| A4 | -8.50319E-05 |
| A6 | 2.48736E-07 |
| A8 | 0.00000E+00 |
| A10 | 0.00000E+00 |
| A12 | 0.00000E+00 |
| A14 | 0.00000E+00 |
| A16 | 0.00000E+00 |
| A18 | 0.00000E+00 |
| A20 | 0.00000E+00 |

FIG. 10

| s4 (1ST NUMERICAL EXAMPLE) | | | | | |
|---|---|---|---|---|---|
| C1 | 0.00000E+00 | C23 | 0.00000E+00 | C45 | -2.11729E-09 |
| C2 | 0.00000E+00 | C24 | 1.80268E-06 | C46 | 0.00000E+00 |
| C3 | 0.00000E+00 | C25 | 0.00000E+00 | C47 | 0.00000E+00 |
| C4 | 8.63515E-03 | C26 | 2.15067E-06 | C48 | 0.00000E+00 |
| C5 | 0.00000E+00 | C27 | 0.00000E+00 | C49 | 0.00000E+00 |
| C6 | 3.65732E-02 | C28 | 8.31078E-07 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -3.38848E-05 | C33 | 0.00000E+00 | C55 | 0.00000E+00 |
| C12 | 0.00000E+00 | C34 | 0.00000E+00 | C56 | 6.20043E-12 |
| C13 | -1.66391E-04 | C35 | 0.00000E+00 | C57 | 0.00000E+00 |
| C14 | 0.00000E+00 | C36 | 0.00000E+00 | C58 | 1.71908E-11 |
| C15 | -1.52656E-04 | C37 | -1.89175E-09 | C59 | 0.00000E+00 |
| C16 | 0.00000E+00 | C38 | 0.00000E+00 | C60 | 3.71261E-11 |
| C17 | 0.00000E+00 | C39 | -7.32480E-09 | C61 | 0.00000E+00 |
| C18 | 0.00000E+00 | C40 | 0.00000E+00 | C62 | 4.95986E-11 |
| C19 | 0.00000E+00 | C41 | -1.33544E-08 | C63 | 0.00000E+00 |
| C20 | 0.00000E+00 | C42 | 0.00000E+00 | C64 | 3.32472E-11 |
| C21 | 0.00000E+00 | C43 | -1.11238E-08 | C65 | 0.00000E+00 |
| C22 | 5.95225E-07 | C44 | 0.00000E+00 | C66 | 1.18099E-12 |

FIG. 11

| s13 (1ST NUMERICAL EXAMPLE) | |
|---|---|
| K | 0.00000E+00 |
| A4 | 1.15367E-03 |
| A6 | -1.15129E-05 |
| A8 | 0.00000E+00 |
| A10 | 0.00000E+00 |
| A12 | 0.00000E+00 |
| A14 | 0.00000E+00 |
| A16 | 0.00000E+00 |
| A18 | 0.00000E+00 |
| A20 | 0.00000E+00 |

FIG. 12

| s14 (1ST NUMERICAL EXAMPLE) | | | | | |
|---|---|---|---|---|---|
| C1 | 0.00000E+00 | C23 | 0.00000E+00 | C45 | -9.98117E-07 |
| C2 | 0.00000E+00 | C24 | 1.61094E-04 | C46 | 0.00000E+00 |
| C3 | 0.00000E+00 | C25 | 0.00000E+00 | C47 | 0.00000E+00 |
| C4 | 7.99051E-02 | C26 | 1.81335E-04 | C48 | 0.00000E+00 |
| C5 | 0.00000E+00 | C27 | 0.00000E+00 | C49 | 0.00000E+00 |
| C6 | 8.02953E-02 | C28 | 6.64153E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.05863E-04 | C33 | 0.00000E+00 | C55 | 0.00000E+00 |
| C12 | 0.00000E+00 | C34 | 0.00000E+00 | C56 | 1.85193E-08 |
| C13 | 9.77646E-04 | C35 | 0.00000E+00 | C57 | 0.00000E+00 |
| C14 | 0.00000E+00 | C36 | 0.00000E+00 | C58 | 1.06374E-07 |
| C15 | 4.13993E-04 | C37 | -1.30144E-06 | C59 | 0.00000E+00 |
| C16 | 0.00000E+00 | C38 | 0.00000E+00 | C60 | 2.47323E-07 |
| C17 | 0.00000E+00 | C39 | -5.16909E-06 | C61 | 0.00000E+00 |
| C18 | 0.00000E+00 | C40 | 0.00000E+00 | C62 | 2.81624E-07 |
| C19 | 0.00000E+00 | C41 | -7.82156E-06 | C63 | 0.00000E+00 |
| C20 | 0.00000E+00 | C42 | 0.00000E+00 | C64 | 1.87074E-07 |
| C21 | 0.00000E+00 | C43 | -6.09936E-06 | C65 | 0.00000E+00 |
| C22 | 5.48178E-05 | C44 | 0.00000E+00 | C66 | 1.57682E-08 |

FIG. 13

| s15 (1ST NUMERICAL EXAMPLE) | | | | | |
|---|---|---|---|---|---|
| C1 | 0.00000E+00 | C23 | 0.00000E+00 | C45 | 6.86965E-07 |
| C2 | 0.00000E+00 | C24 | 3.63782E-05 | C46 | 0.00000E+00 |
| C3 | 0.00000E+00 | C25 | 0.00000E+00 | C47 | 0.00000E+00 |
| C4 | 8.73789E-02 | C26 | 3.01383E-05 | C48 | 0.00000E+00 |
| C5 | 0.00000E+00 | C27 | 0.00000E+00 | C49 | 0.00000E+00 |
| C6 | 7.41016E-02 | C28 | 1.41997E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -9.50233E-04 | C33 | 0.00000E+00 | C55 | 0.00000E+00 |
| C12 | 0.00000E+00 | C34 | 0.00000E+00 | C56 | -6.98663E-09 |
| C13 | -2.22125E-03 | C35 | 0.00000E+00 | C57 | 0.00000E+00 |
| C14 | 0.00000E+00 | C36 | 0.00000E+00 | C58 | -1.44645E-08 |
| C15 | -2.02777E-03 | C37 | -2.18751E-07 | C59 | 0.00000E+00 |
| C16 | 0.00000E+00 | C38 | 0.00000E+00 | C60 | -8.83691E-09 |
| C17 | 0.00000E+00 | C39 | -9.52651E-07 | C61 | 0.00000E+00 |
| C18 | 0.00000E+00 | C40 | 0.00000E+00 | C62 | -7.18479E-08 |
| C19 | 0.00000E+00 | C41 | -5.95431E-07 | C63 | 0.00000E+00 |
| C20 | 0.00000E+00 | C42 | 0.00000E+00 | C64 | -1.43742E-08 |
| C21 | 0.00000E+00 | C43 | 3.48068E-07 | C65 | 0.00000E+00 |
| C22 | 1.45779E-05 | C44 | 0.00000E+00 | C66 | -2.51581E-08 |

FIG. 14

| s16 (1ST NUMERICAL EXAMPLE) | | | | | |
|---|---|---|---|---|---|
| C1 | 0.00000E+00 | C23 | 0.00000E+00 | C45 | 1.12757E-06 |
| C2 | 0.00000E+00 | C24 | -9.29779E-05 | C46 | 0.00000E+00 |
| C3 | 0.00000E+00 | C25 | 0.00000E+00 | C47 | 0.00000E+00 |
| C4 | -2.01697E-02 | C26 | -1.01896E-04 | C48 | 0.00000E+00 |
| C5 | 0.00000E+00 | C27 | 0.00000E+00 | C49 | 0.00000E+00 |
| C6 | 4.38727E-03 | C28 | -1.82042E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -7.68829E-04 | C33 | 0.00000E+00 | C55 | 0.00000E+00 |
| C12 | 0.00000E+00 | C34 | 0.00000E+00 | C56 | -6.87099E-09 |
| C13 | -1.97642E-03 | C35 | 0.00000E+00 | C57 | 0.00000E+00 |
| C14 | 0.00000E+00 | C36 | 0.00000E+00 | C58 | -5.41840E-08 |
| C15 | -2.34358E-03 | C37 | 3.18317E-07 | C59 | 0.00000E+00 |
| C16 | 0.00000E+00 | C38 | 0.00000E+00 | C60 | -7.18638E-08 |
| C17 | 0.00000E+00 | C39 | 2.24911E-06 | C61 | 0.00000E+00 |
| C18 | 0.00000E+00 | C40 | 0.00000E+00 | C62 | -1.93533E-07 |
| C19 | 0.00000E+00 | C41 | 4.13749E-06 | C63 | 0.00000E+00 |
| C20 | 0.00000E+00 | C42 | 0.00000E+00 | C64 | -1.01372E-07 |
| C21 | 0.00000E+00 | C43 | 4.55105E-06 | C65 | 0.00000E+00 |
| C22 | -2.83011E-05 | C44 | 0.00000E+00 | C66 | -1.11525E-08 |

FIG. 16A

|  | 1ST NUMERICAL EXAMPLE | 2ND NUMERICAL EXAMPLE | 3RD NUMERICAL EXAMPLE | 4TH NUMERICAL EXAMPLE | 5TH NUMERICAL EXAMPLE | 6TH NUMERICAL EXAMPLE |
|---|---|---|---|---|---|---|
| CONDITION (1A) | 0.3504 | 0.3743 | 0.7590 | 0.4841 | 0.5259 | 0.5279 |
| CONDITION (1B) | 0.0090 | 0.0107 | 0.0207 | 0.0082 | 0.0121 | 0.0079 |
| CONDITION (2) | 3.6580 | 3.5044 | 3.6873 | 3.9601 | 2.7452 | 2.7537 |
| CONDITION (3) | 0.0140 | 0.0136 | 0.0139 | 0.0063 | 0.0113 | 0.0090 |
| CONDITION (4) | 2.2504 | 2.2488 | 2.2551 | 2.1631 | 3.1356 | 2.7851 |
| CONDITION (5) | 0.2161 | 0.2067 | 0.2176 | 0.1842 | 0.1295 | 0.1300 |
| CONDITION (6) | 1.0 | 1.0 | 1.0 | 0.5 | 1.0 | 1.0 |
| CONDITION (7) | 0.0135 | 0.0131 | 0.0400 | 0.0108 | 0.0031 | 0.0023 |
| IMAGE MAGNIFICATION RATIO M | 2.2046 | 2.2030 | 2.2091 | 2.1190 | 1.9997 | 1.7996 |

FIG. 16B

|  | PATENT DOCUMENT 2 (WIDE END) | | | | | PATENT DOCUMENT 2 (TELEPHOTO END) | | | | |
|---|---|---|---|---|---|---|---|---|---|---|
|  | 1ST NUMERICAL EXAMPLE | 2ND NUMERICAL EXAMPLE | 3RD NUMERICAL EXAMPLE | 4TH NUMERICAL EXAMPLE | 5TH NUMERICAL EXAMPLE | 1ST NUMERICAL EXAMPLE | 2ND NUMERICAL EXAMPLE | 3RD NUMERICAL EXAMPLE | 4TH NUMERICAL EXAMPLE | 5TH NUMERICAL EXAMPLE |
| CONDITION (1A) | 0.8890 | 0.9043 | 0.9330 | 0.8845 | 0.9448 | 0.8860 | 0.9022 | 0.9323 | 0.8819 | 0.9332 |
| CONDITION (1B) | 0.0016 | 0.0011 | 0.0013 | 0.0018 | 0.0005 | 0.0048 | 0.0033 | 0.0041 | 0.0053 | 0.0019 |
| IMAGE MAGNIFICATION RATIO M | 1.2501 | 1.2159 | 1.2242 | 1.3172 | 1.3167 | 1.2902 | 1.2282 | 1.2770 | 1.3421 | 1.2582 |

FIG. 21

| 2ND NUMERICAL EXAMPLE | | | | | |
|---|---|---|---|---|---|
| s | SURFACE TYPE | r | d | nd | vd |
| 1 | XY-polynomial surface | -229.874 | 2.550 | 1.64769 | 33.8 |
| 2 | Aspherical surface | -94.624 | 11.880 | | |
| 3 | Aspherical surface | -30.348 | 1.500 | 1.64769 | 33.8 |
| 4 | XY-polynomial surface | -96.301 | 0.552 | | |
| 5 | Spherical surface | 29.279 | 4.135 | 1.80420 | 46.5 |
| 6 | Spherical surface | -35.061 | 0.200 | | |
| 7 | Spherical surface | 21.571 | 2.730 | 1.80420 | 46.5 |
| 8 | Spherical surface | 141.000 | 0.632 | | |
| 9 | Plane | Diaphragm | 0.200 | | |
| 10 | Spherical surface | 13.448 | 2.440 | 1.84666 | 23.8 |
| 11 | Spherical surface | 7.700 | 4.531 | 1.77250 | 49.6 |
| 12 | Spherical surface | 11.450 | 1.749 | | |
| 13 | Aspherical surface | -13.768 | 1.600 | 1.52779 | 56.5 |
| 14 | XY-polynomial surface | -10.722 | 2.789 | | |
| 15 | XY-polynomial surface | 52.583 | 2.750 | 1.52779 | 56.5 |
| 16 | XY-polynomial surface | 7.570 | 5.400 | | |

FIG. 22

| 2ND NUMERICAL EXAMPLE | |
|---|---|
| F number | 1.46 |
| Vertical half angle of view | 5.1 |
| Horizontal half angle of view | 15 |
| Vertical image height | 2.691 |
| Horizontal image height | 3.593 |

FIG. 23

| s1 (2ND NUMERICAL EXAMPLE) | | | | | |
|---|---|---|---|---|---|
| C1 | 0.00000E+00 | C23 | 0.00000E+00 | C45 | 7.39952E-10 |
| C2 | 0.00000E+00 | C24 | 3.22746E-07 | C46 | 0.00000E+00 |
| C3 | 0.00000E+00 | C25 | 0.00000E+00 | C47 | 0.00000E+00 |
| C4 | -2.84057E-02 | C26 | 2.53404E-07 | C48 | 0.00000E+00 |
| C5 | 0.00000E+00 | C27 | 0.00000E+00 | C49 | 0.00000E+00 |
| C6 | 7.83259E-03 | C28 | 3.34768E-08 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.16096E-05 | C33 | 0.00000E+00 | C55 | 0.00000E+00 |
| C12 | 0.00000E+00 | C34 | 0.00000E+00 | C56 | 1.09919E-12 |
| C13 | -3.43443E-05 | C35 | 0.00000E+00 | C57 | 0.00000E+00 |
| C14 | 0.00000E+00 | C36 | 0.00000E+00 | C58 | -1.93316E-11 |
| C15 | -1.90269E-05 | C37 | -1.24873E-10 | C59 | 0.00000E+00 |
| C16 | 0.00000E+00 | C38 | 0.00000E+00 | C60 | -1.95027E-12 |
| C17 | 0.00000E+00 | C39 | 2.78510E-09 | C61 | 0.00000E+00 |
| C18 | 0.00000E+00 | C40 | 0.00000E+00 | C62 | 2.56273E-12 |
| C19 | 0.00000E+00 | C41 | 2.03713E-09 | C63 | 0.00000E+00 |
| C20 | 0.00000E+00 | C42 | 0.00000E+00 | C64 | 1.78725E-12 |
| C21 | 0.00000E+00 | C43 | 1.57991E-09 | C65 | 0.00000E+00 |
| C22 | 1.93582E-07 | C44 | 0.00000E+00 | C66 | -2.13705E-13 |

FIG. 24

| s2 (2ND NUMERICAL EXAMPLE) | |
|---|---|
| K | 0.00000E+00 |
| A4 | -1.22541E-06 |
| A6 | -6.47362E-09 |
| A8 | 8.54365E-10 |
| A10 | 0.00000E+00 |
| A12 | 0.00000E+00 |
| A14 | 0.00000E+00 |
| A16 | 0.00000E+00 |
| A18 | 0.00000E+00 |
| A20 | 0.00000E+00 |

FIG. 25

| s3 (2ND NUMERICAL EXAMPLE) | |
|---|---|
| K | 0.00000E+00 |
| A4 | −8.88116E−05 |
| A6 | 2.38196E−07 |
| A8 | 0.00000E+00 |
| A10 | 0.00000E+00 |
| A12 | 0.00000E+00 |
| A14 | 0.00000E+00 |
| A16 | 0.00000E+00 |
| A18 | 0.00000E+00 |
| A20 | 0.00000E+00 |

FIG. 26

| s4 (2ND NUMERICAL EXAMPLE) | | | | | |
|---|---|---|---|---|---|
| C1 | 0.00000E+00 | C23 | 0.00000E+00 | C45 | −1.59589E−09 |
| C2 | 0.00000E+00 | C24 | 1.72994E−06 | C46 | 0.00000E+00 |
| C3 | 0.00000E+00 | C25 | 0.00000E+00 | C47 | 0.00000E+00 |
| C4 | 5.69021E−03 | C26 | 2.02794E−06 | C48 | 0.00000E+00 |
| C5 | 0.00000E+00 | C27 | 0.00000E+00 | C49 | 0.00000E+00 |
| C6 | 3.28113E−02 | C28 | 7.59021E−07 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | −2.88026E−05 | C33 | 0.00000E+00 | C55 | 0.00000E+00 |
| C12 | 0.00000E+00 | C34 | 0.00000E+00 | C56 | 4.21477E−12 |
| C13 | −1.50194E−04 | C35 | 0.00000E+00 | C57 | 0.00000E+00 |
| C14 | 0.00000E+00 | C36 | 0.00000E+00 | C58 | 5.68214E−12 |
| C15 | −1.40437E−04 | C37 | −1.15992E−09 | C59 | 0.00000E+00 |
| C16 | 0.00000E+00 | C38 | 0.00000E+00 | C60 | 2.20883E−11 |
| C17 | 0.00000E+00 | C39 | −4.94036E−09 | C61 | 0.00000E+00 |
| C18 | 0.00000E+00 | C40 | 0.00000E+00 | C62 | 4.13736E−11 |
| C19 | 0.00000E+00 | C41 | −1.07148E−08 | C63 | 0.00000E+00 |
| C20 | 0.00000E+00 | C42 | 0.00000E+00 | C64 | 3.12084E−11 |
| C21 | 0.00000E+00 | C43 | −9.69170E−09 | C65 | 0.00000E+00 |
| C22 | 5.80861E−07 | C44 | 0.00000E+00 | C66 | −3.46106E−13 |

FIG. 27

| s13 (2ND NUMERICAL EXAMPLE) | |
|---|---|
| K | 0.00000E+00 |
| A4 | 1.28962E-03 |
| A6 | -1.41078E-05 |
| A8 | 0.00000E+00 |
| A10 | 0.00000E+00 |
| A12 | 0.00000E+00 |
| A14 | 0.00000E+00 |
| A16 | 0.00000E+00 |
| A18 | 0.00000E+00 |
| A20 | 0.00000E+00 |

FIG. 28

| s14 (2ND NUMERICAL EXAMPLE) | | | | | |
|---|---|---|---|---|---|
| C1 | 0.00000E+00 | C23 | 0.00000E+00 | C45 | -7.88600E-07 |
| C2 | 0.00000E+00 | C24 | 1.60813E-04 | C46 | 0.00000E+00 |
| C3 | 0.00000E+00 | C25 | 0.00000E+00 | C47 | 0.00000E+00 |
| C4 | 7.91817E-02 | C26 | 1.74689E-04 | C48 | 0.00000E+00 |
| C5 | 0.00000E+00 | C27 | 0.00000E+00 | C49 | 0.00000E+00 |
| C6 | 7.52541E-02 | C28 | 6.22656E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.55508E-04 | C33 | 0.00000E+00 | C55 | 0.00000E+00 |
| C12 | 0.00000E+00 | C34 | 0.00000E+00 | C56 | 1.78578E-08 |
| C13 | 1.21174E-03 | C35 | 0.00000E+00 | C57 | 0.00000E+00 |
| C14 | 0.00000E+00 | C36 | 0.00000E+00 | C58 | 1.05263E-07 |
| C15 | 6.68465E-04 | C37 | -1.36589E-06 | C59 | 0.00000E+00 |
| C16 | 0.00000E+00 | C38 | 0.00000E+00 | C60 | 2.26188E-07 |
| C17 | 0.00000E+00 | C39 | -5.35412E-06 | C61 | 0.00000E+00 |
| C18 | 0.00000E+00 | C40 | 0.00000E+00 | C62 | 2.49294E-07 |
| C19 | 0.00000E+00 | C41 | -7.56778E-06 | C63 | 0.00000E+00 |
| C20 | 0.00000E+00 | C42 | 0.00000E+00 | C64 | 1.74592E-07 |
| C21 | 0.00000E+00 | C43 | -5.76610E-06 | C65 | 0.00000E+00 |
| C22 | 5.61288E-05 | C44 | 0.00000E+00 | C66 | 7.50080E-09 |

FIG. 29

| s15 (2ND NUMERICAL EXAMPLE) | | | | | |
|---|---|---|---|---|---|
| C1 | 0.00000E+00 | C23 | 0.00000E+00 | C45 | 6.72066E-07 |
| C2 | 0.00000E+00 | C24 | 3.77392E-05 | C46 | 0.00000E+00 |
| C3 | 0.00000E+00 | C25 | 0.00000E+00 | C47 | 0.00000E+00 |
| C4 | 8.49163E-02 | C26 | 2.96357E-05 | C48 | 0.00000E+00 |
| C5 | 0.00000E+00 | C27 | 0.00000E+00 | C49 | 0.00000E+00 |
| C6 | 7.15757E-02 | C28 | 1.93650E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -9.69824E-04 | C33 | 0.00000E+00 | C55 | 0.00000E+00 |
| C12 | 0.00000E+00 | C34 | 0.00000E+00 | C56 | -4.22309E-09 |
| C13 | -2.26246E-03 | C35 | 0.00000E+00 | C57 | 0.00000E+00 |
| C14 | 0.00000E+00 | C36 | 0.00000E+00 | C58 | -2.03686E-09 |
| C15 | -1.95890E-03 | C37 | -3.35534E-07 | C59 | 0.00000E+00 |
| C16 | 0.00000E+00 | C38 | 0.00000E+00 | C60 | -8.34157E-09 |
| C17 | 0.00000E+00 | C39 | -1.41022E-06 | C61 | 0.00000E+00 |
| C18 | 0.00000E+00 | C40 | 0.00000E+00 | C62 | -8.50775E-08 |
| C19 | 0.00000E+00 | C41 | -2.95075E-07 | C63 | 0.00000E+00 |
| C20 | 0.00000E+00 | C42 | 0.00000E+00 | C64 | -1.81116E-08 |
| C21 | 0.00000E+00 | C43 | 6.28520E-07 | C65 | 0.00000E+00 |
| C22 | 1.71977E-05 | C44 | 0.00000E+00 | C66 | -3.96856E-08 |

FIG. 30

| s16 (2ND NUMERICAL EXAMPLE) | | | | | |
|---|---|---|---|---|---|
| C1 | 0.00000E+00 | C23 | 0.00000E+00 | C45 | -3.37374E-07 |
| C2 | 0.00000E+00 | C24 | -9.09068E-05 | C46 | 0.00000E+00 |
| C3 | 0.00000E+00 | C25 | 0.00000E+00 | C47 | 0.00000E+00 |
| C4 | -2.21386E-02 | C26 | -9.58988E-05 | C48 | 0.00000E+00 |
| C5 | 0.00000E+00 | C27 | 0.00000E+00 | C49 | 0.00000E+00 |
| C6 | 8.78774E-03 | C28 | 5.59219E-07 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -7.18865E-04 | C33 | 0.00000E+00 | C55 | 0.00000E+00 |
| C12 | 0.00000E+00 | C34 | 0.00000E+00 | C56 | -4.89300E-09 |
| C13 | -2.09329E-03 | C35 | 0.00000E+00 | C57 | 0.00000E+00 |
| C14 | 0.00000E+00 | C36 | 0.00000E+00 | C58 | -4.14618E-08 |
| C15 | -2.42385E-03 | C37 | 1.95301E-07 | C59 | 0.00000E+00 |
| C16 | 0.00000E+00 | C38 | 0.00000E+00 | C60 | -7.89016E-08 |
| C17 | 0.00000E+00 | C39 | 1.79420E-06 | C61 | 0.00000E+00 |
| C18 | 0.00000E+00 | C40 | 0.00000E+00 | C62 | -2.16779E-07 |
| C19 | 0.00000E+00 | C41 | 4.53759E-06 | C63 | 0.00000E+00 |
| C20 | 0.00000E+00 | C42 | 0.00000E+00 | C64 | -9.36216E-08 |
| C21 | 0.00000E+00 | C43 | 4.64670E-06 | C65 | 0.00000E+00 |
| C22 | -2.43608E-05 | C44 | 0.00000E+00 | C66 | 1.54572E-08 |

FIG. 35

| 3RD NUMERICAL EXAMPLE | | | | | |
|---|---|---|---|---|---|
| s | SURFACE TYPE | r | d | nd | vd |
| 1 | XY-polynomial surface | 99.457 | 2.600 | 1.64769 | 33.8 |
| 2 | XY-polynomial surface | -108.867 | 4.114 | | |
| 3 | Spherical surface | -54.200 | 1.500 | 1.64769 | 33.8 |
| 4 | Spherical surface | 41.680 | 5.749 | 1.90043 | 37.4 |
| 5 | Aspherical surface | -19.820 | 0.200 | | |
| 6 | Spherical surface | 14.972 | 8.209 | 1.91082 | 35.3 |
| 7 | Spherical surface | -18.923 | 0.800 | 1.92286 | 20.9 |
| 8 | Spherical surface | 379.685 | 0.277 | | |
| 9 | Plane | Diaphragm | 0.200 | | |
| 10 | Aspherical surface | 32.837 | 2.644 | 1.92286 | 20.9 |
| 11 | Spherical surface | 10.243 | 3.430 | | |
| 12 | XY-polynomial surface | 13.315 | 1.350 | 1.61153 | 23.9 |
| 13 | XY-polynomial surface | 398.769 | 3.977 | | |
| 14 | XY-polynomial surface | -72.914 | 5.350 | 1.61153 | 23.9 |
| 15 | XY-polynomial surface | 8.015 | 5.430 | | |

FIG. 36

| 3RD NUMERICAL EXAMPLE | |
|---|---|
| F number | 1.45 |
| Vertical half angle of view | 5.1 |
| Horizontal half angle of view | 15 |
| Vertical image height | 2.704 |
| Horizontal image height | 3.600 |

FIG. 37

| s1 (3RD NUMERICAL EXAMPLE) | | | | | |
|---|---|---|---|---|---|
| C1 | 0.00000E+00 | C23 | 0.00000E+00 | C45 | -1.28856E-09 |
| C2 | 0.00000E+00 | C24 | 4.96105E-06 | C46 | 0.00000E+00 |
| C3 | 0.00000E+00 | C25 | 0.00000E+00 | C47 | 0.00000E+00 |
| C4 | -2.70852E-02 | C26 | 4.41029E-06 | C48 | 0.00000E+00 |
| C5 | 0.00000E+00 | C27 | 0.00000E+00 | C49 | 0.00000E+00 |
| C6 | 8.65279E-03 | C28 | 6.33960E-07 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 9.41436E-05 | C33 | 0.00000E+00 | C55 | 0.00000E+00 |
| C12 | 0.00000E+00 | C34 | 0.00000E+00 | C56 | -5.27013E-11 |
| C13 | -3.05518E-04 | C35 | 0.00000E+00 | C57 | 0.00000E+00 |
| C14 | 0.00000E+00 | C36 | 0.00000E+00 | C58 | 1.05201E-10 |
| C15 | -1.13679E-04 | C37 | 1.22423E-08 | C59 | 0.00000E+00 |
| C16 | 0.00000E+00 | C38 | 0.00000E+00 | C60 | 3.13310E-10 |
| C17 | 0.00000E+00 | C39 | -3.71203E-08 | C61 | 0.00000E+00 |
| C18 | 0.00000E+00 | C40 | 0.00000E+00 | C62 | 1.98268E-10 |
| C19 | 0.00000E+00 | C41 | -6.05285E-08 | C63 | 0.00000E+00 |
| C20 | 0.00000E+00 | C42 | 0.00000E+00 | C64 | 5.05323E-11 |
| C21 | 0.00000E+00 | C43 | -2.11207E-08 | C65 | 0.00000E+00 |
| C22 | -1.33178E-06 | C44 | 0.00000E+00 | C66 | -3.76620E-13 |

FIG. 38

| s2 (3RD NUMERICAL EXAMPLE) | | | | | |
|---|---|---|---|---|---|
| C1 | 0.00000E+00 | C23 | 0.00000E+00 | C45 | -2.88337E-10 |
| C2 | 0.00000E+00 | C24 | 4.62064E-06 | C46 | 0.00000E+00 |
| C3 | 0.00000E+00 | C25 | 0.00000E+00 | C47 | 0.00000E+00 |
| C4 | 2.54746E-02 | C26 | 4.91009E-06 | C48 | 0.00000E+00 |
| C5 | 0.00000E+00 | C27 | 0.00000E+00 | C49 | 0.00000E+00 |
| C6 | 4.34932E-02 | C28 | 6.78339E-07 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.52545E-04 | C33 | 0.00000E+00 | C55 | 0.00000E+00 |
| C12 | 0.00000E+00 | C34 | 0.00000E+00 | C56 | -6.43044E-11 |
| C13 | -2.01407E-04 | C35 | 0.00000E+00 | C57 | 0.00000E+00 |
| C14 | 0.00000E+00 | C36 | 0.00000E+00 | C58 | 9.70049E-12 |
| C15 | -6.32890E-05 | C37 | 1.44105E-08 | C59 | 0.00000E+00 |
| C16 | 0.00000E+00 | C38 | 0.00000E+00 | C60 | 2.53327E-10 |
| C17 | 0.00000E+00 | C39 | -2.24409E-08 | C61 | 0.00000E+00 |
| C18 | 0.00000E+00 | C40 | 0.00000E+00 | C62 | 1.94112E-10 |
| C19 | 0.00000E+00 | C41 | -5.72266E-08 | C63 | 0.00000E+00 |
| C20 | 0.00000E+00 | C42 | 0.00000E+00 | C64 | 4.79887E-11 |
| C21 | 0.00000E+00 | C43 | -2.17451E-08 | C65 | 0.00000E+00 |
| C22 | -1.39576E-06 | C44 | 0.00000E+00 | C66 | -7.27911E-12 |

FIG. 39

| s5 (3RD NUMERICAL EXAMPLE) | |
|---|---|
| K | 0.00000E+00 |
| A4 | 1.67168E-05 |
| A6 | 1.22487E-08 |
| A8 | -2.28858E-10 |
| A10 | 0.00000E+00 |
| A12 | 0.00000E+00 |
| A14 | 0.00000E+00 |
| A16 | 0.00000E+00 |
| A18 | 0.00000E+00 |
| A20 | 0.00000E+00 |

FIG. 40

| s10 (3RD NUMERICAL EXAMPLE) | |
|---|---|
| K | 0.00000E+00 |
| A4 | 7.83895E-05 |
| A6 | 2.33136E-07 |
| A8 | 0.00000E+00 |
| A10 | 0.00000E+00 |
| A12 | 0.00000E+00 |
| A14 | 0.00000E+00 |
| A16 | 0.00000E+00 |
| A18 | 0.00000E+00 |
| A20 | 0.00000E+00 |

FIG. 41

| s12 (3RD NUMERICAL EXAMPLE) | | | | | |
|---|---|---|---|---|---|
| C1 | 0.00000E+00 | C23 | 0.00000E+00 | C45 | 8.70338E-08 |
| C2 | 0.00000E+00 | C24 | -4.56334E-05 | C46 | 0.00000E+00 |
| C3 | 0.00000E+00 | C25 | 0.00000E+00 | C47 | 0.00000E+00 |
| C4 | -1.05061E-01 | C26 | -1.44850E-04 | C48 | 0.00000E+00 |
| C5 | 0.00000E+00 | C27 | 0.00000E+00 | C49 | 0.00000E+00 |
| C6 | -7.38830E-02 | C28 | -5.74353E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 3.00589E-04 | C33 | 0.00000E+00 | C55 | 0.00000E+00 |
| C12 | 0.00000E+00 | C34 | 0.00000E+00 | C56 | -3.72373E-09 |
| C13 | 2.48673E-03 | C35 | 0.00000E+00 | C57 | 0.00000E+00 |
| C14 | 0.00000E+00 | C36 | 0.00000E+00 | C58 | 1.27244E-08 |
| C15 | 1.62590E-03 | C37 | 3.09569E-07 | C59 | 0.00000E+00 |
| C16 | 0.00000E+00 | C38 | 0.00000E+00 | C60 | 4.97122E-08 |
| C17 | 0.00000E+00 | C39 | -5.31973E-07 | C61 | 0.00000E+00 |
| C18 | 0.00000E+00 | C40 | 0.00000E+00 | C62 | -7.03454E-09 |
| C19 | 0.00000E+00 | C41 | 3.80495E-07 | C63 | 0.00000E+00 |
| C20 | 0.00000E+00 | C42 | 0.00000E+00 | C64 | -4.25065E-08 |
| C21 | 0.00000E+00 | C43 | 3.25257E-06 | C65 | 0.00000E+00 |
| C22 | -6.63434E-06 | C44 | 0.00000E+00 | C66 | 1.17726E-08 |

FIG. 42

| s13 (3RD NUMERICAL EXAMPLE) | | | | | |
|---|---|---|---|---|---|
| C1 | 0.00000E+00 | C23 | 0.00000E+00 | C45 | −4.35742E−06 |
| C2 | 0.00000E+00 | C24 | 8.39214E−05 | C46 | 0.00000E+00 |
| C3 | 0.00000E+00 | C25 | 0.00000E+00 | C47 | 0.00000E+00 |
| C4 | −3.06760E−02 | C26 | 5.22587E−05 | C48 | 0.00000E+00 |
| C5 | 0.00000E+00 | C27 | 0.00000E+00 | C49 | 0.00000E+00 |
| C6 | 7.31750E−02 | C28 | 5.90941E−05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | −2.34525E−04 | C33 | 0.00000E+00 | C55 | 0.00000E+00 |
| C12 | 0.00000E+00 | C34 | 0.00000E+00 | C56 | 4.12075E−09 |
| C13 | 4.02660E−04 | C35 | 0.00000E+00 | C57 | 0.00000E+00 |
| C14 | 0.00000E+00 | C36 | 0.00000E+00 | C58 | 5.37985E−08 |
| C15 | 5.56650E−04 | C37 | −2.13553E−07 | C59 | 0.00000E+00 |
| C16 | 0.00000E+00 | C38 | 0.00000E+00 | C60 | 1.98836E−07 |
| C17 | 0.00000E+00 | C39 | −3.30346E−06 | C61 | 0.00000E+00 |
| C18 | 0.00000E+00 | C40 | 0.00000E+00 | C62 | 2.09250E−07 |
| C19 | 0.00000E+00 | C41 | −7.13135E−06 | C63 | 0.00000E+00 |
| C20 | 0.00000E+00 | C42 | 0.00000E+00 | C64 | 1.57680E−07 |
| C21 | 0.00000E+00 | C43 | −5.01507E−06 | C65 | 0.00000E+00 |
| C22 | 1.97411E−05 | C44 | 0.00000E+00 | C66 | 9.10570E−08 |

FIG. 43

| s14 (3RD NUMERICAL EXAMPLE) | | | | | |
|---|---|---|---|---|---|
| C1 | 0.00000E+00 | C23 | 0.00000E+00 | C45 | 2.61154E-07 |
| C2 | 0.00000E+00 | C24 | 4.72876E-05 | C46 | 0.00000E+00 |
| C3 | 0.00000E+00 | C25 | 0.00000E+00 | C47 | 0.00000E+00 |
| C4 | 8.86319E-02 | C26 | 4.89041E-05 | C48 | 0.00000E+00 |
| C5 | 0.00000E+00 | C27 | 0.00000E+00 | C49 | 0.00000E+00 |
| C6 | 9.84033E-02 | C28 | 1.73688E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -3.62524E-04 | C33 | 0.00000E+00 | C55 | 0.00000E+00 |
| C12 | 0.00000E+00 | C34 | 0.00000E+00 | C56 | 1.28879E-09 |
| C13 | -1.02494E-03 | C35 | 0.00000E+00 | C57 | 0.00000E+00 |
| C14 | 0.00000E+00 | C36 | 0.00000E+00 | C58 | 1.47068E-08 |
| C15 | -5.00578E-04 | C37 | -1.63876E-07 | C59 | 0.00000E+00 |
| C16 | 0.00000E+00 | C38 | 0.00000E+00 | C60 | 3.26366E-08 |
| C17 | 0.00000E+00 | C39 | -1.00916E-06 | C61 | 0.00000E+00 |
| C18 | 0.00000E+00 | C40 | 0.00000E+00 | C62 | 3.08884E-08 |
| C19 | 0.00000E+00 | C41 | -1.58789E-06 | C63 | 0.00000E+00 |
| C20 | 0.00000E+00 | C42 | 0.00000E+00 | C64 | 2.64145E-08 |
| C21 | 0.00000E+00 | C43 | -1.32773E-06 | C65 | 0.00000E+00 |
| C22 | 1.08960E-05 | C44 | 0.00000E+00 | C66 | -2.05529E-08 |

FIG. 44

| s15 (3RD NUMERICAL EXAMPLE) | | | | | |
|---|---|---|---|---|---|
| C1 | 0.00000E+00 | C23 | 0.00000E+00 | C45 | 5.36918E-06 |
| C2 | 0.00000E+00 | C24 | -5.23770E-06 | C46 | 0.00000E+00 |
| C3 | 0.00000E+00 | C25 | 0.00000E+00 | C47 | 0.00000E+00 |
| C4 | -3.82824E-02 | C26 | 5.23765E-06 | C48 | 0.00000E+00 |
| C5 | 0.00000E+00 | C27 | 0.00000E+00 | C49 | 0.00000E+00 |
| C6 | -6.77901E-03 | C28 | -2.48901E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -5.05055E-04 | C33 | 0.00000E+00 | C55 | 0.00000E+00 |
| C12 | 0.00000E+00 | C34 | 0.00000E+00 | C56 | -5.33136E-10 |
| C13 | -2.32733E-04 | C35 | 0.00000E+00 | C57 | 0.00000E+00 |
| C14 | 0.00000E+00 | C36 | 0.00000E+00 | C58 | 1.20898E-08 |
| C15 | -2.79498E-04 | C37 | 6.37939E-08 | C59 | 0.00000E+00 |
| C16 | 0.00000E+00 | C38 | 0.00000E+00 | C60 | 5.44551E-08 |
| C17 | 0.00000E+00 | C39 | -3.80964E-07 | C61 | 0.00000E+00 |
| C18 | 0.00000E+00 | C40 | 0.00000E+00 | C62 | 5.09410E-08 |
| C19 | 0.00000E+00 | C41 | -1.18776E-06 | C63 | 0.00000E+00 |
| C20 | 0.00000E+00 | C42 | 0.00000E+00 | C64 | 5.80536E-08 |
| C21 | 0.00000E+00 | C43 | -9.21785E-07 | C65 | 0.00000E+00 |
| C22 | -6.16478E-06 | C44 | 0.00000E+00 | C66 | -3.01115E-07 |

FIG. 49

| 4TH NUMERICAL EXAMPLE | | | | | |
|---|---|---|---|---|---|
| s | SURFACE TYPE | r | d | nd | vd |
| 1 | XY-polynomial surface | -21.142 | 3.200 | 1.63550 | 23.9 |
| 2 | XY-polynomial surface | 18.912 | 6.331 | | |
| 3 | XY-polynomial surface | 114.729 | 9.000 | 1.63550 | 23.9 |
| 4 | XY-polynomial surface | 52.233 | 6.161 | | |
| 5 | Spherical surface | -20.595 | 1.700 | 1.95375 | 32.3 |
| 6 | Spherical surface | -10.000 | 1.000 | 1.94595 | 18.0 |
| 7 | Spherical surface | 18.050 | 2.000 | | |
| 8 | Plane | Diaphragm | 3.000 | | |
| 9 | XY-polynomial surface | -5.974 | 4.000 | 1.63550 | 23.9 |
| 10 | XY-polynomial surface | -8.230 | 3.108 | | |
| 11 | Spherical surface | 11.349 | 5.000 | 1.95375 | 32.3 |
| 12 | Spherical surface | -28.254 | 1.000 | | |
| 13 | XY-polynomial surface | 7.376 | 2.500 | 1.63550 | 23.9 |
| 14 | XY-polynomial surface | -20.000 | 7.720 | | |

FIG. 50

| 4TH NUMERICAL EXAMPLE | |
|---|---|
| F number | 1.43 |
| Vertical half angle of view | 5.1 |
| Horizontal half angle of view | 15 |
| Vertical image height | 2.592 |
| Horizontal image height | 3.597 |

FIG. 51

| s1 (4TH NUMERICAL EXAMPLE) | | | | | |
|---|---|---|---|---|---|
| C1 | 0.00000E+00 | C23 | 0.00000E+00 | C45 | −4.95684E−10 |
| C2 | 0.00000E+00 | C24 | 3.03971E−07 | C46 | 0.00000E+00 |
| C3 | 0.00000E+00 | C25 | 0.00000E+00 | C47 | 0.00000E+00 |
| C4 | 1.63008E−02 | C26 | 4.78438E−07 | C48 | 0.00000E+00 |
| C5 | 0.00000E+00 | C27 | 0.00000E+00 | C49 | 0.00000E+00 |
| C6 | 3.17020E−02 | C28 | 2.01138E−09 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 3.74524E−05 | C33 | 0.00000E+00 | C55 | 0.00000E+00 |
| C12 | 0.00000E+00 | C34 | 0.00000E+00 | C56 | −4.80176E−12 |
| C13 | 5.98089E−05 | C35 | 0.00000E+00 | C57 | 0.00000E+00 |
| C14 | 0.00000E+00 | C36 | 0.00000E+00 | C58 | 1.51400E−11 |
| C15 | 8.67728E−06 | C37 | 1.06371E−09 | C59 | 0.00000E+00 |
| C16 | 0.00000E+00 | C38 | 0.00000E+00 | C60 | 1.59517E−11 |
| C17 | 0.00000E+00 | C39 | −3.35765E−09 | C61 | 0.00000E+00 |
| C18 | 0.00000E+00 | C40 | 0.00000E+00 | C62 | 3.95623E−12 |
| C19 | 0.00000E+00 | C41 | −3.66719E−09 | C63 | 0.00000E+00 |
| C20 | 0.00000E+00 | C42 | 0.00000E+00 | C64 | 3.98564E−12 |
| C21 | 0.00000E+00 | C43 | 2.00200E−10 | C65 | 0.00000E+00 |
| C22 | −2.44059E−07 | C44 | 0.00000E+00 | C66 | 1.25407E−13 |

FIG. 52

| s2 (4TH NUMERICAL EXAMPLE) | | | | | |
|---|---|---|---|---|---|
| C1 | 0.00000E+00 | C23 | 0.00000E+00 | C45 | −6.77752E−10 |
| C2 | 0.00000E+00 | C24 | 1.29796E−06 | C46 | 0.00000E+00 |
| C3 | 0.00000E+00 | C25 | 0.00000E+00 | C47 | 0.00000E+00 |
| C4 | −1.18842E−02 | C26 | 8.34343E−07 | C48 | 0.00000E+00 |
| C5 | 0.00000E+00 | C27 | 0.00000E+00 | C49 | 0.00000E+00 |
| C6 | −2.68552E−02 | C28 | −3.49312E−08 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | −8.55557E−05 | C33 | 0.00000E+00 | C55 | 0.00000E+00 |
| C12 | 0.00000E+00 | C34 | 0.00000E+00 | C56 | 5.89647E−12 |
| C13 | −7.73330E−05 | C35 | 0.00000E+00 | C57 | 0.00000E+00 |
| C14 | 0.00000E+00 | C36 | 0.00000E+00 | C58 | 4.90987E−11 |
| C15 | −1.12266E−05 | C37 | −2.40787E−09 | C59 | 0.00000E+00 |
| C16 | 0.00000E+00 | C38 | 0.00000E+00 | C60 | 3.80422E−11 |
| C17 | 0.00000E+00 | C39 | −1.18406E−08 | C61 | 0.00000E+00 |
| C18 | 0.00000E+00 | C40 | 0.00000E+00 | C62 | 1.72171E−11 |
| C19 | 0.00000E+00 | C41 | −8.56868E−09 | C63 | 0.00000E+00 |
| C20 | 0.00000E+00 | C42 | 0.00000E+00 | C64 | 2.78654E−12 |
| C21 | 0.00000E+00 | C43 | −1.29462E−09 | C65 | 0.00000E+00 |
| C22 | 4.15672E−07 | C44 | 0.00000E+00 | C66 | 5.83990E−13 |

FIG. 53

| s3 (4TH NUMERICAL EXAMPLE) | | | | | |
|---|---|---|---|---|---|
| C1 | 0.00000E+00 | C23 | 0.00000E+00 | C45 | -6.44824E-12 |
| C2 | 0.00000E+00 | C24 | 6.95369E-07 | C46 | 0.00000E+00 |
| C3 | 0.00000E+00 | C25 | 0.00000E+00 | C47 | 0.00000E+00 |
| C4 | 3.94675E-02 | C26 | 6.57068E-07 | C48 | 0.00000E+00 |
| C5 | 0.00000E+00 | C27 | 0.00000E+00 | C49 | 0.00000E+00 |
| C6 | 2.03488E-02 | C28 | 8.44461E-08 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -6.67757E-05 | C33 | 0.00000E+00 | C55 | 0.00000E+00 |
| C12 | 0.00000E+00 | C34 | 0.00000E+00 | C56 | 6.90587E-12 |
| C13 | -5.50360E-05 | C35 | 0.00000E+00 | C57 | 0.00000E+00 |
| C14 | 0.00000E+00 | C36 | 0.00000E+00 | C58 | 1.21477E-11 |
| C15 | 2.63852E-05 | C37 | -2.27968E-09 | C59 | 0.00000E+00 |
| C16 | 0.00000E+00 | C38 | 0.00000E+00 | C60 | 2.52635E-11 |
| C17 | 0.00000E+00 | C39 | -4.27845E-09 | C61 | 0.00000E+00 |
| C18 | 0.00000E+00 | C40 | 0.00000E+00 | C62 | 1.01018E-11 |
| C19 | 0.00000E+00 | C41 | -5.79886E-10 | C63 | 0.00000E+00 |
| C20 | 0.00000E+00 | C42 | 0.00000E+00 | C64 | 1.92119E-12 |
| C21 | 0.00000E+00 | C43 | -6.79501E-10 | C65 | 0.00000E+00 |
| C22 | 2.43294E-07 | C44 | 0.00000E+00 | C66 | 1.41794E-12 |

FIG. 54

| s4 (4TH NUMERICAL EXAMPLE) | | | | | |
|---|---|---|---|---|---|
| C1 | 0.00000E+00 | C23 | 0.00000E+00 | C45 | −6.39318E−10 |
| C2 | 0.00000E+00 | C24 | 7.53603E−07 | C46 | 0.00000E+00 |
| C3 | 0.00000E+00 | C25 | 0.00000E+00 | C47 | 0.00000E+00 |
| C4 | −1.68316E−02 | C26 | 9.63593E−07 | C48 | 0.00000E+00 |
| C5 | 0.00000E+00 | C27 | 0.00000E+00 | C49 | 0.00000E+00 |
| C6 | −1.34160E−02 | C28 | 2.40338E−07 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | −4.92041E−05 | C33 | 0.00000E+00 | C55 | 0.00000E+00 |
| C12 | 0.00000E+00 | C34 | 0.00000E+00 | C56 | −1.57943E−14 |
| C13 | −2.17962E−05 | C35 | 0.00000E+00 | C57 | 0.00000E+00 |
| C14 | 0.00000E+00 | C36 | 0.00000E+00 | C58 | 1.89660E−11 |
| C15 | −1.69871E−05 | C37 | 1.22207E−10 | C59 | 0.00000E+00 |
| C16 | 0.00000E+00 | C38 | 0.00000E+00 | C60 | 3.16309E−11 |
| C17 | 0.00000E+00 | C39 | −6.68140E−09 | C61 | 0.00000E+00 |
| C18 | 0.00000E+00 | C40 | 0.00000E+00 | C62 | 3.32211E−12 |
| C19 | 0.00000E+00 | C41 | −3.61555E−09 | C63 | 0.00000E+00 |
| C20 | 0.00000E+00 | C42 | 0.00000E+00 | C64 | 6.00170E−12 |
| C21 | 0.00000E+00 | C43 | −6.23750E−09 | C65 | 0.00000E+00 |
| C22 | 5.25833E−08 | C44 | 0.00000E+00 | C66 | −3.38668E−13 |

FIG. 55

| s9 (4TH NUMERICAL EXAMPLE) | | | | | |
|---|---|---|---|---|---|
| C1 | 0.00000E+00 | C23 | 0.00000E+00 | C45 | −4.04391E−07 |
| C2 | 0.00000E+00 | C24 | 2.32765E−05 | C46 | 0.00000E+00 |
| C3 | 0.00000E+00 | C25 | 0.00000E+00 | C47 | 0.00000E+00 |
| C4 | 3.89887E−02 | C26 | 2.25769E−05 | C48 | 0.00000E+00 |
| C5 | 0.00000E+00 | C27 | 0.00000E+00 | C49 | 0.00000E+00 |
| C6 | 8.33583E−03 | C28 | 1.10158E−05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 6.96056E−04 | C33 | 0.00000E+00 | C55 | 0.00000E+00 |
| C12 | 0.00000E+00 | C34 | 0.00000E+00 | C56 | 5.77950E−09 |
| C13 | 1.65261E−03 | C35 | 0.00000E+00 | C57 | 0.00000E+00 |
| C14 | 0.00000E+00 | C36 | 0.00000E+00 | C58 | 3.25888E−08 |
| C15 | 1.03659E−03 | C37 | −5.99000E−08 | C59 | 0.00000E+00 |
| C16 | 0.00000E+00 | C38 | 0.00000E+00 | C60 | 6.71103E−08 |
| C17 | 0.00000E+00 | C39 | −5.37137E−07 | C61 | 0.00000E+00 |
| C18 | 0.00000E+00 | C40 | 0.00000E+00 | C62 | 7.82123E−08 |
| C19 | 0.00000E+00 | C41 | −9.55671E−07 | C63 | 0.00000E+00 |
| C20 | 0.00000E+00 | C42 | 0.00000E+00 | C64 | 5.43533E−08 |
| C21 | 0.00000E+00 | C43 | −1.05557E−06 | C65 | 0.00000E+00 |
| C22 | 7.63248E−06 | C44 | 0.00000E+00 | C66 | 1.39350E−08 |

FIG. 56

| s10 (4TH NUMERICAL EXAMPLE) | | | | | |
|---|---|---|---|---|---|
| C1 | 0.00000E+00 | C23 | 0.00000E+00 | C45 | -1.17732E-07 |
| C2 | 0.00000E+00 | C24 | -9.61632E-08 | C46 | 0.00000E+00 |
| C3 | 0.00000E+00 | C25 | 0.00000E+00 | C47 | 0.00000E+00 |
| C4 | 2.38944E-03 | C26 | 1.92263E-06 | C48 | 0.00000E+00 |
| C5 | 0.00000E+00 | C27 | 0.00000E+00 | C49 | 0.00000E+00 |
| C6 | -2.98024E-03 | C28 | 2.61217E-06 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.32542E-04 | C33 | 0.00000E+00 | C55 | 0.00000E+00 |
| C12 | 0.00000E+00 | C34 | 0.00000E+00 | C56 | -1.30597E-09 |
| C13 | 4.31776E-04 | C35 | 0.00000E+00 | C57 | 0.00000E+00 |
| C14 | 0.00000E+00 | C36 | 0.00000E+00 | C58 | -3.58356E-09 |
| C15 | 4.00487E-04 | C37 | 2.73778E-08 | C59 | 0.00000E+00 |
| C16 | 0.00000E+00 | C38 | 0.00000E+00 | C60 | -2.83537E-09 |
| C17 | 0.00000E+00 | C39 | -5.40956E-08 | C61 | 0.00000E+00 |
| C18 | 0.00000E+00 | C40 | 0.00000E+00 | C62 | 1.48565E-09 |
| C19 | 0.00000E+00 | C41 | -2.32265E-07 | C63 | 0.00000E+00 |
| C20 | 0.00000E+00 | C42 | 0.00000E+00 | C64 | 4.18540E-09 |
| C21 | 0.00000E+00 | C43 | -3.08218E-07 | C65 | 0.00000E+00 |
| C22 | -7.85218E-07 | C44 | 0.00000E+00 | C66 | 1.30344E-09 |

FIG. 57

| s13 (4TH NUMERICAL EXAMPLE) | | | | | |
|---|---|---|---|---|---|
| C1 | 0.00000E+00 | C23 | 0.00000E+00 | C45 | 3.68546E-07 |
| C2 | 0.00000E+00 | C24 | 1.65861E-05 | C46 | 0.00000E+00 |
| C3 | 0.00000E+00 | C25 | 0.00000E+00 | C47 | 0.00000E+00 |
| C4 | -9.84869E-02 | C26 | 1.30171E-05 | C48 | 0.00000E+00 |
| C5 | 0.00000E+00 | C27 | 0.00000E+00 | C49 | 0.00000E+00 |
| C6 | -9.42004E-02 | C28 | -1.37368E-06 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -8.68005E-04 | C33 | 0.00000E+00 | C55 | 0.00000E+00 |
| C12 | 0.00000E+00 | C34 | 0.00000E+00 | C56 | -5.75751E-09 |
| C13 | -2.00618E-03 | C35 | 0.00000E+00 | C57 | 0.00000E+00 |
| C14 | 0.00000E+00 | C36 | 0.00000E+00 | C58 | -2.29796E-08 |
| C15 | -9.74848E-04 | C37 | 3.12522E-07 | C59 | 0.00000E+00 |
| C16 | 0.00000E+00 | C38 | 0.00000E+00 | C60 | -4.61610E-08 |
| C17 | 0.00000E+00 | C39 | 6.82568E-07 | C61 | 0.00000E+00 |
| C18 | 0.00000E+00 | C40 | 0.00000E+00 | C62 | -4.95083E-08 |
| C19 | 0.00000E+00 | C41 | 1.04654E-06 | C63 | 0.00000E+00 |
| C20 | 0.00000E+00 | C42 | 0.00000E+00 | C64 | -2.64406E-08 |
| C21 | 0.00000E+00 | C43 | 9.15201E-07 | C65 | 0.00000E+00 |
| C22 | -1.44254E-06 | C44 | 0.00000E+00 | C66 | -6.67135E-09 |

FIG. 58

| s14 (4TH NUMERICAL EXAMPLE) | | | | | |
|---|---|---|---|---|---|
| C1 | 0.00000E+00 | C23 | 0.00000E+00 | C45 | 3.39472E-07 |
| C2 | 0.00000E+00 | C24 | 5.46720E-05 | C46 | 0.00000E+00 |
| C3 | 0.00000E+00 | C25 | 0.00000E+00 | C47 | 0.00000E+00 |
| C4 | 5.66920E-02 | C26 | 5.39754E-05 | C48 | 0.00000E+00 |
| C5 | 0.00000E+00 | C27 | 0.00000E+00 | C49 | 0.00000E+00 |
| C6 | 6.26220E-02 | C28 | 1.32324E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.21686E-03 | C33 | 0.00000E+00 | C55 | 0.00000E+00 |
| C12 | 0.00000E+00 | C34 | 0.00000E+00 | C56 | -3.95931E-09 |
| C13 | -1.95672E-03 | C35 | 0.00000E+00 | C57 | 0.00000E+00 |
| C14 | 0.00000E+00 | C36 | 0.00000E+00 | C58 | -1.14493E-09 |
| C15 | -1.28347E-03 | C37 | 2.83212E-07 | C59 | 0.00000E+00 |
| C16 | 0.00000E+00 | C38 | 0.00000E+00 | C60 | 1.57323E-09 |
| C17 | 0.00000E+00 | C39 | -3.69774E-08 | C61 | 0.00000E+00 |
| C18 | 0.00000E+00 | C40 | 0.00000E+00 | C62 | -6.61376E-09 |
| C19 | 0.00000E+00 | C41 | -3.07945E-08 | C63 | 0.00000E+00 |
| C20 | 0.00000E+00 | C42 | 0.00000E+00 | C64 | -5.42516E-09 |
| C21 | 0.00000E+00 | C43 | 1.78917E-07 | C65 | 0.00000E+00 |
| C22 | 1.04643E-05 | C44 | 0.00000E+00 | C66 | -6.75816E-09 |

FIG. 63

| s | SURFACE TYPE | r | d | nd | vd |
|---|---|---|---|---|---|
| | 5TH NUMERICAL EXAMPLE | | | | |
| 1 | Spherical surface | 145.001 | 1.000 | 1.77250 | 49.6 |
| 2 | Spherical surface | 8.908 | 2.378 | | |
| 3 | Anamorphic aspherical surface | 34.675 | 0.800 | 1.52624 | 56.3 |
| 4 | Anamorphic aspherical surface | 4.584 | 7.721 | | |
| 5 | Spherical surface | 10.761 | 1.898 | 2.00100 | 29.1 |
| 6 | Spherical surface | −36.377 | 0.450 | | |
| 7 | Plane | Diaphragm | 0.556 | | |
| 8 | Spherical surface | 8.891 | 2.847 | 1.61997 | 63.9 |
| 9 | Spherical surface | −7.260 | 0.450 | 1.94595 | 18.0 |
| 10 | Spherical surface | 12.235 | 1.534 | | |
| 11 | Anamorphic aspherical surface | 18.144 | 3.158 | 1.52624 | 56.3 |
| 12 | Anamorphic aspherical surface | −5.174 | 5.686 | | |

FIG. 64

| 5TH NUMERICAL EXAMPLE | |
|---|---|
| F number | 1.38 |
| Vertical half angle of view | 22.5 |
| Horizontal half angle of view | 60 |
| Vertical image height | 1.344 |
| Horizontal image height | 1.792 |

FIG. 65

| | s3 (5TH NUMERICAL EXAMPLE) |
|---|---|
| CUX | −1.25807E−01 |
| CUY | 2.88396E−02 |
| KX | −2.43121E+00 |
| KY | −2.57042E+01 |
| AR | −5.58282E−04 |
| BR | 2.97121E−05 |
| CR | −1.21352E−06 |
| DR | 1.57055E−08 |
| AP | 2.83250E−01 |
| BP | 1.47079E−01 |
| CP | −1.13156E−01 |
| DP | −4.45354E−01 |

FIG. 66

| | s4 (5TH NUMERICAL EXAMPLE) |
|---|---|
| CUX | 3.49665E−01 |
| CUY | 2.18166E−01 |
| KX | −6.37567E−01 |
| KY | −1.32558E+00 |
| AR | −2.63151E−04 |
| BR | −1.06087E−05 |
| CR | 2.26164E−06 |
| DR | −1.64134E−07 |
| AP | −1.51217E+00 |
| BP | −7.09008E−01 |
| CP | 3.34982E−01 |
| DP | 2.03213E−01 |

FIG. 67

| | s11 (5TH NUMERICAL EXAMPLE) |
|---|---|
| CUX | 1.59482E-01 |
| CUY | 5.51140E-02 |
| KX | 0.00000E+00 |
| KY | 0.00000E+00 |
| AR | -2.22187E-03 |
| BR | -4.43488E-05 |
| CR | -1.04556E-06 |
| DR | -7.71717E-08 |
| AP | 1.20651E-01 |
| BP | 1.70127E-01 |
| CP | 8.70131E-02 |
| DP | 3.58543E-02 |

FIG. 68

| | s12 (5TH NUMERICAL EXAMPLE) |
|---|---|
| CUX | -1.37700E-01 |
| CUY | -1.93257E-01 |
| KX | 1.96306E-01 |
| KY | -2.12296E-01 |
| AR | 8.51367E-04 |
| BR | -5.19296E-05 |
| CR | 3.14253E-24 |
| DR | -2.41383E-10 |
| AP | -3.46847E-01 |
| BP | -5.14700E-02 |
| CP | -1.36939E+04 |
| DP | 1.23481E+00 |

FIG. 72

| s | SURFACE TYPE | r | d | nd | vd |
|---|---|---|---|---|---|
| 6TH NUMERICAL EXAMPLE | | | | | |
| 1 | Spherical surface | -479.321 | 1.000 | 1.77250 | 49.6 |
| 2 | Spherical surface | 8.298 | 1.454 | | |
| 3 | Anamorphic aspherical surface | 12.833 | 0.800 | 1.52624 | 56.3 |
| 4 | Anamorphic aspherical surface | 4.638 | 10.578 | | |
| 5 | Spherical surface | 9.008 | 1.870 | 2.00100 | 29.1 |
| 6 | Spherical surface | -208.934 | 0.275 | | |
| 7 | Plane | Diaphragm | 0.885 | | |
| 8 | Spherical surface | 7.316 | 2.444 | 1.61997 | 63.9 |
| 9 | Spherical surface | -7.990 | 0.321 | 1.94595 | 18.0 |
| 10 | Spherical surface | 8.167 | 0.695 | | |
| 11 | Anamorphic aspherical surface | 18.248 | 2.737 | 1.52624 | 56.3 |
| 12 | Anamorphic aspherical surface | -5.075 | 5.424 | | |

FIG. 73

| 6TH NUMERICAL EXAMPLE | |
|---|---|
| F number | 1.37 |
| Vertical half angle of view | 25 |
| Horizontal half angle of view | 60 |
| Vertical image height | 1.344 |
| Horizontal image height | 1.793 |

FIG. 74

| | s3 (6TH NUMERICAL EXAMPLE) |
|---|---|
| CUX | -4.37485E-02 |
| CUY | 7.79244E-02 |
| KX | 0.00000E+00 |
| KY | 0.00000E+00 |
| AR | -4.41622E-04 |
| BR | 9.57606E-06 |
| CR | 0.00000E+00 |
| DR | 0.00000E+00 |
| AP | 0.00000E+00 |
| BP | 0.00000E+00 |
| CP | 0.00000E+00 |
| DP | 0.00000E+00 |

FIG. 75

| | s4 (6TH NUMERICAL EXAMPLE) |
|---|---|
| CUX | 3.17424E+00 |
| CUY | 4.63800E+00 |
| KX | 0.00000E+00 |
| KY | 4.63800E+00 |
| AR | -9.00000E-01 |
| BR | -1.80217E-04 |
| CR | -1.64087E-05 |
| DR | 1.44395E-06 |
| AP | -6.37298E-01 |
| BP | -9.65988E-01 |
| CP | -4.52980E-01 |
| DP | -8.37238E-02 |

FIG. 76

| | s11 (6TH NUMERICAL EXAMPLE) |
|---|---|
| CUX | 1.29096E-01 |
| CUY | 5.48000E-02 |
| KX | 0.00000E+00 |
| KY | 0.00000E+00 |
| AR | -3.44347E-03 |
| BR | -8.84347E-05 |
| CR | -4.65873E-06 |
| DR | 0.00000E+00 |
| AP | 5.73709E-02 |
| BP | 7.79119E-02 |
| CP | -5.15715E-02 |
| DP | 0.00000E+00 |

FIG. 77

| | s12 (6TH NUMERICAL EXAMPLE) |
|---|---|
| CUX | -1.58783E-01 |
| CUY | -1.97027E-01 |
| KX | 0.00000E+00 |
| KY | 0.00000E+00 |
| AR | 1.99855E-04 |
| BR | -7.20538E-05 |
| CR | 2.37256E-24 |
| DR | 0.00000E+00 |
| AP | -5.06452E-01 |
| BP | -1.04219E-01 |
| CP | -1.36939E+04 |
| DP | 0.00000E+00 |

LENS SYSTEM, IMAGING DEVICE, AND IMAGING SYSTEM

BACKGROUND

1. Technical Field

The present disclosure relates to a lens system, an imaging device, and an imaging system.

2. Related Art

WO 2003/010599 A (hereinafter "Patent Document 1") discloses a method for capturing a panoramic image with a rectangular image sensor. In Patent Document 1, a circular image is converted into a rectangular image by using a toric lens as a fisheye objective lens. Accordingly, in the rectangular image sensor, a rectangular image can be formed on a rectangular image sensor to capture a panoramic image.

WO 2013/065391 A (hereinafter "Patent Document 2") discloses a method for magnifying an image rotationally asymmetrically by using an anamorphic aspherical surface as a zoom lens.

JP 2010-276755 A (hereinafter "Patent Document 3") discloses a method for implementing an ultra-wide-angle lens with less reflection of unnecessary part when used in an in-vehicle camera or the like. Using an anamorphic lens that is asymmetric with respect to the optical axis makes it possible to implement an ultra-wide-angle lens without reflection of unnecessary part.

WO 2018/230034 A (hereinafter "Patent Document 4") discloses a method for magnifying and photographing a subject in a central portion near the optical axis while effectively utilizing a region of a photosensitive surface of a rectangular image sensor. Patent Document 4 changes an effective image circle from a circle to a rectangle by using a freeform surface that is asymmetric with respect to the optical axis. This makes it possible to magnify and photograph the subject in the central portion near the optical axis while effectively utilizing the region of the photosensitive surface of the rectangular image sensor.

SUMMARY

The present disclosure provides a lens system, an imaging device, and an imaging system which can magnify an image in one direction.

A lens system according to the present disclosure includes, with a telephoto angle of view, a plurality of lens elements arranged from an object side to an image plane side, and a diaphragm arranged between the plurality of lens elements. The plurality of lens elements include a plurality of freeform lenses each having a freeform surface that is asymmetrical with respect to a first direction and a second direction which cross with each other. At least one freeform lens is placed on the image plane side of the diaphragm. The lens system satisfies a conditional expression (1) given below, based on a sum for freeform surfaces of one or more freeform lenses located on the object side of the diaphragm:

$$0.0075 < \left| \frac{\sum_{k=1}^{N} \{(SAG1_k - SAG2_k) \times \Delta nd_k\}}{Y2 \times \tan\Theta 1} \right| \quad (1)$$

where
N: a total number of the freeform surfaces of the freeform lenses located on the object side of the diaphragm,
k: a number indicating a freeform surface among the total N freeform surfaces,
$SAG1_k$: a sag amount at a position where a height of a k-th freeform surface in the first direction is 40% of an image height in the first direction,
$SAG2_k$: a sag amount at a position where a height of the k-th freeform surface in the second direction is 40% of the image height in the first direction,
Y2: an image height in the second direction,
$\Theta 1$: a full angle of view in the first direction, and
$\Delta nd_k$: a difference resulting from subtracting a refractive index on the object side of the k-th freeform surface from a refractive index on the image plane side of the k-th freeform surface.

An imaging device according to the present disclosure includes the above lens system and an imaging element that captures an image formed by the lens system.

An imaging system according to the present disclosure includes the imaging device described above and an image processor. The image processor performs image processing on an image captured by the imaging element of the imaging device.

The lens system, the imaging device, and the imaging system according to the present disclosure can magnify an image in one direction.

BRIEF DESCRIPTION OF THE DRAWINGS

FIG. 5 is a diagram showing surface data of the lens system according to the first numerical example.

FIG. 6 is a diagram showing various kinds of data of the lens system according to the first numerical example.

FIG. 7 is a diagram showing freeform surface data of a first surface in the lens system according to the first numerical example.

FIG. 8 is a diagram showing aspherical surface data of a second surface in the lens system according to the first numerical example.

FIG. 9 is a diagram showing aspherical surface data of a third surface in the lens system according to the first numerical example.

FIG. 10 is a diagram showing freeform surface data of a fourth surface in the lens system according to the first numerical example.

FIG. 11 is a diagram showing aspherical surface data of a 13th surface in the lens system according to the first numerical example.

FIG. 12 is a diagram showing freeform surface data of a 14th surface in the lens system according to the first numerical example.

FIG. 13 is a diagram showing freeform surface data of a 15th surface in the lens system according to the first numerical example.

FIG. 14 is a diagram showing freeform surface data of a 16th surface in the lens system according to the first numerical example.

FIG. 16A is a chart showing sufficiency of various conditions in the lens system according to the first embodiment.

FIG. 16B is a chart showing a comparative example with respect to FIG. 16A.

FIG. 21 is a diagram showing surface data of a lens system according to a second numerical example.

FIG. 22 is a diagram showing various kinds of data of the lens system according to the second numerical example.

FIG. 23 is a diagram showing freeform surface data of a first surface in the lens system according to the second numerical example.

FIG. 24 is a diagram showing aspherical surface data of a second surface in the lens system according to the second numerical example.

FIG. 25 is a diagram showing aspherical surface data of a third surface in the lens system according to the second numerical example.

FIG. 26 is a diagram showing freeform surface data of a fourth surface in the lens system according to the second numerical example.

FIG. 27 is a diagram showing aspherical surface data of a 13th surface in the lens system according to the second numerical example.

FIG. 28 is a diagram showing freeform surface data of a 14th surface in the lens system according to the second numerical example.

FIG. 29 is a diagram showing freeform surface data of a 15th surface in the lens system according to the second numerical example.

FIG. 30 is a diagram showing freeform surface data of a 16th surface in the lens system according to the second numerical example.

FIG. 35 is a diagram showing surface data of a lens system according to a third numerical example.

FIG. 36 is a diagram showing various kinds of data of the lens system according to the third numerical example.

FIG. 37 is a diagram showing freeform surface data of a first surface in the lens system according to the third numerical example.

FIG. 38 is a diagram showing freeform surface data of a second surface in the lens system according to the third numerical example.

FIG. 39 is a diagram showing aspherical surface data of a fifth surface in the lens system according to the third numerical example.

FIG. 40 is a diagram showing aspherical surface data of a 10th surface in the lens system according to the third numerical example.

FIG. 41 is a diagram showing freeform surface data of a 12th surface in the lens system according to the third numerical example.

FIG. 42 is a diagram showing freeform surface data of a 13th surface in the lens system according to the third numerical example.

FIG. 43 is a diagram showing freeform surface data of a 14th surface in the lens system according to the third numerical example.

FIG. 44 is a diagram showing freeform surface data of a 15th surface in the lens system according to the third numerical example.

FIG. 49 is a diagram showing surface data of a lens system according to a fourth numerical example.

FIG. 50 is a diagram showing various kinds of data of the lens system according to the fourth numerical example.

FIG. 51 is a diagram showing freeform surface data of a first surface in the lens system according to the fourth numerical example.

FIG. 52 is a diagram showing freeform surface data of a second surface in the lens system according to the fourth numerical example.

FIG. 53 is a diagram showing freeform surface data of a third surface in the lens system according to the fourth numerical example.

FIG. 54 is a diagram showing freeform surface data of a fourth surface in the lens system according to the fourth numerical example.

FIG. 55 is a diagram showing freeform surface data of a ninth surface in the lens system according to the fourth numerical example.

FIG. 56 is a diagram showing freeform surface data of a 10th surface in the lens system according to the fourth numerical example.

FIG. 57 is a diagram showing freeform surface data of a 13th surface in the lens system according to the fourth numerical example.

FIG. 58 is a diagram showing freeform surface data of a 14th surface in the lens system according to the fourth numerical example.

FIG. 63 is a diagram showing surface data of a lens system according to a fifth numerical example.

FIG. 64 is a diagram showing various kinds of data of the lens system according to the fifth numerical example.

FIG. 65 is a diagram showing freeform surface data of a third surface in the lens system according to the fifth numerical example.

FIG. 66 is a diagram showing freeform surface data of a fourth surface in the lens system according to the fifth numerical example.

FIG. 67 is a diagram showing freeform surface data of an 11th surface in the lens system according to the fifth numerical example.

FIG. 68 is a diagram showing freeform surface data of a 12th surface in the lens system according to the fifth numerical example.

FIG. 72 is a diagram showing surface data of a lens system according to a sixth numerical example.

FIG. 73 is a diagram showing various kinds of data of the lens system according to the sixth numerical example.

FIG. 74 is a diagram showing freeform surface data of a third surface in the lens system according to the sixth numerical example.

FIG. 75 is a diagram showing freeform surface data of a fourth surface in the lens system according to the sixth numerical example.

FIG. 76 is a diagram showing freeform surface data of an 11th surface in the lens system according to the sixth numerical example.

FIG. 77 is a diagram showing freeform surface data of a 12th surface in the lens system according to the sixth numerical example.

DESCRIPTION OF EMBODIMENTS

Hereinafter, embodiments will be described in detail with reference to the accompanying drawings as appropriate. However, more detailed description than necessary may be omitted. For example, detailed descriptions of already well-known matters or duplicate descriptions of substantially the same configurations may be omitted. This is to avoid unnecessary redundancy in the following description and to facilitate understanding by those skilled in the art.

It should be noted that the applicant provides the accompanying drawings and the following description so that those skilled in the art can sufficiently understand the present disclosure, and they are not intended to limit the subject matter set forth in the claims.

First Embodiment

A first embodiment of a lens system, an imaging device, and an imaging system according to the present disclosure will now be described with reference to the drawings.

1. Imaging System

Figure 1:
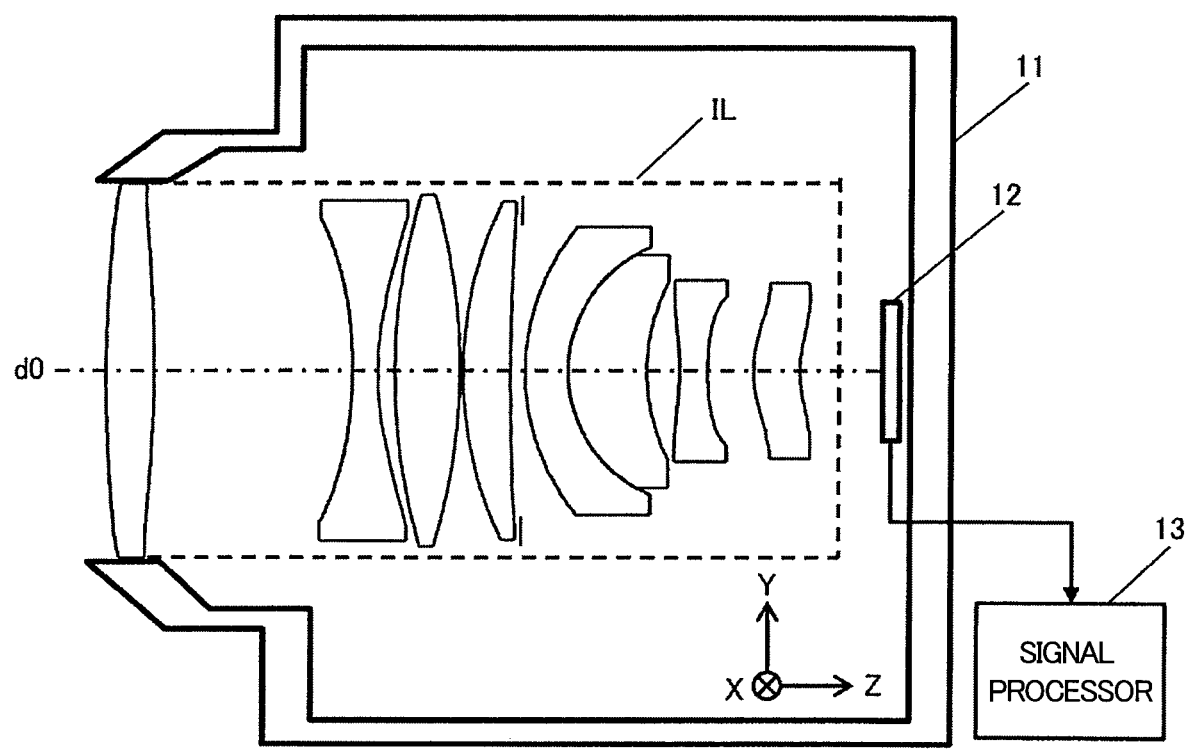
FIG. 1 is a diagram showing a configuration of an imaging system according to a first embodiment of the present disclosure.

The imaging system according to the present embodiment will be described with reference to FIG. 1. FIG. 1 is a diagram showing a configuration of an imaging system 10 according to the present embodiment.

As shown in FIG. 1, the imaging system 10 according to the present embodiment includes an imaging device 11 and an image processor 13, for example. The imaging system 10 of the present embodiment can be applied to an in-vehicle camera or a TOF sensor, for example. Although not particularly shown, the imaging system 10 may further include an infrared light source and a controller that controls light emission.

The imaging device 11 includes a lens system IL and an imaging element 12. The imaging device 11 is a device that captures images of various objects as subjects, and can be various cameras or image sensors. The image processor 13 may be incorporated in a camera or the like. For example, the imaging device 10 performs an imaging operation based on light in an infrared region having a wavelength of 900 nm or more. The imaging device 10 may have an imaging function based on light in a visible region. Hereinafter, the direction of an optical axis d0 of the lens system IL in the imaging device 11 is defined as a Z direction, the vertical direction orthogonal to the Z direction is defined as a Y direction, and the horizontal direction orthogonal to the Z and Y directions is defined as an X direction. The Y and X directions are examples of first and second directions in the present embodiment, respectively.

The lens system IL captures light that enters from the outside of the imaging device 11 and forms an image such as an image circle with the captured light. The lens system IL is composed of various lens materials that transmit light in the infrared region, for example. For example, the lens materials include Si and Ga. The lens system IL will be described in detail later. Hereinafter, as shown in FIG. 1, the +Z side in the lens system IL is defined as an image plane side, and the −Z side is defined as an object side.

The imaging element 12 is a CCD or CMOS image sensor, for example. The imaging element 12 has an imaging surface in which a plurality of pixels are two-dimensionally arranged at equal intervals. The imaging element 12 is disposed in the imaging device 11 such that the imaging surface is located on the image plane of the lens system IL. The imaging element 12 captures an image formed on the imaging surface via the lens system IL to generate image data indicating the captured image. The imaging element 12 has a short side corresponding to the Y direction and a long side corresponding to the X direction and has a rectangular shape.

The image processor 13 performs predetermined image processing on the image captured by the imaging device 11, based on the imaging data from the imaging element 12. For example, the image processing is gamma correction and distortion correction. The image processor 13 may perform TOF distance calculation to generate image data indicating a distance image, for example. The image processor 13 includes, for example, a CPU or MPU that implements various functions by executing a program stored in an internal memory. The image processor 13 may include a dedicated hardware circuit designed to implement a desired function. The image processor 13 may include a CPU, MPU, GPU, DSP, FPGA, or ASIC.

The imaging system 10 according to the present embodiment as described above can be applied to an application for detecting an external environment or the like in an in-vehicle application, for example. The lens system IL according to the present embodiment implements a function of magnifying an image in a specific direction in the imaging system 10, for example, from the viewpoint of improving the accuracy of such detection applications. An example of the function of the lens system IL according to the present embodiment will be described with reference to FIG. 2.

Figure 2:
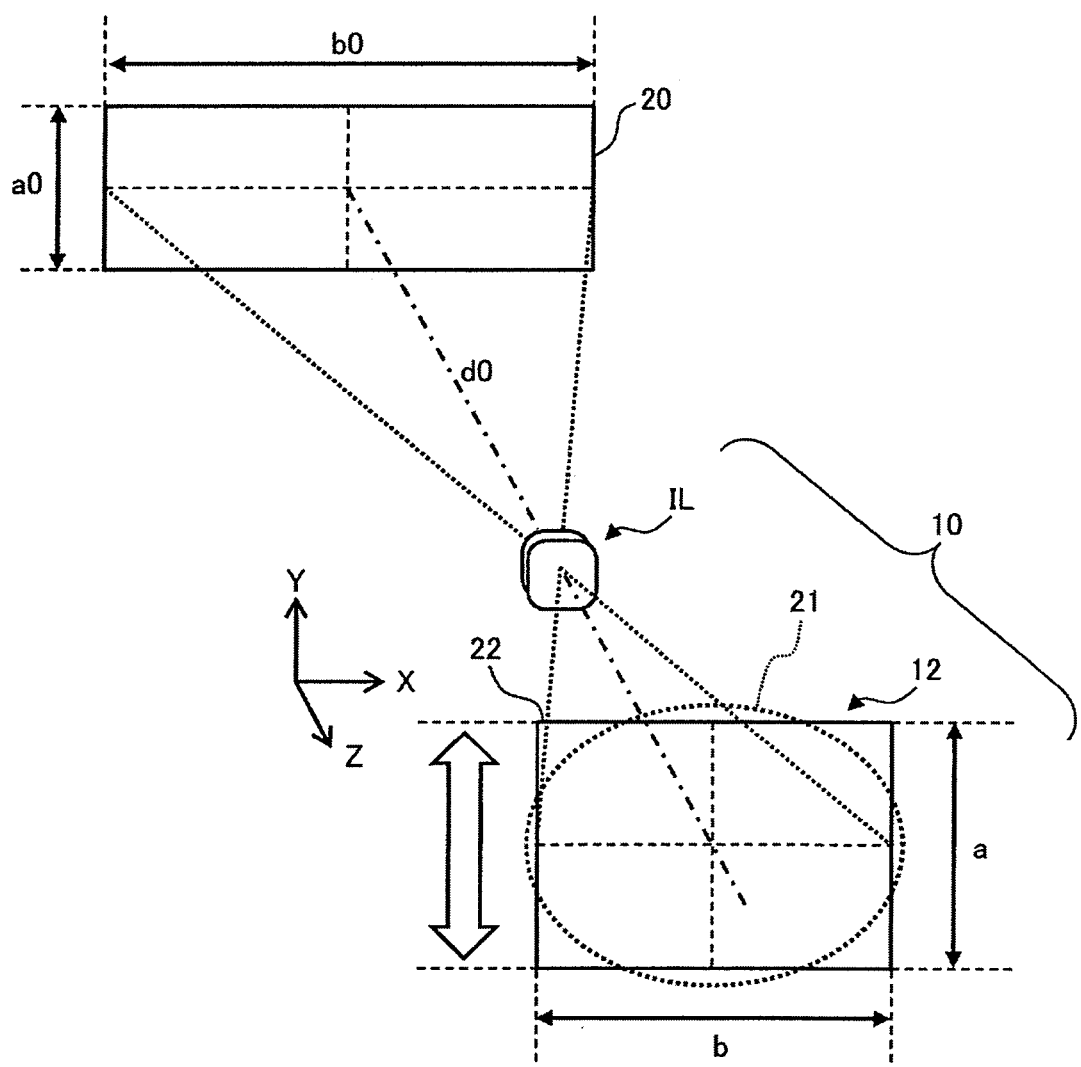
FIG. 2 is a diagram for explaining an example of a function of a lens system of the imaging system according to the first embodiment.

FIG. 2 illustrates a detection range 20 by the imaging system 10, an image circle 21 of the lens system IL, and an imaging surface 22 of the imaging element 12. The lens system IL captures light from the external detection range 20 and forms an image on the imaging surface 22 of the imaging element 12 by the image circle 21. In the imaging system 10, various detections are performed based on the imaging data of the image formed on the imaging surface 22.

In this example, the imaging surface 22 has an aspect ratio a/b of a short side a and a long side b. The imaging element 12 is placed such that the short side a is parallel to the Y direction and the long side b is parallel to the X direction, for example. The image circle 21 of the lens system IL according to the present embodiment has a shape distorted from a circular shape to an ellipse, for example. The image circle 21 may have a portion that is not included in the range of the imaging surface 22.

The detection range 20 illustrated in FIG. 2 has an aspect ratio a0/b0 different from the aspect ratio a/b of the imaging surface 22. The aspect ratio a0/b0 of the detection range 20 is set from various requirements in the application of the imaging system 10. In the above detection application, the detection accuracy can be improved by increasing the amount of information in the detection range 20 included in the imaging data.

Accordingly, the imaging system 10 according to the present embodiment forms an image magnified in one of the two directions so as to convert the aspect ratio a0/b0 of the detection range 20 to the aspect ratio a/b of the imaging surface 22 by the lens system IL. In the example in FIG. 2, magnifying the image in the direction of the short side a of the imaging element 12 can increase the resolution in the direction of the short side a while keeping the angle of view of the detection range 20 within the range of the long side b.

Further, in the above detection application, it is conceivable that the light amount for the distant detection range 20 or at night is small, for example. For the lens system IL, a telephoto angle of view may be used or an aperture value may be set closer to the maximum aperture. The present embodiment provides the lens system IL that can implement unidirectional magnification of an image even in such a case. The lens system IL according to the present embodiment will be described below in detail.

2. Lens System

First to sixth examples of the lens system IL will be described below each as an example in which the lens system IL according to the present embodiment is concretely embodied.

2-1. First Example

A lens system IL1 according to the first example will be described with reference to FIGS. 3 to 15.

Figure 3:
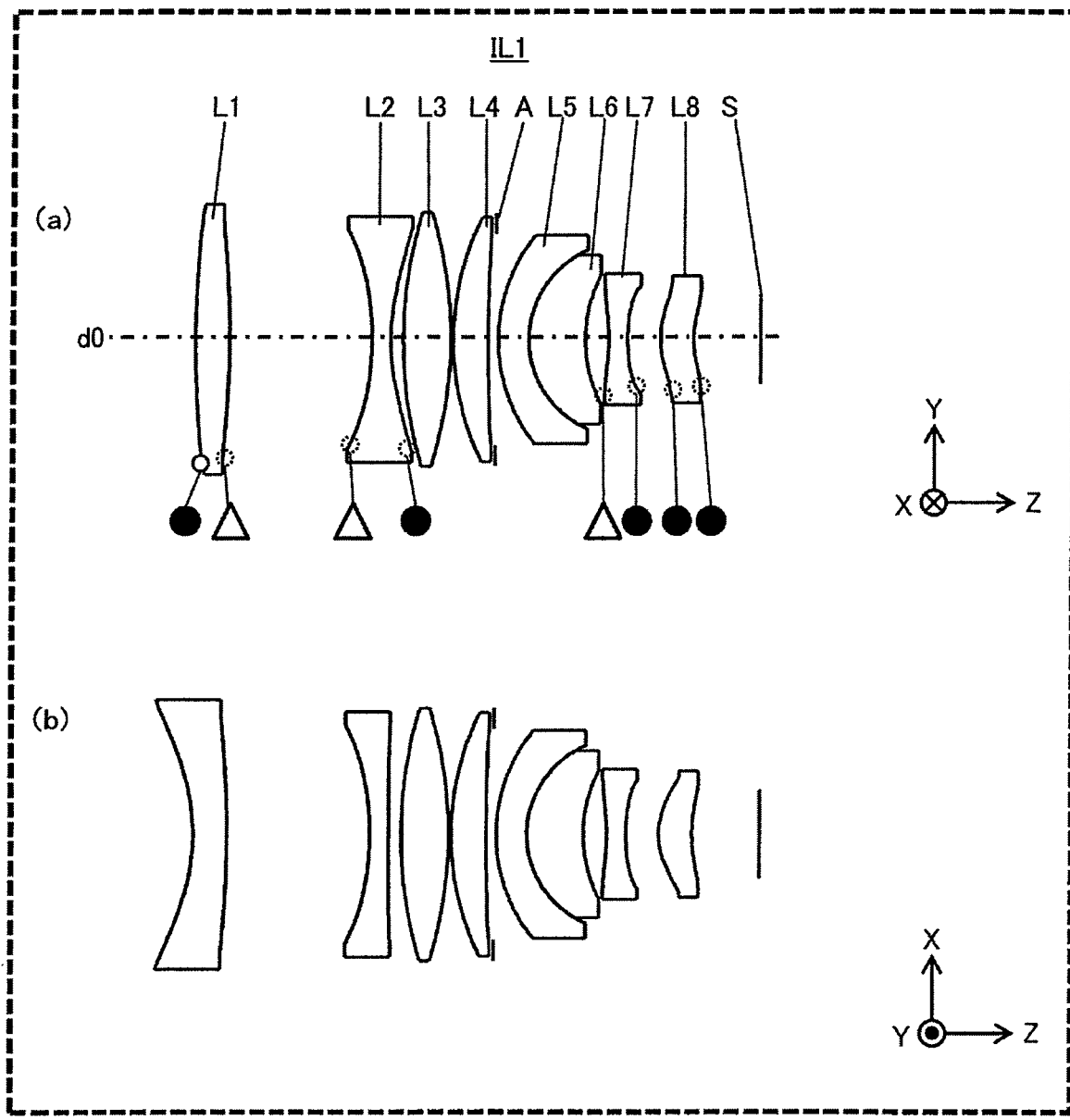
FIG. 3 is a lens layout diagram showing a configuration of a lens system according to a first example.

FIG. 3 is a lens layout diagram showing the configuration of the lens system IL1 according to the first example. The following lens layout diagrams show the arrangement of various lenses of the lens system IL1 when focus is at infinity, for example. FIG. 3(a) is a lens layout diagram in a YZ cross-section of the lens system IL1 according to the present example. FIG. 3(b) is a lens layout diagram in an XZ cross-section of the lens system IL1. The YZ cross-section and the XZ cross-section are virtual cross-sections along the optical axis d0 of the lens system IL1. Further, an image plane S on which the lens system IL1 forms an image is illustrated.

Referring to FIG. 3(a), a curved surface marked with the symbol "•" indicates a freeform surface. The freeform surface is a rotationally asymmetric curved surface with respect to the optical axis do. Further, a curved surface with the symbol "Δ" indicates that it is a rotationally symmetric aspherical surface. It should be noted that the symbols are omitted in FIG. 3(b).

The lens system IL according to the present embodiment has multiple freeform surfaces that are asymmetric between the X direction and the Y direction, as shown in, FIGS. 3(a) and (b) for example. Hereinafter, a lens element having a freeform surface on at least one of the object side and the image plane side is referred to as a freeform lens.

The lens system IL1 according to the first example includes first to eighth lens elements L1 to L8 and a diaphragm A. As shown in FIG. 3(a), in the lens system IL1, the first to eighth lens elements L1 to L8 are arranged in order from the object side to the image plane side along the optical axis do. The diaphragm A is an aperture diaphragm.

In the lens system IL1 according to the present example, the first lens element L1 located closest to the object side is a freeform lens having a freeform surface on the object side, for example. For example, the freeform surface of the first lens element L1 is convex toward the object side in the Y direction as shown in FIG. 3(a) and convex toward the image plane side in the X direction as shown in FIG. 3(b). The surface of the first lens element L1 on the image plane side is an aspherical surface convex toward the image plane, for example. The first lens element L1 according to the present example is an example of a freeform lens having a positive power (i.e., a refractive power) in the Y direction and a negative power in the X direction.

For example, the second lens element L2 is a freeform lens having a freeform surface on the image plane side. The freeform surface of the second lens element L2 is convex toward the object in the X and Y directions so that the negative power is stronger in the Y direction than in the X direction, for example. The surface of the second lens element L2 on the object side is an aspherical surface convex toward the image plane, for example.

For example, the third lens element L3 is a biconvex spherical lens. The fourth lens element L4 is a spherical lens having a positive meniscus shape and convex toward the object, for example. The diaphragm A is placed between the fourth lens element L4 and the fifth lens element L5. For example, the fifth lens element L5 is a spherical lens having a negative meniscus shape and convex toward the object, and is joined to the sixth lens element L6. The sixth lens element L6 is a spherical lens having a positive meniscus shape and convex toward the object, for example.

For example, the seventh lens element L7 is a freeform lens having a freeform surface on the image plane side. The freeform surface of the seventh lens element L7 is convex toward the object in the X and Y directions so that the negative power is stronger in the Y direction than in the X direction, for example. The surface of the seventh lens element L7 on the object side is an aspherical surface convex toward the image plane, for example.

For example, the eighth lens element L8 is a freeform lens having freeform surfaces on both sides. The freeform surface of the eighth lens element L8 on the object side is convex toward the object in the X and Y directions so that the positive power is stronger in the X direction than in the Y direction, for example. The freeform surface of the eighth lens element L8 on the image plane side is convex toward the object in the X and Y directions so that the negative power is stronger in the Y direction than in the X direction, for example.

The lens system IL1 configured as described above has the first and second lens elements L1 and L2, which are two freeform lenses, on the object side of the diaphragm A. The lens system also has seventh and eighth lens elements L7 and L8, which are two freeform lenses, on the image plane side of the diaphragm A. A plurality of freeform surfaces on the freeform lens asymmetrically control the light rays captured by the lens system IL1 from the outside, so as to magnify the image formed by the lens system IL1 in a specific direction such as the Y direction. The effects of the lens system IL1 described above will be described with reference to FIG. 4.

Figure 4:
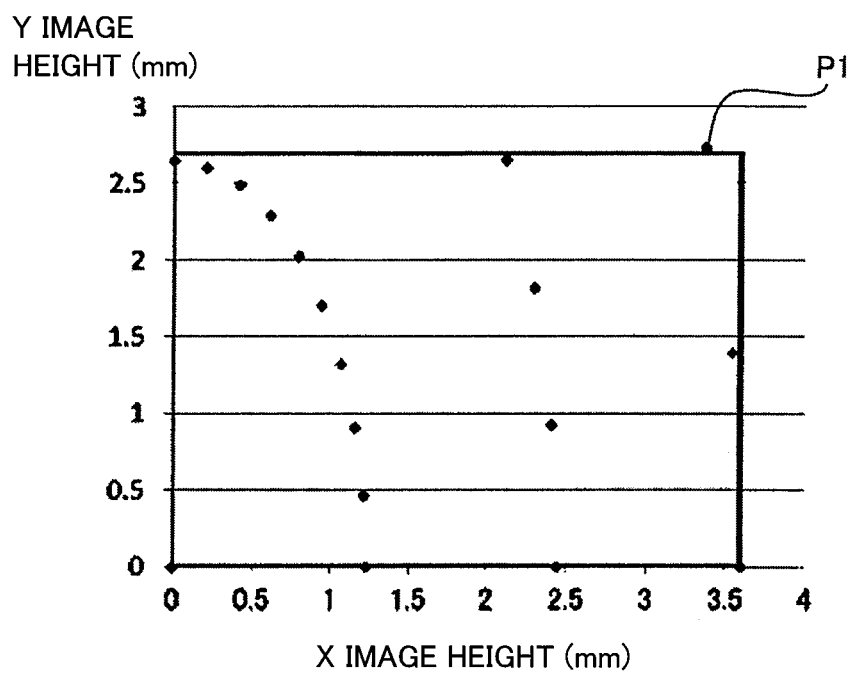
FIG. 4 is a scatter plot showing the relationship between angle of view and an image point in a lens system according to a first numerical example.

FIG. 4 is a scatter plot showing the relationship between angle of view and an image point P1 in the lens system IL1 according to the present example. In FIG. 4, the image points P1 at which incident light forms an image on the image plane are plotted for each predetermined angular width in the entire angle of view of the lens system IL1. The angular width is set to 5°. Further, the lens system IL1 is set such that focus is at infinity.

The plots in FIG. 4 are based on a first numerical example in which the lens system IL1 according to the first example is numerically implemented. The first numerical example of the lens system IL1 will be described later. FIG. 4 shows the image points P1 in a first quadrant on the XY plane of the image plane with the position of the optical axis d0 as an origin. Since the lens system IL1 according to the present example is line-symmetric with respect to the X axis and the Y axis, plots in second to fourth quadrants are similar to those in FIG. 4.

Referring to FIG. 4, the lens system IL1 according to the present example has the image point P1 for each angle width so that the distance between the image points P1 along the Y axis is larger than the distance between the image points P1 along the X axis. Therefore, the lens system IL1 according to the present example can form an image magnified in the Y direction. According to such magnification of the image, on the imaging surface of the imaging element 12, more pixels are allocated along the Y direction than along the X direction. Therefore, the imaging device 11 according to the present embodiment can capture a high-resolution captured image in the Y direction.

The first numerical example corresponding to the lens system IL1 according to the first example as described above will be described with reference to FIGS. 5 to 15.

FIG. 5 is a diagram showing surface data of the lens system IL1 according to the first numerical example. The surface data of FIG. 5 shows the surface type, and the radius of curvature r and distance d between adjacent surfaces in mm for each of surfaces s1 to s15 of the lens system IL1 arranged in order from the object side, and a refractive index nd and an Abbe number vd to the d-line of each lens element. Surface types include spherical surfaces, aspherical surfaces, and XY-polynomial surfaces as freeform surfaces, for example. The surface type may include an anamorphic aspherical surface as another example of a freeform surface.

FIG. 6 is a diagram showing various kinds of data of the lens system IL1 according to the first numerical example. The various data in FIG. 6 show an F number according to this numerical example, a vertical half angle of view, a horizontal half angle of view, a horizontal image height at the vertical half angle of view, and a horizontal image height at the horizontal half angle of view. The unit of image heights is "mm", and the unit of half angles of view is "°".

FIG. 7 is a diagram showing freeform surface data of the first surface s1 in the lens system IL1 according to the first numerical example. The freeform surface data of FIG. 7 shows various coefficients of the XY polynomial defining the XY-polynomial surface as the freeform surface of the object-side surface of the first lens element L1. The XY polynomial is expressed by the following equation (E1).

$$z = \frac{cr^2}{1 + \sqrt{1-(1+k)c^2r^2}} + \sum_{j=2}^{66} c_j x^p y^q \qquad (E1)$$

$$j = \frac{(p+q)^2 + p + 3q}{2} + 1$$

In the equation (E1) given above, c is a peak curvature, k is a conic constant, and $c_j$ is a coefficient. In the second term on the right side of the above equation (E1), j is an integer of e.g. 2 or more and 66 or less, and the summation for each j is calculated. According to the above equation (E1), a sag amount z at the position of (x, y) coordinates on the target surface is determined more freely than the regularity of the anamorphic aspherical surface. According to the XY-polynomial surface, the degree of freedom in the shape of the freeform surface can be increased, resulting in improving e.g. the effect to magnify the subject image on the imaging surface 22 and the effect to correct various aberrations.

FIG. 8 is a diagram showing the aspherical surface data of the second surface s2 in the lens system IL1 according to the first numerical example. The aspherical surface data in FIG. 8 shows various coefficients of the following equation (E2) that defines the shape of the aspherical surface for the image plane side surface of the first lens element L1.

$$z = \frac{h^2/r}{1+\sqrt{1-(1+\kappa)(h/r)^2}} + \sum A_n h^n \qquad (E2)$$

In the above equation (E2), h is a height in the radial direction, K is a conic constant, and An is an n-th order aspheric coefficient. In the second term on the right side of the above equation (E2), n is e.g. an even number of 4 or more and 20 or less, and the summation for each n is calculated. According to the above equation (E2), a sag amount z at the height h in the radial direction on the target surface is determined in a rotational symmetric manner.

FIG. 9 is a diagram showing aspherical surface data of the third surface s3 in the lens system IL1 according to the first numerical example. Similarly to FIG. 8, the aspherical surface data in FIG. 9 indicates various coefficients of the equation (E2) for the object-side surface of the second lens element L2.

FIG. 10 is a diagram showing freeform surface data of the fourth surface s4 in the lens system IL1 according to the first numerical example. Similarly to FIG. 7, the freeform surface data in FIG. 10 indicates various coefficients of the equation (E1) for the image plane side surface of the second lens element L2.

FIG. 11 is a diagram showing aspherical surface data of the 13th surface s13 in the lens system IL1 according to the first numerical example. Similarly to FIG. 8, the aspherical surface data in FIG. 11 indicates various coefficients of the equation (E2) for the object-side surface of the seventh lens element L7.

FIG. 12 is a diagram showing freeform surface data of the 14th surface s14 in the lens system IL1 according to the first numerical example. Similarly to FIG. 7, the freeform surface data in FIG. 12 indicates various coefficients of the equation (E1) for the image plane side surface of the seventh lens element L7.

FIGS. 13 and 14 are diagrams respectively showing freeform surface data of the 15th and 16th surfaces s15 and s16 in the lens system IL1 according to the first numerical example. Similarly to FIG. 7, the freeform surface data in FIGS. 13 and 14 respectively show various coefficients of the equation (E1) for the object side surface and the image plane side surface of the eighth lens element L8.

Figure 15:
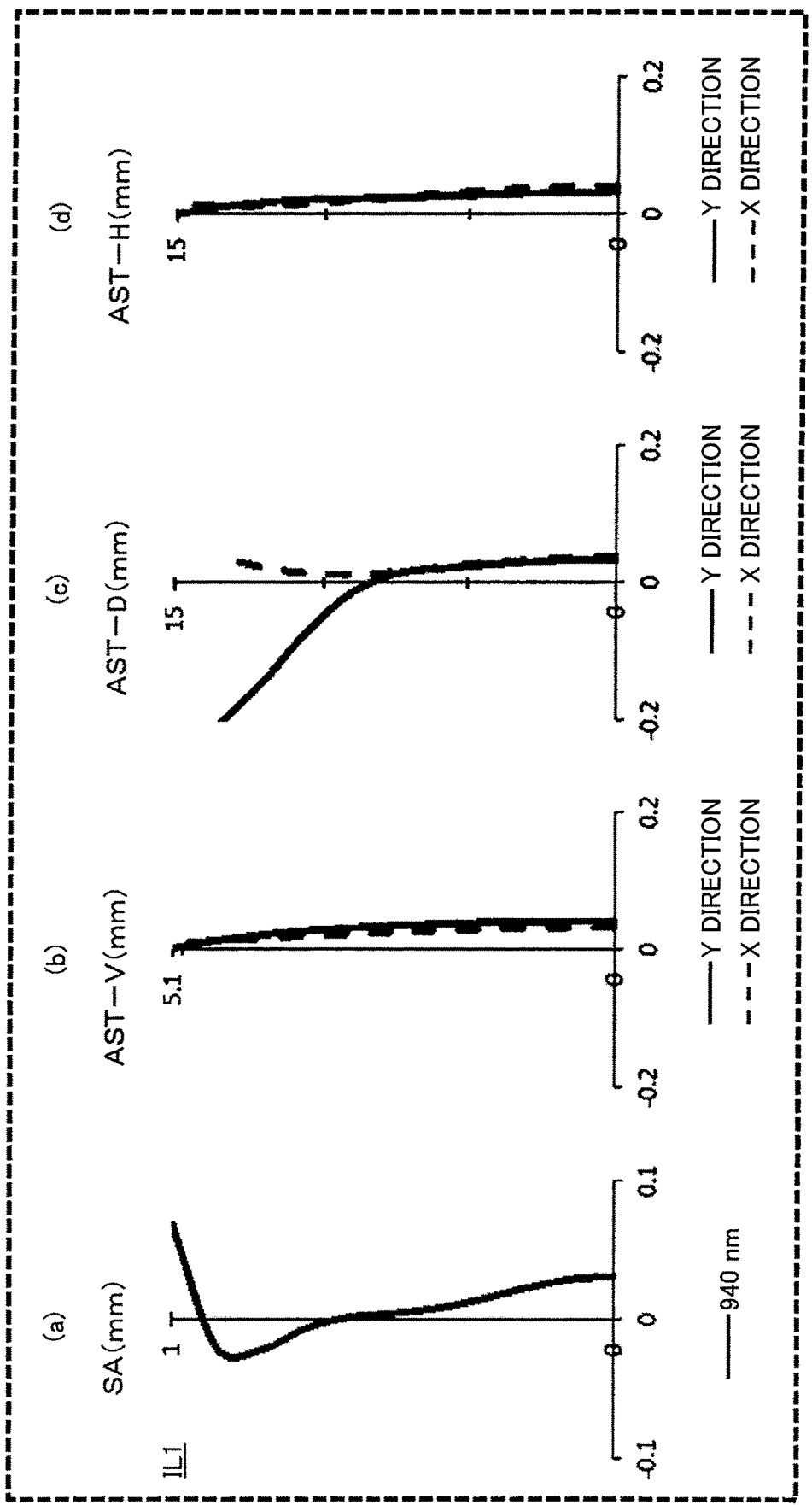
FIG. 15 is an aberration diagram showing various aberrations of the lens system according to the first numerical example.

FIG. 15 is an aberration diagram showing various aberrations of the lens system IL1 according to the present example. The following aberration diagrams indicate various longitudinal aberrations when focus is at infinity. FIG. 15(a) shows a spherical aberration "SA" in the lens system IL1. FIGS. 15(b), (c), and (d) show astigmatism "AST-V" in the Y direction, astigmatism "AST-D" in the diagonal direction, and astigmatism "AST-H" in the X direction, respectively.

The horizontal axis of each of FIGS. 15(a) to (d) is expressed in mm. The vertical axis in FIG. 15(a) is based on a pupil height. FIG. 15(a) shows characteristic curves of spherical aberration with respect to near-infrared light having a wavelength of 940 nm. The vertical axes in FIGS. 15(b) to (d) are based on a half angle of view. FIGS. 15(b) to (d) respectively show characteristic curves of astigmatism with respect to the XZ or YZ cross-section which is along the X direction or the Y direction and the optical axis D1.

In the present embodiment, as shown in FIGS. 7, 10, and 12 to 14, for example, only even terms of x and y are used in each freeform surface. Thus, the diagonal aberration "AST-D" and the like are the same in all of the first to fourth quadrants.

2-2. Various Conditions

Various conditions satisfied by the lens system IL according to the present embodiment will be described with reference to FIGS. 16A to 19 using the first numerical example of the lens system IL1.

FIG. 16A is a chart showing sufficiency of various conditions in the lens system IL according to the present embodiment. The chart of FIG. 16A shows that the lens system IL according to the present embodiment satisfies conditions (1A) to (7) given below in each of the first to sixth numerical examples. FIG. 16B is a chart showing a comparative example with respect to FIG. 16A. FIG. 16B shows the calculation results for each example of Patent Document 2 as the comparative example.

2-2-1. Condition (1A

A condition (1A) is that at least one freeform lens on the object side of the diaphragm A satisfies conditional expression (1A) given below.

$$T1/T2 < 0.8 \tag{1A}$$

In this case, T1 is a lens thickness at a reference height (i.e., the distance from the optical axis d0) in the first direction of the target freeform lens. T2 is a lens thickness at the same reference height as above in the second direction of the freeform lens. As the reference height of the condition (1A), the height at which an axial ray has the maximum in the lens system IL is adopted. The maximum height of the axial ray will be described with reference to FIG. 17.

FIGS. 17(a) and (b) illustrate the luminous flux of an axial ray AX in the lens system IL1 in the same lens arrangement as in FIGS. 3(a) and (b). The axial ray AX enters the lens system IL1 as a ray parallel to the optical axis d0 from the object side (–Z side), passes through the lens system IL1 while changing the diameter of the luminous flux between the lenses, and focuses on the center of the image plane S.

As shown in FIGS. 17(a) and (b), the height of the axial ray AX changes according to the position and direction in the lens system IL1. In this example, as shown in FIG. 17(a), the axial ray AX has a maximum height AXRh on the –Z side surface of the first lens element L1 in the Y direction (an example of the first direction).

The maximum height AXRh of the axial ray AX increases as the F value of the diaphragm A is smaller, that is, as the optical system is brighter. In a bright optical system, the light flux to be captured is thick, which increases the difficulty of optical design. Accordingly, necessity is conceivable to increase the number of lenses or increase the size of the optical system in order to obtain the desired performance.

In contrast to this, according to the condition (1A), the ability to magnify an image in one of the first and second directions can be obtained even in the bright optical system, by unevenly distributing the lens thicknesses T1 and T2 of the freeform lens at the maximum height AXRh of the axial ray, which is high in the bright optical system.

An image magnification ratio M, which is the ratio of magnification of the image in the one direction, is determined by the image heights and angles of view in the first and second directions, and expressed by the following equation (a).

$$M = (Y1/Y2) \times (\theta 2/\theta 1) \tag{$\alpha$}$$

Figure 16C:
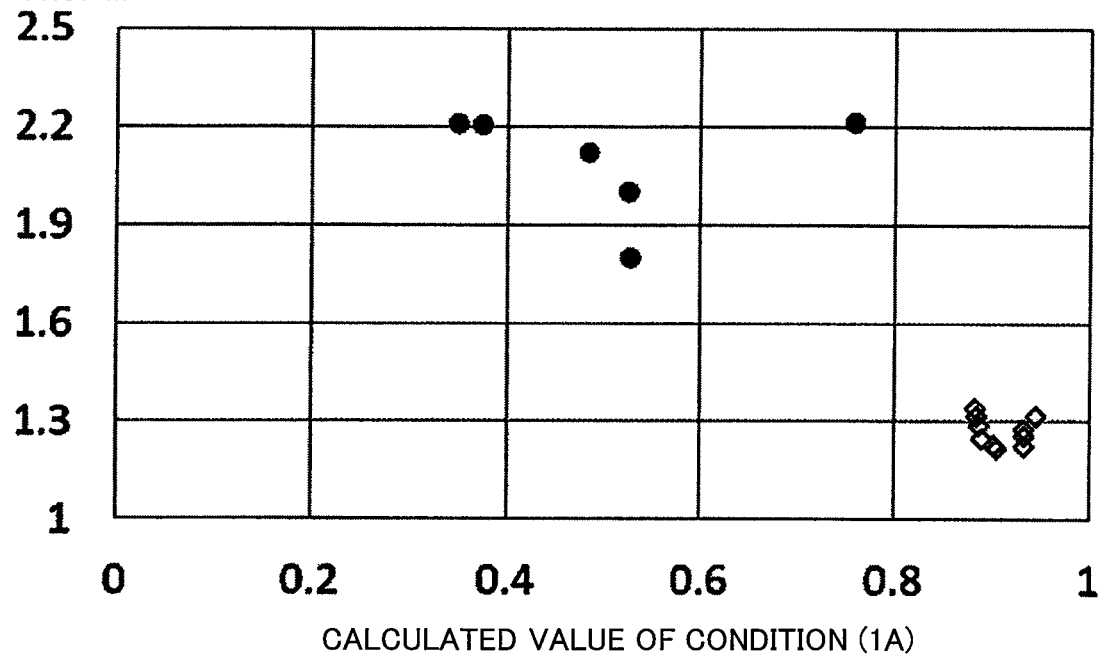
FIG. 16C is a graph showing the relationship between an image magnification ratio and a conditional expression (1A) according to the first embodiment.

In the equation ($\alpha$) given above, $\theta 1$ is the angle of view in the first direction, $\theta 2$ is the angle of view in the second direction, and Y1 and Y2 are the image heights in the first and second directions, respectively. The respective angles of view $\theta 1$ and $\theta 2$ are half angles of view, for example. FIG. 16C illustrates the relationship between the image magnification ratio M and the conditional expression (1A). The vertical axis of FIG. 16C represents the image magnification ratio, and the horizontal axis represents the calculated value on the left side of the conditional expression (1A). Here, "•" indicates the numerical value calculated in each example in the present application, and "◊" indicates the numerical value in the example of Patent Document 2. Referring to FIG. 16C, with the calculated value of the conditional expression (1A) being around "0.8", the image magnification ratio M changes intermittently. Thus, it is clear that satisfying the condition (1A) facilitates to obtain the effect of image magnification.

Regarding the condition (1A) given above, a lower limit value may be set as in the following expression (1Aa), for example.

$$0.1 < T1/T2 < 0.8 \quad (1Aa)$$

Below the lower limit of the above expression (1Aa), the difference between the lens thickness T1 in the first direction and the lens thickness T2 in the second direction may be so large as to result in difficulty in manufacturing. Further, the so-called ast, that is, the focus position deviation between the meridional direction and the sagittal direction on the axis may be unacceptable. On the other hand, above the upper limit of the condition (1A), the effect of magnifying an image may be reduced or the optical system would be dark. Alternatively, in order to keep the effect of magnifying the image and the brightness of the optical system, it is necessary to increase the refractive index of the freeform lens. Then, the occurrence of curvature of field or astigmatism would be unacceptable.

Thus, according to the condition (1Aa), it is possible to magnify an image in one direction with avoiding the difficulty of manufacturing even in the bright optical system. Such an effect is more remarkable when the lens system IL satisfies the following expression (1Ab).

$$0.3 < T1/T2 < 0.76 \quad (1Ab)$$

In the lens system IL1 according to the first numerical example, the first lens element L1 closest to the object satisfies the condition (1A) and the like, with the first direction as the Y direction and the second direction as the X direction. This facilitates to magnify an image in the first direction with respect to the second direction and improve the resolution therein.

Further, in the lens system IL1 according to the first numerical example, the second lens element L2 satisfies the condition (1A) and the like when the first direction is the X direction and the second direction is the Y direction, contrary to the above. In this case, instead of reversing the direction, it can be expressed by the reciprocal of each of the equations (1A) to (1Ab).

2-2-2. Condition (1B

The lens system IL according to the present embodiment need not be a bright optical system. The lens system IL according to the present embodiment may be a telephoto optical system alternatively or additionally to the lens system IL.

A condition (1B) is that the freeform surfaces of all the freeform lenses located closer to the object side than the diaphragm A in the lens system IL satisfy conditional expression (1B) given below.

$$0.0075 < \left| \frac{\sum_{k=1}^{N} \{(SAG1_k - SAG2_k) \times \Delta nd_k\}}{Y2 \times \tan\Theta 1} \right| \quad (1B)$$

In the conditional expression (1B) given above, Y2 is the image height in the second direction. Θ1 is the total angle of view in the first direction. N is the total number of freeform surfaces located on the object side (i.e., −Z side) of the diaphragm A. Note that k is a number that identifies each freeform surface located on the −Z side of the diaphragm A, and is an integer from 1 to N. Hereinafter, it is assumed that the number k is set in ascending order to the image plane side (i.e., +Z side), where the freeform surface located closest to the −Z side from among the total N freeform surfaces is represented as k=1.

The numerator on the right side of the above expression (1B) is the absolute value of the sum of the differences ($SG1_k - SG2_k$) between $SG1_k$ and $SG2_k$ below with respect to each freeform surface of the freeform lens closer to the −Z side than the diaphragm A.

$$SG1_k = SAG1_k \times \Delta nd_k$$

$$SG2_k = SAG2_k \times \Delta nd_k$$

where $SAG1_k$ is a sag amount at a reference height of a k-th freeform surface in the first direction, and indicates a representative value of a sag amount on the k-th freeform surface on the short side. The reference height of the condition (1B) is "0.4×Y1", that is, 40% of the image height Y1 in the first direction. $SAG2_k$ is a representative value of a sag amount on the k-th freeform surface on the long side, and is a sag amount at a height of 0.4×Y1 in the second direction. $\Delta nd_k$ is a difference resulting from subtracting a refractive index on the −Z side of the k-th freeform surface from a refractive index on the +Z side of the k-th freeform surface.

$SG1_k$ indicates the tendency of power in the YZ cross-section of the lens according to a sag amount $SAG1_k$ of the k-th freeform surface in the first direction. $SG2_k$ indicates the tendency of power in the XZ cross-section according to a sag amount $SAG2_k$ of the same freeform surface in the second direction. $SG1_k$ and $SG2_k$ will be described with reference to FIG. 18.

Figure 18:
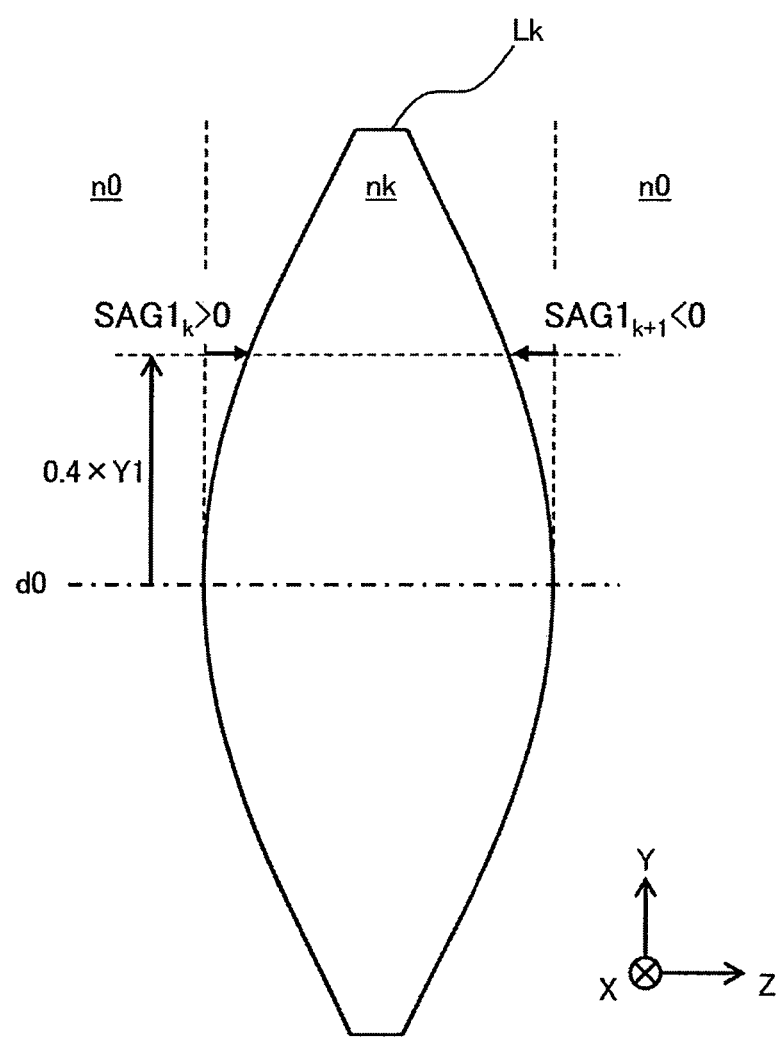
FIG. 18 is a diagram for explaining sag amounts under various conditions of the lens system.

FIG. 18 illustrates the YZ cross-section of a lens element Lk having a k-th freeform surface on the −Z side and a (k+1)th freeform surface on the +Z side. FIG. 18 illustrates a case where the lens element Lk has a biconvex shape as a whole and produces positive power on both surfaces. In this case, the sag amount $SAG1_k$ on the −Z side surface of the lens element Lk is positive as shown in FIG. 18. The refractive index on the +Z side of the same surface is a refractive index nk based on the material of the lens element Lk, and the refractive index on the −Z side is a refractive index n0 based on air or the like. Therefore, the difference $\Delta nd_k$ between the refractive index nk on the +Z side and the refractive index n0 on the −Z side of this surface is positive, and $SG1_k = SAG1_k \times \Delta nd_k > 0$ is established.

Further, the sag amount $SAG1_{k+1}$ on the +Z side surface of the lens element Lk is negative as shown in FIG. 18. Thus, the difference $\Delta nd_{k+1}$ between the refractive indexes n0 and nk on the −Z side and on the +Z side of the same surface is negative, that is, has a sign opposite to the sign of $\Delta nd_k$. Therefore, $SG1_{k+1} = SAG1_{k+1} \times \Delta nd_{k+1} > 0$ is established.

As described above, the sign of $SG1_k$ corresponds to the sign of the power in the YZ cross-section regardless of whether the corresponding freeform surface is on the +Z side or on the −Z side of the lens element Lk. The same applies to the sign of $SG2_k$ on the XZ cross-section.

In the freeform surface, a difference occurs between $SG1_k$ and $SG2_k$ depending on the difference between the sag amount $SAG1_k$ in the first direction and the sag amount $SAG2_k$ in the second direction. When the difference ($SG1_k - SG2_k$) is negative, the corresponding freeform surface tends to increase the power negatively in the YZ cross-section rather than in the XZ cross-section of the lens element Lk, that is, in the first direction rather than in the second direction.

In view of the above, according to satisfying the condition (1B), the freeform surfaces of the lens system IL located closer to the −Z side than the diaphragm A as a whole can increase the power in one of the first and second directions. Therefore, according to the condition (1B), an image magnified in one direction can be obtained in the lens system IL.

Furthermore, according to the condition (1B), the sum of the differences $(SG1_k-SG2_k)$ as described above is normalized by the image height Y2 in the second direction, and a total angle of view 81 in the first direction is introduced, in consideration of a telephoto optical system in which the total angle of view 81 is relatively small. The telephoto optical system would require such a control that the height of a light ray does not increase excessively, increasing the difficulty of optical design. Accordingly, it is conceivable that the number of lenses increases and the optical system becomes large in order to obtain the desired performance. In contrast to this, according to the condition (1B), it is possible to obtain the ability to magnify an image in one direction even with the telephoto optical system.

Figure 16D:
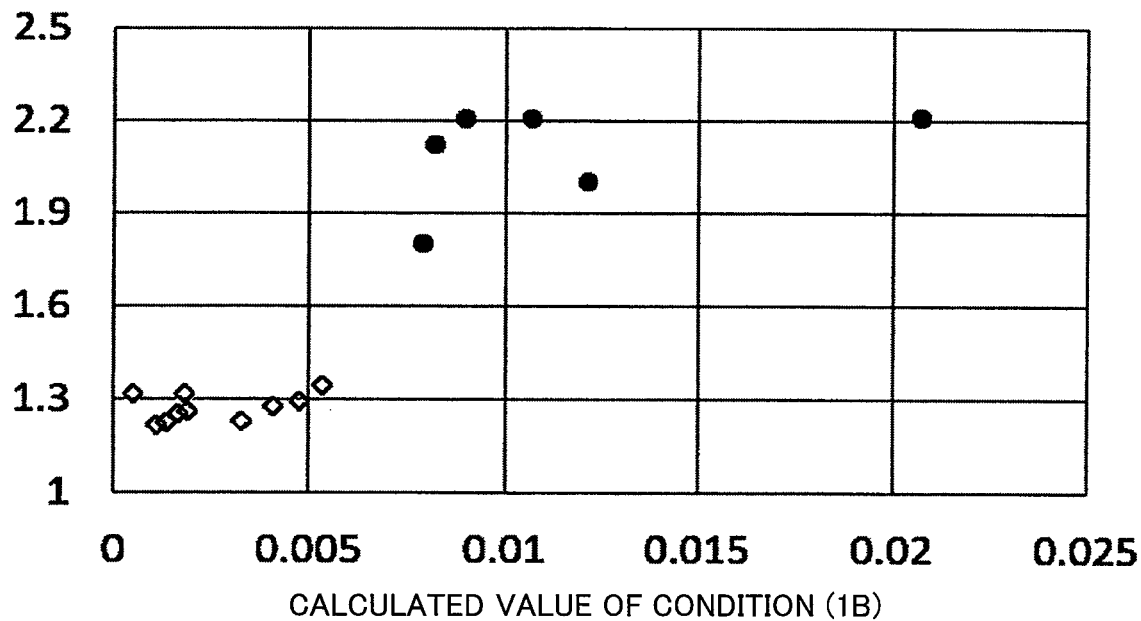
FIG. 16D is a graph showing the relationship between the image magnification ratio and a conditional expression (1B) according to the first embodiment.
Figure 17:
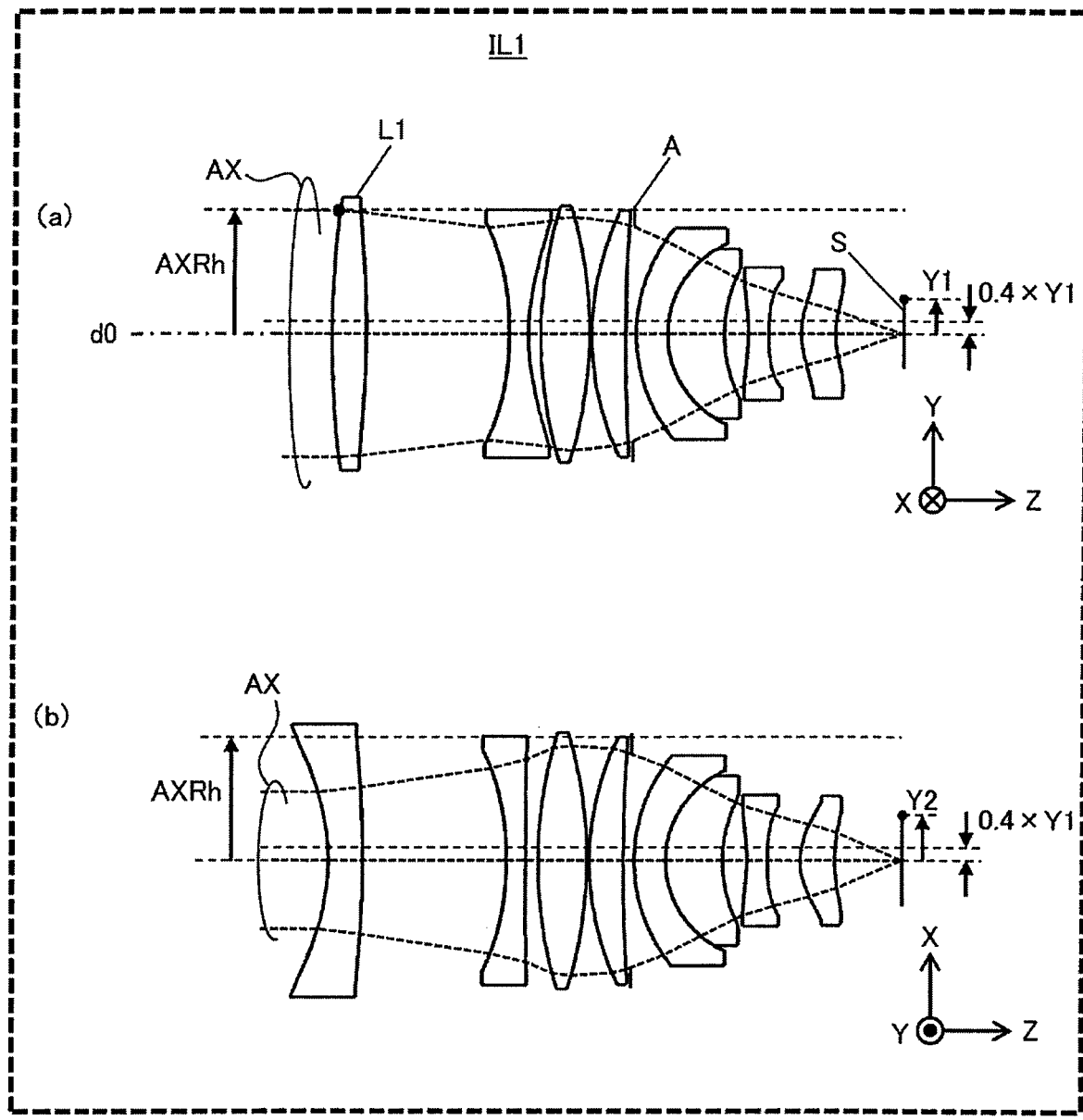
FIG. 17 is a ray diagram for explaining a reference height under various conditions of the lens system.

FIG. 16D illustrates the relationship between the image magnification ratio M and the conditional expression (1B). The vertical axis of FIG. 16D represents the image magnification ratio M, and the horizontal axis represents the calculated value on the left side of the conditional expression (1B). In this case, "•" indicates the numerical value calculated in each example in the present application, and "◊" indicates the numerical value in the example of Patent Document 2. Referring to FIG. 16D, with the calculated value of the conditional expression (1B) being around "0.0075", the image magnification ratio M changes intermittently. Therefore, it is clear that satisfying the condition (1B) facilitates to obtain the effect of image magnification.

Regarding the condition (1B) given above, an upper limit value may be set as in, the following expression (1Ba), for example.

$$0.0075 < \left| \frac{\sum_{k=1}^{N} \{(SAG1_k - SAG2_k) \times \Delta nd_k\}}{Y2 \times \tan\Theta1} \right| < 5 \quad (1Ba)$$

Above the upper limit of the above expression (1Ba), manufacturing may be difficult. Also in this case, the so-called ast described above may be unacceptable. On the other hand, below the lower limit of the condition (1B), the effect of magnifying the image may be reduced or the angle may be widened. Alternatively, in order to keep the angle of view of the optical system together with the effect of magnifying the image, it is necessary to make a freeform lens located closer to the image plane side than the diaphragm to magnify the image. This makes the occurrence of curvature of field or astigmatism unacceptable.

Thus, according to the condition (1Ba), it is possible to magnify an image in one direction with avoiding the difficulty of manufacturing even in the telephoto optical system. Such an effect is more remarkable when the lens system IL satisfies the following expression (1Bb).

$$0.0075 < \left| \frac{\sum_{k=1}^{N} \{(SAG1_k - SAG2_k) \times \Delta nd_k\}}{Y2 \times \tan\Theta1} \right| < 0.5 \quad (1Bb)$$

2-2-3. Conditions (2) to (7)

A condition (2) is defined by the following conditional expression (2) based on the image height Y1 in the first direction and the maximum height AXRh of the axial ray AX.

$$2 < AXRh/Y1 < 5 \quad (2)$$

Below the lower limit of the condition (2) given above, the lens system IL may be a dark optical system, and the light amount may be insufficient to be used for the above detection application, for example. Alternatively, the image height Y1 may be so high that the occurrence of astigmatism or curvature of field is unacceptable. On the other hand, above the upper limit of the conditional expression (2), the height of the light ray may be so high that it is difficult to correct spherical aberration and coma aberration. According to the condition (2), it is possible to correct the aberration with ensuring the light amount in the lens system IL. Such an effect is more remarkable when the following expression (2a) is satisfied.

$$2.5 < AXRh/Y1 < 4 \quad (2a)$$

A condition (3) is that the freeform lens located closest to the object side among the lenses closer to the object than the diaphragm A in the lens system IL has a freeform surface satisfying conditional expression (3) given below on the surface on the object side.

$$0.005 < (FSAG1 - FSAG2)/AXRh < 0.015 \quad (3)$$

In the expression (3) given above, FSAG1 is the sag amount at the height AXRh of the axial ray AX in the first direction. FSAG2 is the sag amount at the height AXRh of the axial ray AX in the second direction.

Below the lower limit of the condition (3) given above, the performance difference between the first direction and the second direction may be so small that the effect of magnifying an image in one direction is reduced. Alternatively, the height AXRh of the axial ray AX may be so high that the occurrence of spherical aberration or coma is unacceptable. Above the upper limit of the condition (3), the lens system IL may be a dark optical system with the light amount being insufficient to be used for the above detection application, for example. Alternatively, the so-called ast described above may be unacceptable.

According to the condition (3), an image can be magnified in one direction with ensuring the light amount in the lens system IL. Such an effect is more remarkable when the following expression (3a) is satisfied.

$$0.009 < (FSAG1 - FSAG2)/AXRh < 0.0014 \quad (3a)$$

A condition (4) is defined by the following conditional expression (4) based on the image height Y1 in the first direction and the image height Y2 in the second direction.

$$1 < (Y1/Y2) \times |\tan\theta2/\tan\theta1| < 4 \quad (4)$$

In the expression (4) given above, θ1 is the angle of view in the first direction, and θ2 is the angle of view in the second direction. The respective angles of view θ1 and θ2 are half angles of view, for example.

Below the lower limit of the condition (4) given above, the performance difference between the first direction and the second direction may be so small that the effect of magnifying an image in one of the two directions is reduced. Alternatively, in order to keep the effect of magnifying the image, it may be necessary to increase the refractive index of the freeform lens. This makes the occurrence of curvature of field or astigmatism unacceptable. Above the upper limit of the condition (4), the image will be reduced in the remaining one direction, resulting in a decrease in resolution. Alternatively, for keeping the resolution, the occurrence of spherical aberration may be unacceptable.

According to the condition (4), it is possible to magnify an image in one direction with avoiding a decrease in resolution. Such an effect is more remarkable when the following expression (4a) is satisfied.

$$2 < (Y1/Y2) \times |\tan\theta 2/\tan\theta 1| < 3.5 \quad (4a)$$

A condition (5) is defined by the following conditional expression (5) based on the maximum height AXRh of the axial ray AX of the lens system IL.

$$0.050 < AXRh/OAL < 0.350 \quad (5)$$

In the expression (5) given above, OAL is the total optical length of the lens system IL.

Below the lower limit of the condition (5) given above, the lens system IL may be a dark optical system, resulting in insufficiency of the light amount to be used for the above detection application, for example. Alternatively, the total optical length may be so long that the occurrence of curvature of field is unacceptable. Above the upper limit of the condition (5), the height of the light ray may be so high that it is difficult to correct spherical aberration and coma aberration. According to the condition (5), it is possible to correct the aberration with ensuring the light amount in the lens system IL. Such an effect is more remarkable when the following expression (5a) is satisfied.

$$0.100 < AXRh/OAL < 0.250 \quad (5a)$$

A condition (6) is defined by conditional expression (6) given below.

$$0.30 < FFN/FBN < 3.00 \quad (6)$$

In the expression (6) given above, FFN is the number of freeform lenses closer to the object than the diaphragm A in the lens system IL. FBN is the number of freeform lenses closer to the image plane than the diaphragm A.

Below the lower limit of the condition (6) given above, increasing the number of freeform surfaces behind the diaphragm A may cause enlarging the outer diameter of the lens, in order to obtain the effect of unidirectional magnification. This causes an increase in size and cost. In addition, the occurrence of curvature of field or astigmatism may be unacceptable. Above the upper limit of the condition (6), it may be difficult to correct various aberrations in the lens system IL, especially spherical aberration. According to the condition (6), it is possible to correct various aberrations with avoiding an increase in size and cost. Such an effect is more remarkable when the following expression (6a) is satisfied.

$$0.50 < FFN/FBN < 1.00 \quad (6a)$$

A condition (7) is defined by the following conditional expression (7) based on the summation for the freeform surfaces of the freeform lenses located closer to the object than the diaphragm A, similarly to the condition (1B).

$$0.001 < \left| \frac{\sum_{k=1}^{N} \{(sag1_k - sag2_k) \times \Delta nd_k\}}{AXRh} \right| < 5.000 \quad (7)$$

The sum of the expression (7) given above is calculated within the same range as the conditional expression (1B). Note that $sag1_k$ is a sag amount at a position where a height of a k-th freeform surface in the first direction is 40% of AXRh. Note that $sag2_k$ is a sag amount at a position where a height of a k-th freeform surface in the second direction is 40% of AXRh.

Below the lower limit of the condition (7) given above, the performance difference between the first direction and the second direction may be small, resulting in reduction of the effect to magnify an image in one direction. Alternatively, the height of the light ray may be so high that it is difficult to correct spherical aberration and coma aberration. Above the upper limit of the condition (7), the lens system IL be a dark optical system, resulting in the insufficiency of the light amount to be used for the above detection application, for example. Alternatively, the occurrence of curvature of field or astigmatism may be unacceptable. According to the condition (7), it is possible to magnify an image in one direction with ensuring the light amount in the lens system IL and enabling the correction of aberrations. Such an effect is more remarkable when the following expression (7a) is satisfied.

$$0.002 < \left| \frac{\sum_{k=1}^{N} \{(sag1_k - sag2_k) \times \Delta nd_k\}}{AXRh} \right| < 0.500 \quad (7a)$$

2-2-4. Further Conditions

The lens system IL according to the present embodiment may satisfy the following conditions additionally or alternatively to the above conditions.

Figure 19:
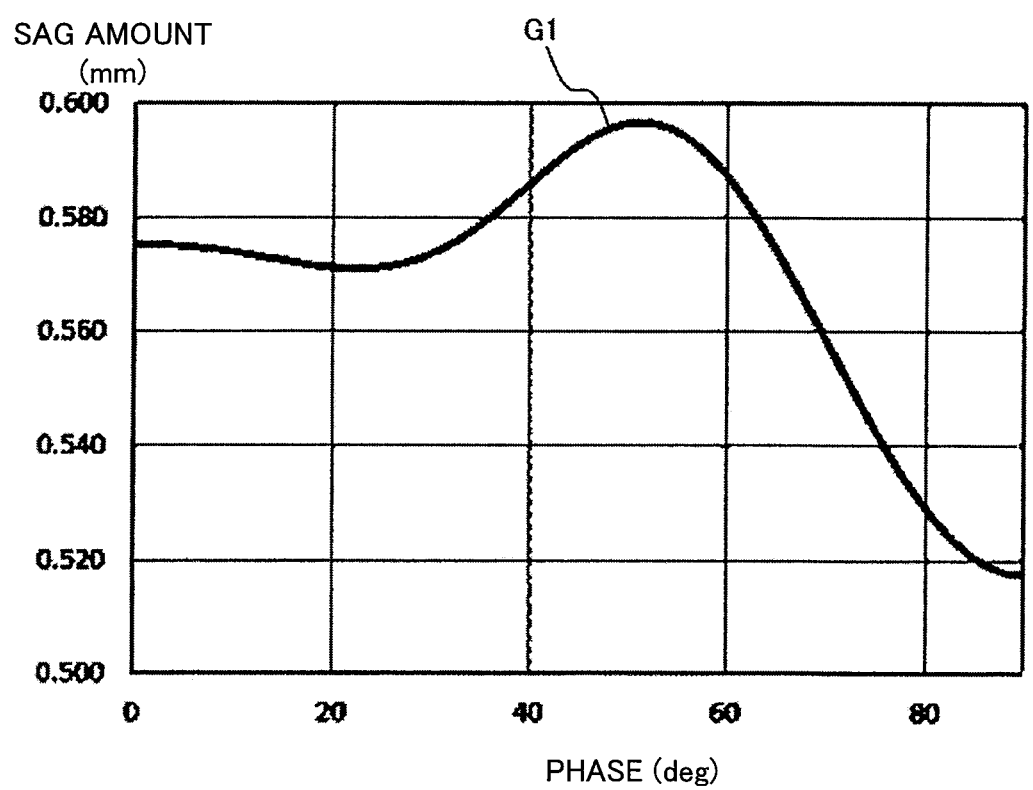
FIG. 19 is a graph showing the relationship between a phase direction and the sag amount in the lens system according to the first numerical example.

In the lens system IL according to the present embodiment, the freeform lens arranged closer to the image plane than the diaphragm A may have a freeform surface whose sag amount at a predetermined reference height has an extreme value in a phase direction different from the first and second directions. FIG. 19 illustrates the relationship between each phase direction and the sag amount in the lens system IL1 according to the first numerical example.

FIG. 19 illustrates a graph G1 of the sag amount of the freeform surface on the image plane side of the eighth lens element L8 in the lens system IL1 according to the first numerical embodiment. In the graph G1 of FIG. 19, the vertical axis indicates the sag amount with 50% of the maximum height AXRh of the axial ray AX as a reference height. The horizontal axis indicates the phase direction around the optical axis d0 by "deg", with 0 deg and 90 deg corresponding to the first and second directions. According to the graph G1, this freeform surface has an extreme value in a phase direction other than the first and second directions. The freeform surface having such a shape with a high degree of freedom facilitates to obtain a magnifying effect between the first direction and the second direction and improves the effect of aberration correction.

In the lens system IL according to the present embodiment, the number of lens elements may be five or more. This makes it possible to appropriately perform aberration correction and obtain fine imaging performance. In the lens system IL according to the present embodiment, the F value of the diaphragm A may be smaller than 2.8. This makes it possible to obtain a bright optical system and improve the performance of the above detection application. The lens system IL according to the present embodiment may be configured to form an image of light having a wavelength of 900 nm or more. This makes it possible to ensure the detection performance with avoiding the influence on the human eye, especially at night.

In the present embodiment, the first direction and the second direction intersecting each other in the lens system IL may be orthogonal to each other. This makes it easy to utilize a rectangular sensor such as the imaging element 12. The first direction may correspond to the short side or the vertical direction of the imaging element 12, and the second direction may correspond to the long side or the horizontal direction of the imaging element 12. This makes it easy to use the lens system for an application which requires to vertically magnify the central portion excluding an unnecessary image-capturing area in the vertical direction.

The lens system IL according to the present embodiment is not limited to the lens system IL1 in the first example described above and can be implemented in various forms. Second to sixth examples of the lens system IL will be described below.

2-3. Second Example

A lens system IL2 according to the second example will be described with reference to FIGS. 20 to 33.

Figure 20:
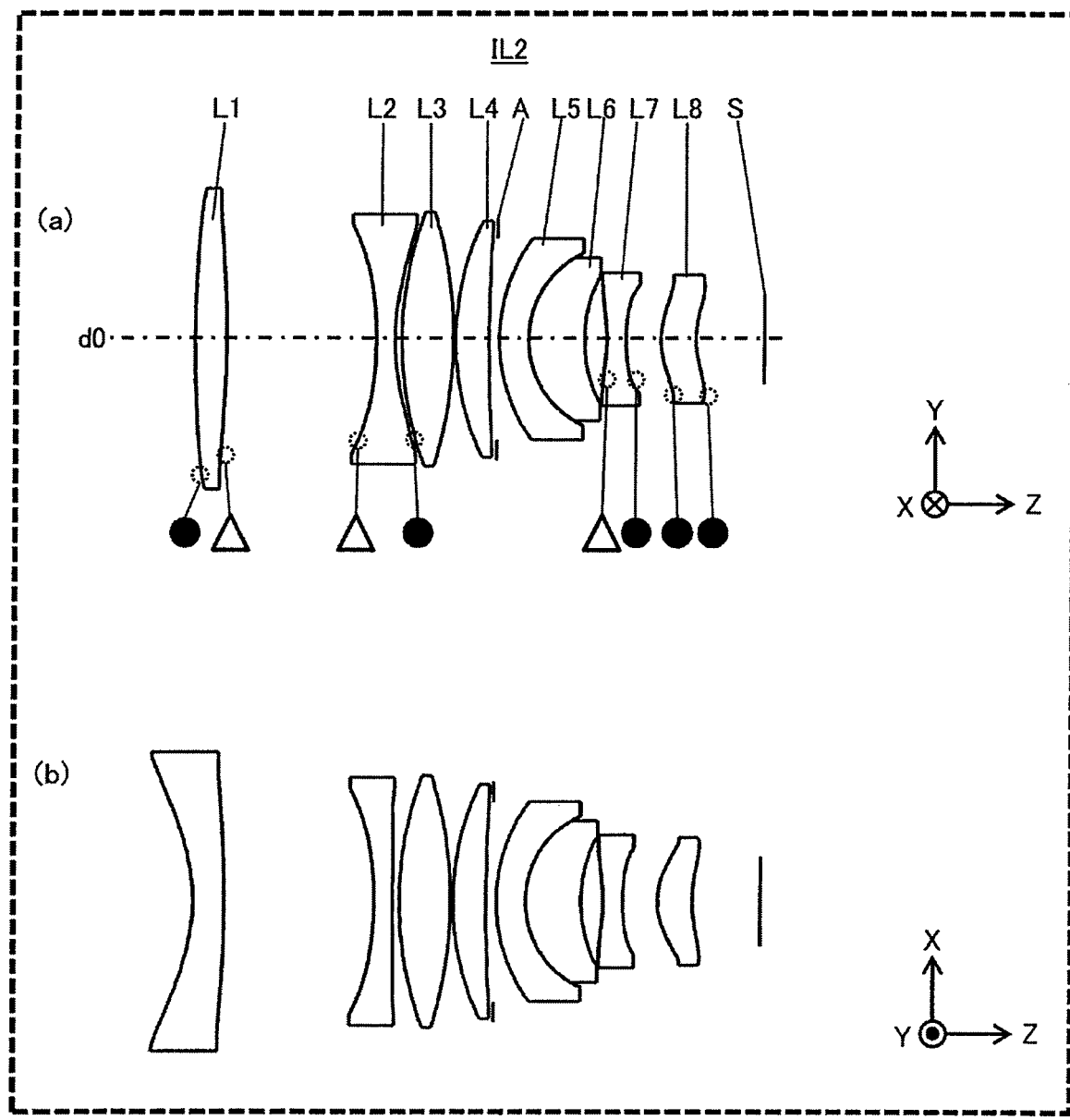
FIG. 20 is a lens layout diagram showing a configuration of a lens system according to a second example.
Figure 31:
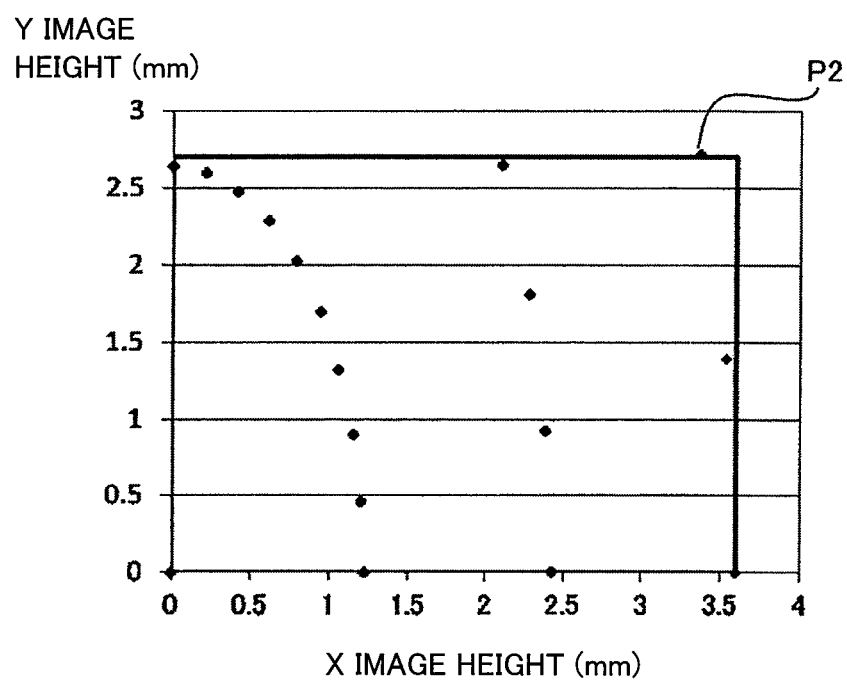
FIG. 31 is a scatter plot showing the relationship between angle of view and an image point in the lens system according to the second numerical example.

FIG. 20 shows the configuration of the lens system IL2 according to the second example. FIGS. 20(*a*) and (*b*) are diagrams showing lens arrangement of the lens system IL2, similarly to FIGS. 3(*a*) and (*b*).

The lens system IL2 according to the second example has the same configuration as that of the first example, but the shapes of various lens elements L1 to L8 are changed. Similar to the first example, the freeform lenses in the lens system IL2 according to the present example are two lenses closer to the object than a diaphragm A and two lenses closer to the image plane side than the diaphragm A. FIGS. 21 to 30 show a numerical example corresponding to the lens system IL2 according to the second example.

FIG. 21 is a diagram showing surface data of the lens system IL2 according to the second numerical example. FIG. 22 is a diagram showing various kinds of data of the lens system IL2 according to the present example. FIGS. 21 and 22 show respective data as in FIGS. 5 and 6 according to the first numerical example.

FIG. 23 is a diagram showing freeform surface data of a first surface s1 in the lens system IL2 according to the present example. Similarly to the first numerical example, this freeform surface data indicates various coefficients of the equation (E1) for the object side surface of a first lens element L1.

FIGS. 24 and 25 are diagrams showing aspherical surface data of second and third surfaces s2 and s3 in the lens system IL2 according to the present example. Similarly to the first numerical example, each aspherical surface data indicates various coefficients of the equation (E2) for the image plane side surface of the first lens element L1 and the object side surface of a second lens element L2.

FIG. 26 is a diagram showing freeform surface data of a fourth surface s4 in the lens system IL2 according to the present example. Similarly to the first numerical example, the freeform surface data in FIG. 26 indicates various coefficients of the equation (E1) for the image plane side surface of the second lens element L2.

FIG. 27 is a diagram showing aspherical surface data of a 13th surface s13 in the lens system IL2 according to the present example. Similarly to the first numerical example, this aspherical surface data indicates various coefficients of the equation (E2) for the object side surface of a seventh lens element L7.

FIGS. 28 to 30 are diagrams showing freeform surface data of 14th to 16th surfaces s14 to s16 in the lens system IL2 according to the present example. Similarly to the first numerical example, each freeform surface data indicates various coefficients of the equation (E1) for the image plane side surface of the seventh lens element L7 and both the surfaces of an eighth lens element L8.

Figure 32:
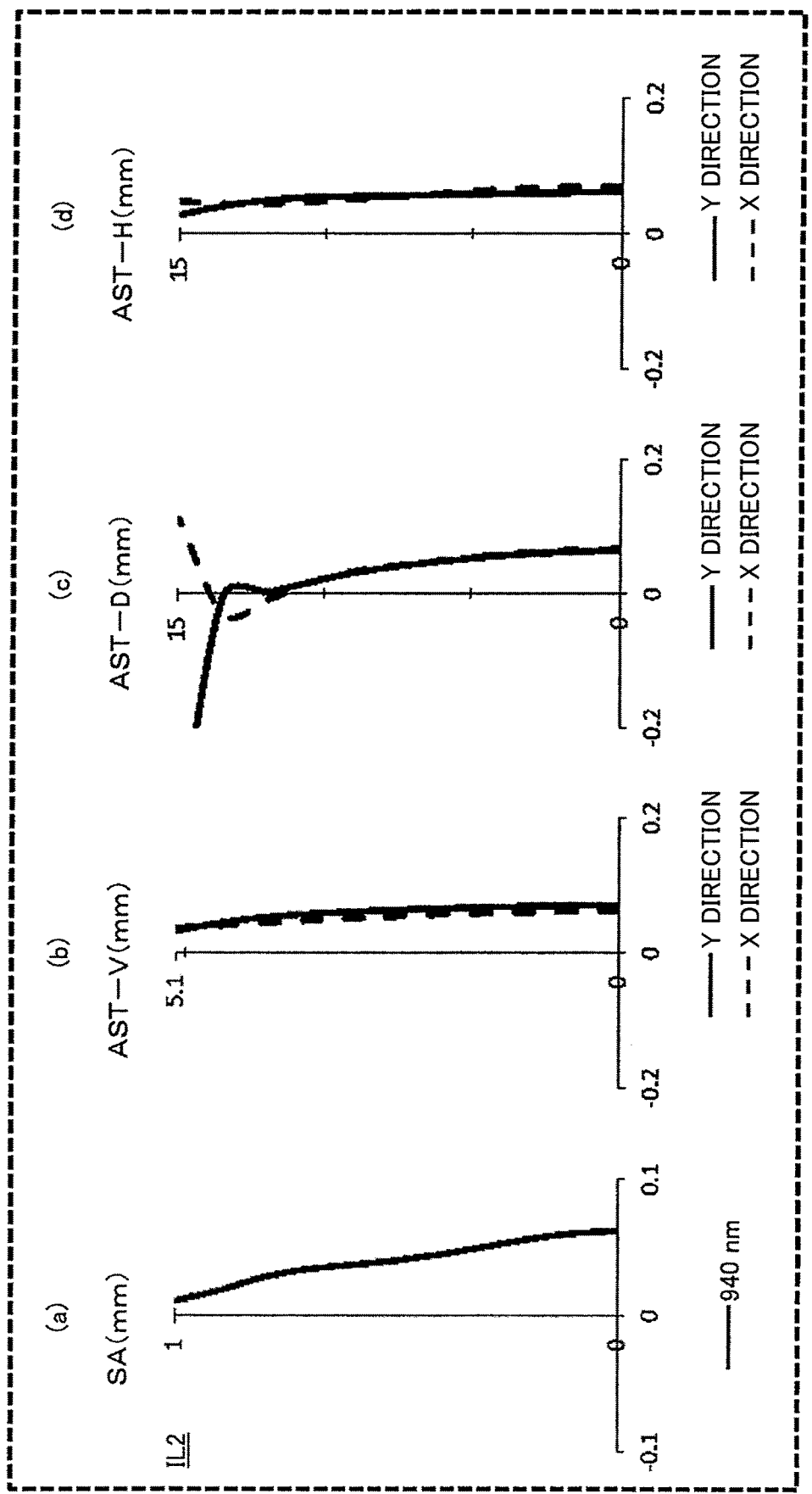
FIG. 32 is an aberration diagram showing various aberrations of the lens system according to the second numerical example.

Based on the second numerical example described above, FIG. 31 shows the relationship between angle of view and an image point P2 in the lens system IL2 according to the present example. FIG. 32 shows various aberrations of the lens system IL2 according to the present example. FIGS. 32(*a*), (*b*), (*c*), and (*d*) are aberration diagrams of the lens system IL2 according to the present example, similarly to FIGS. 15(*a*) to (*d*).

Figure 33:
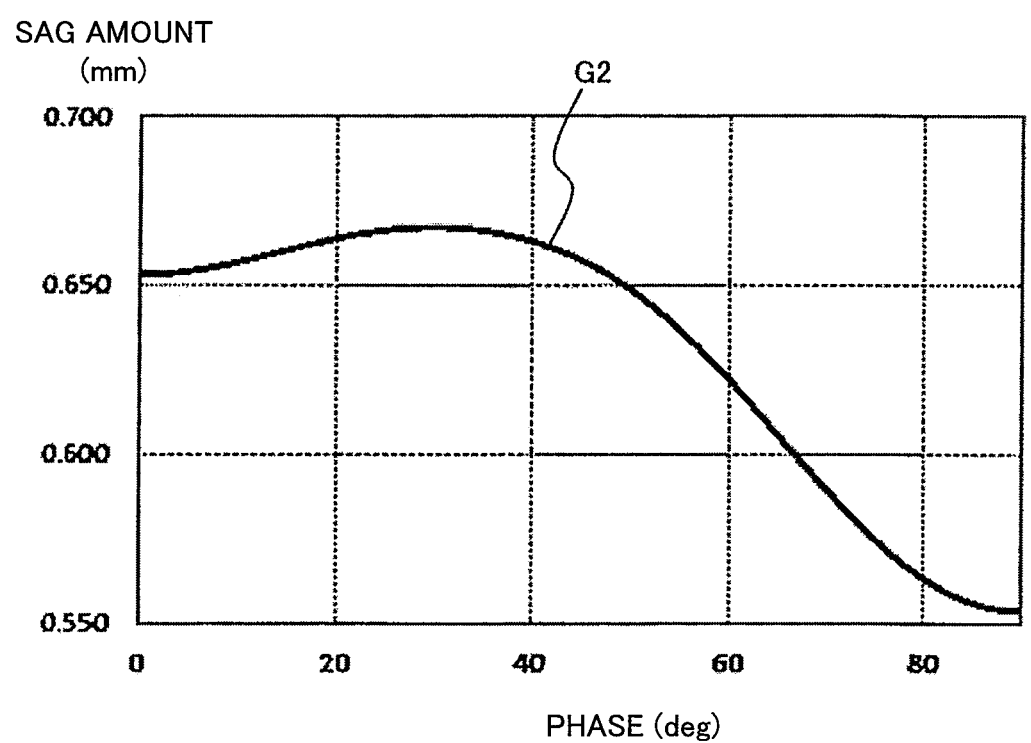
FIG. 33 is a graph showing the relationship between a phase direction and a sag amount in the lens system according to the second numerical example.

FIG. 33 illustrates the relationship between a phase direction and a sag amount in the lens system IL2 according to the second numerical example. FIG. 33 shows a graph G2 of the sag amount of the image plane side freeform surface of the eighth lens element L8 in the lens system IL2 according to the second numerical example in the same manner as in FIG. 19. The lens system IL2 of this embodiment can also magnify an image in one direction as in the first example.

2-4. Third Example

The third example describes an example of a lens system IL in which single freeform lens is located closer to the object than a diaphragm A. A lens system IL3 according to the third example will be described with reference to FIGS. 34 to 47.

Figure 34:
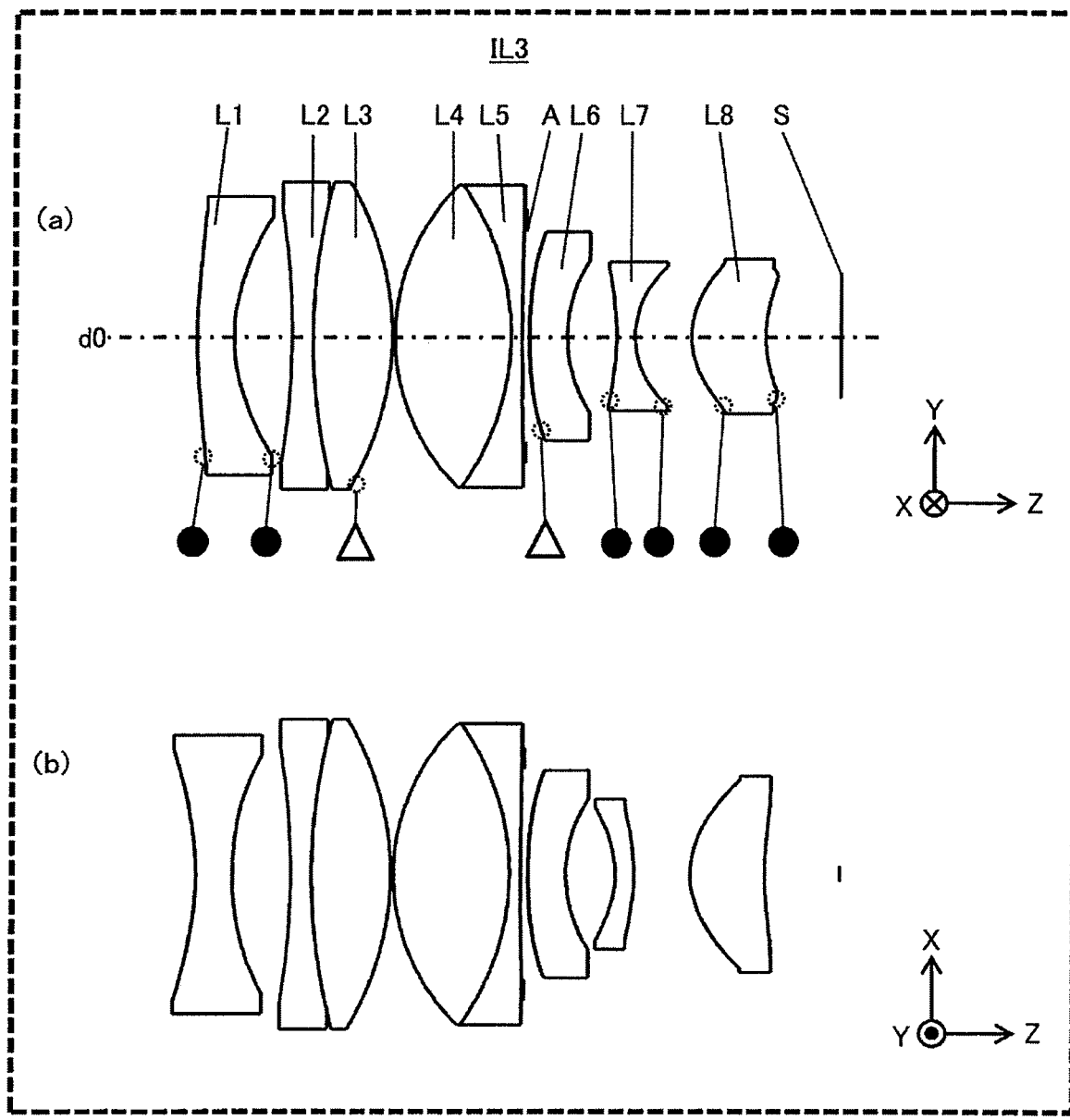
FIG. 34 is a lens layout diagram showing a configuration of a lens system according to a third example.
Figure 45:
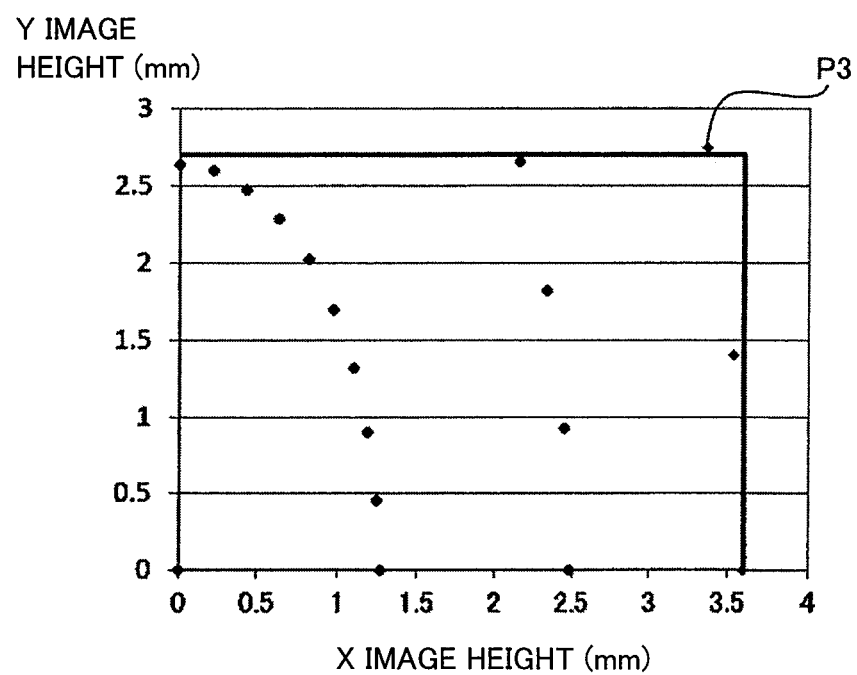
FIG. 45 is a scatter plot showing the relationship between angle of view and an image point in the lens system according to the third numerical example.

FIG. 34 shows the configuration of the lens system IL3 according to the third example. FIGS. 34(*a*) and (*b*) are diagrams showing lens arrangement of the lens system IL3, similarly to FIGS. 3(*a*) and (*b*).

The lens system IL3 according to the third example includes first to eighth lens elements L1 to L8, which are sequentially arranged as in the first example, and a diaphragm A located between the fifth and sixth lens elements L5 and L6. In the lens system IL3 according to the present example, the freeform lens located closer to the object side than the diaphragm A is the first lens element L1, and freeform lenses located closer to the image plane than the diaphragm A is the seventh and eighth lens elements L7 and L8.

In the present example, the first lens element L1 has freeform surfaces on both sides. The freeform surface on the object side is convex toward the object in the Y direction and convex toward the image plane in the X direction. The freeform surface on the image plane side is convex toward the object in the X and Y directions so that the negative power is stronger in the Y direction than in the X direction, for example.

The second lens element L2 is a biconcave spherical lens and is joined to the third lens element L3. The third lens element L3 is biconvex, has a spherical surface on the object side, and has an aspherical surface on the image plane side. The fourth lens element L4 is a biconvex spherical lens and is joined to the fifth lens element L5. The fifth lens element L5 is a biconcave spherical lens. The sixth lens element L6 has a convex negative meniscus shape on the object side, with an aspherical surface on the object side and a spherical surface on the image plane side.

For example, the seventh lens element L7 has freeform surfaces on both sides. The freeform surface on the object side is convex toward the image plane in the X and Y directions so that the negative power is stronger in the X direction than in the Y direction, for example. The freeform surface on the image plane side is convex toward the object in the Y direction and convex toward the image plane in the X direction.

For example, the eighth lens element L8 has freeform surfaces on both sides. The freeform surface on the object side is convex toward the object in the X and Y directions so that the positive power is stronger in the X direction than in the Y direction, for example. The freeform surface on the image plane side is convex toward the object in the X and Y directions so that the negative power is stronger in the X direction than in the Y direction, for example.

FIGS. 35 to 44 show a numerical example corresponding to the lens system IL3 according to the third example. FIG. 35 is a diagram showing surface data of the lens system IL3 according to the third numerical example. FIG. 36 is a diagram showing various kinds of data of the lens system IL3 according to the present example. FIGS. 35 and 36 show respective data as in FIGS. 5 and 6 according to the first numerical example.

FIGS. 37 and 38 are diagrams showing freeform surface data of first and second surfaces s1 and s2 in the lens system IL3 according to the present example. Similar to the first numerical example, each freeform surface data shows various coefficients of the equation (E1) for both surfaces of the first lens element L1.

FIGS. 39 and 40 are diagrams showing aspherical surface data of fifth and 10th surfaces s5 and s10 in the lens system IL3 according to the present example. Similarly to the first numerical example, each aspherical surface data indicates various coefficients of the equation (E2) for the image plane side surface of the third lens element L3 and the object side surface of the sixth lens element L6.

FIGS. 41 to 44 are diagrams showing freeform surface data of 12th to 15th surfaces s12 to s15 in the lens system IL3. FIGS. 41 to 44 show each freeform surface data on both surfaces of the seventh and eighth lens elements L7 and L8, similarly to FIG. 37.

Figure 46:
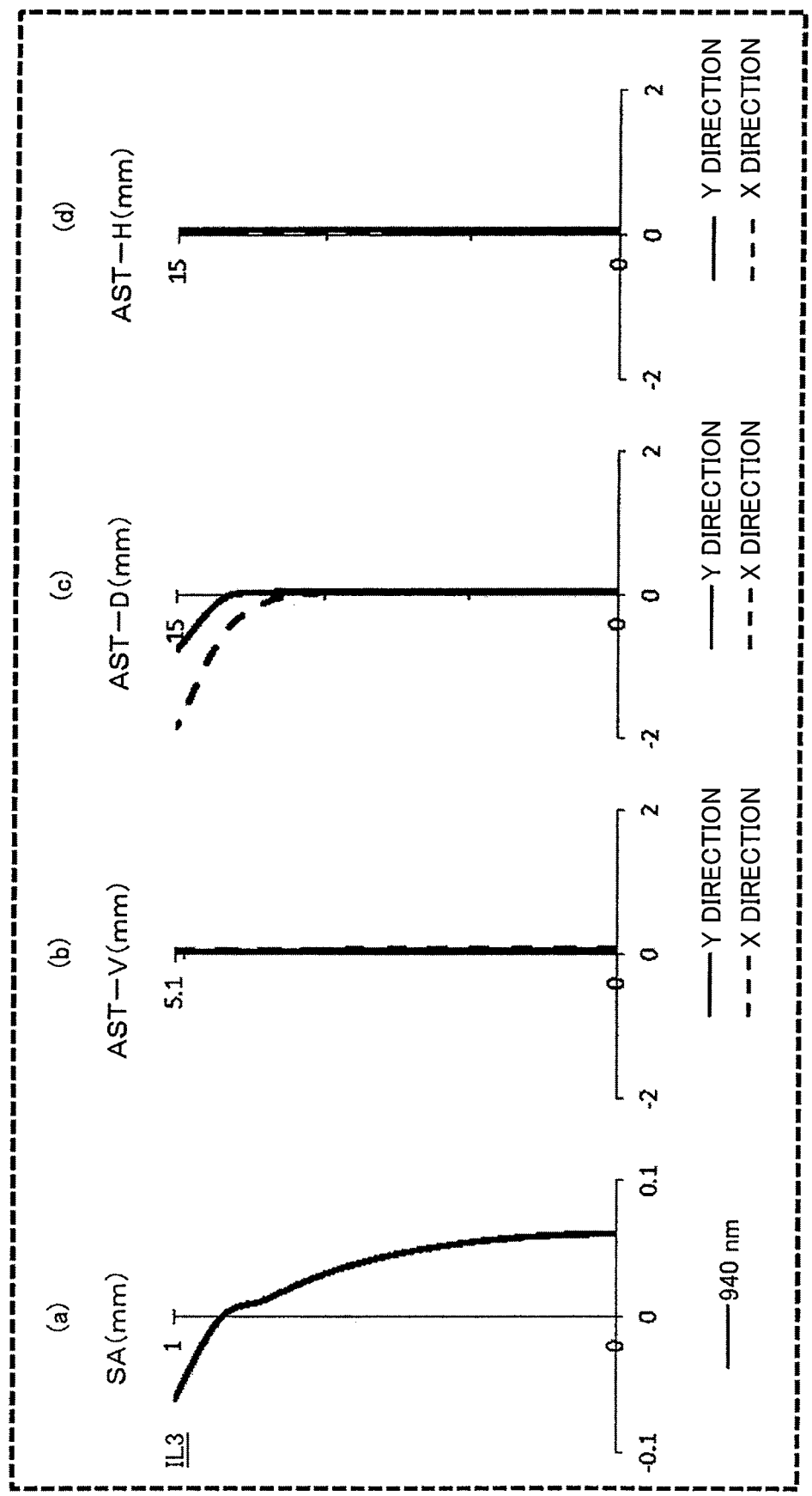
FIG. 46 is an aberration diagram showing various aberrations of the lens system according to the third numerical example.

Based on the third numerical example described above, FIG. 45 shows the relationship between angle of view and an image point P3 in the lens system IL3 according to the present example. FIG. 46 shows various aberrations of the lens system IL3 according to the present example. FIGS. 46(a), (b), (c), and (d) are aberration diagrams of the lens system IL3 according to the present example, similarly to FIGS. 15(a) to (d).

Figure 47:
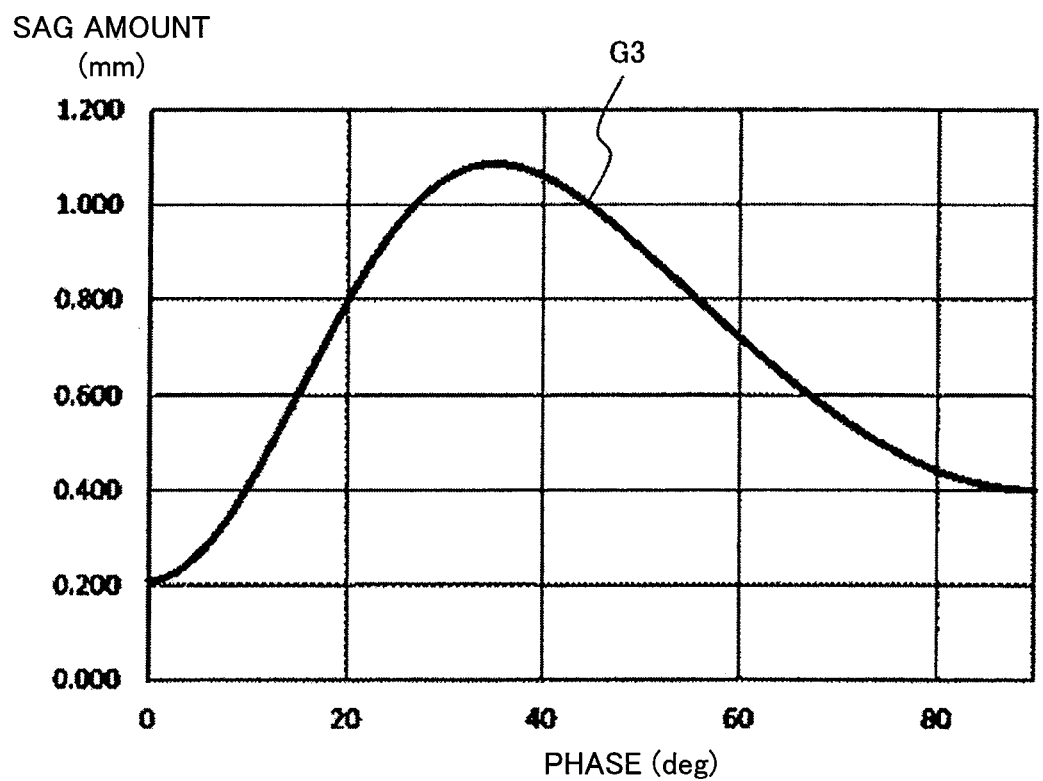
FIG. 47 is a graph showing the relationship between a phase direction and a sag amount in the lens system according to the third numerical example.

FIG. 47 illustrates the relationship between a phase direction and a sag amount in the lens system IL3 according to the third numerical example. FIG. 47 shows a graph G3 of the sag amount of the image plane side freeform surface of the eighth lens element L8 in the lens system IL3 according to the third numerical example in the same manner as in FIG. 19. The lens system IL3 according to the present example can also magnify an image in one direction as in each example described above.

2-5. Fourth Example

The fourth example describes an example of a lens system IL using no aspherical surface. A lens system IL4 according to the fourth example will be described with reference to FIGS. 48 to 61.

Figure 48:
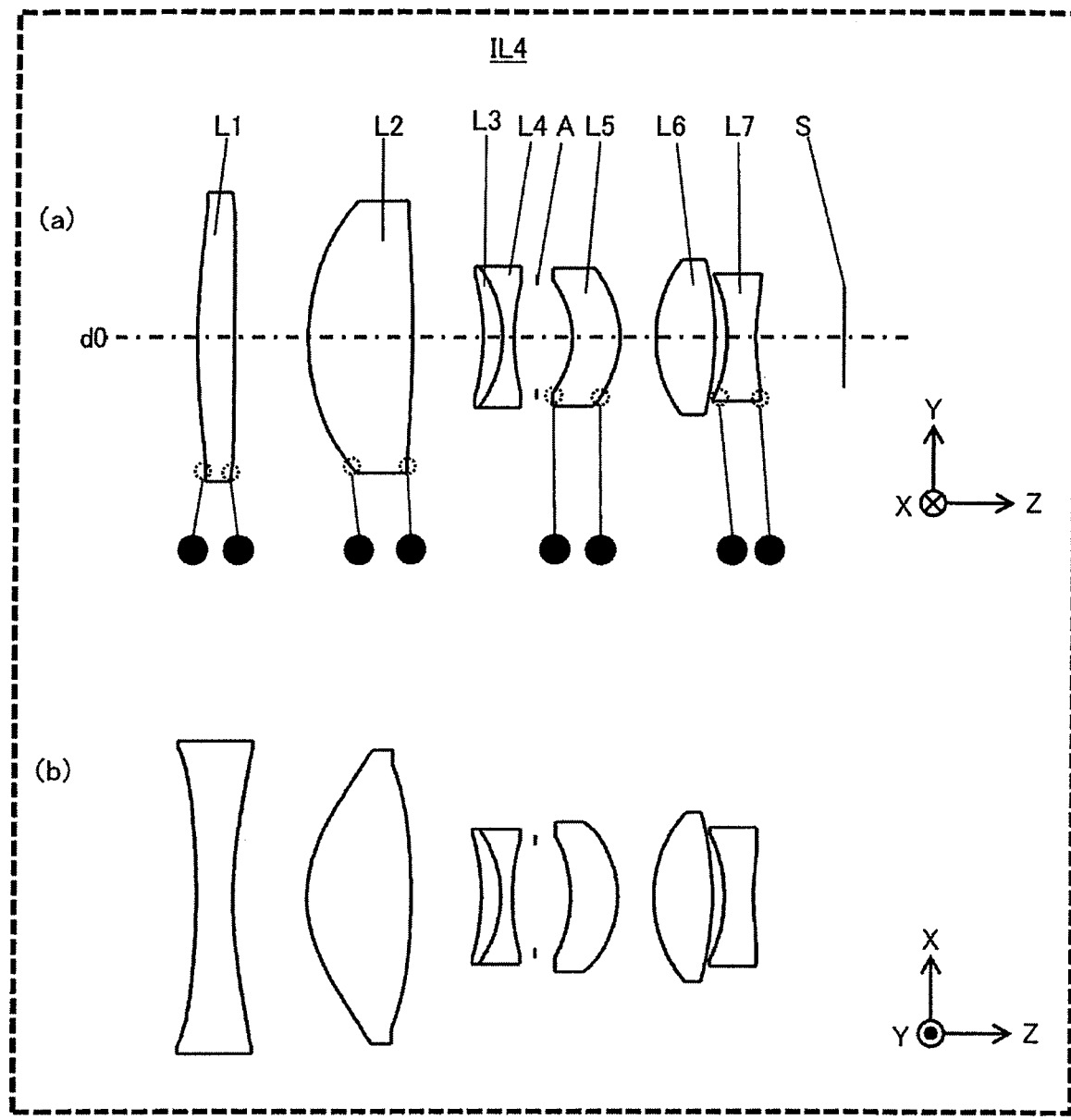
FIG. 48 is a lens layout diagram showing a configuration of a lens system according to a fourth example.
Figure 59:
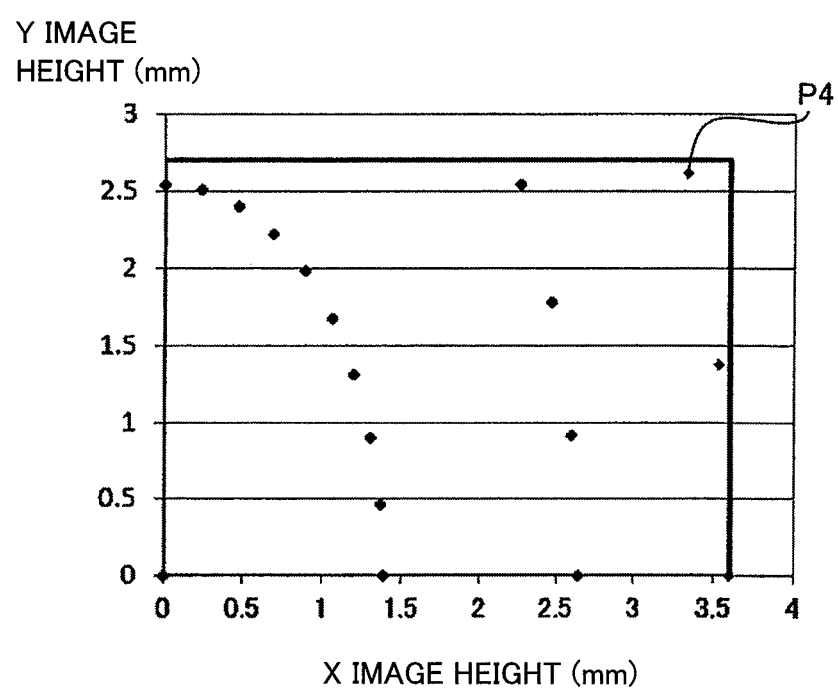
FIG. 59 is a scatter plot showing the relationship between angle of view and an image point in the lens system according to the fourth numerical example.

FIG. 48 shows the configuration of the lens system IL4 according to the fourth example. FIGS. 48(a) and (b) are diagrams showing lens arrangement of the lens system IL4, similarly to FIGS. 3(a) and (b).

The lens system IL4 according to the fourth example includes first to seventh lens elements L1 to L7, which are sequentially arranged as in the first example, and a diaphragm A located between the fourth and fifth lens elements L4 and L5. In the lens system IL4 according to the present example, the freeform lens located closer to the object than the diaphragm A is the first and second lens elements L1 and L2, and freeform lenses located closer to the image plane than the diaphragm A is the fifth and seventh lens elements L5 and L7. In the present example, each of the above freeform lenses has freeform surfaces on both sides.

In the present example, the freeform surface on the object side of the first lens element L1 is convex toward the object in the Y direction and convex toward the image plane in the X direction. The freeform surface of the first lens element L1 on the image plane side is convex toward the object so that the negative power is stronger in the X direction than in the Y direction, for example. The freeform surface of the second lens element L2 on the image plane side is convex toward the object so that the positive power is stronger in the X direction than in the Y direction, for example. The freeform surface of the second lens element L2 on the image plane side is convex toward the image plane so that the positive power is stronger in the X direction than in the Y direction, for example.

The freeform surface of the fifth lens element L5 on the object side is convex toward the image plane so that the negative power is stronger in the Y direction than in the X direction, for example. The freeform surface of the fifth lens element L5 on the image plane side is convex toward the image plane so that the positive power is stronger in the X direction than in the Y direction, for example. The freeform surface of the seventh lens element L7 on the object side is convex toward the image plane so that the negative power is stronger in the Y direction than in the X direction, for example. The freeform surface of the seventh lens element L7 on the image plane side is convex toward the object so that the negative power is stronger in the Y direction than in the X direction, for example.

FIGS. 49 to 58 show a numerical example corresponding to the lens system IL4 according to the fourth example. FIG. 49 is a diagram showing surface data of the lens system IL4 according to the fourth numerical example. FIG. 50 is a diagram showing various kinds of data of the lens system IL4 according to the present example. FIGS. 49 and 50 show respective data as in FIGS. 5 and 6 according to the first numerical example.

FIGS. 51 to 54 are diagrams showing freeform surface data of first to fourth surfaces s1 to s4 in the lens system IL4 according to the present example. Similarly to the first numerical example, each freeform surface data indicates various coefficients of the equation (E1) for both the surfaces of the first lens element L1 and the both surfaces of the second lens element L2.

FIGS. 55 to 58 are diagrams showing freeform surface data of ninth, 10th, 13th, and 14th surfaces s9 to s14 in the lens system IL4. FIGS. 55 to 58 show each freeform surface data on both surfaces of the fifth and seventh lens elements L5 and L7, similar to FIG. 51.

Figure 60:
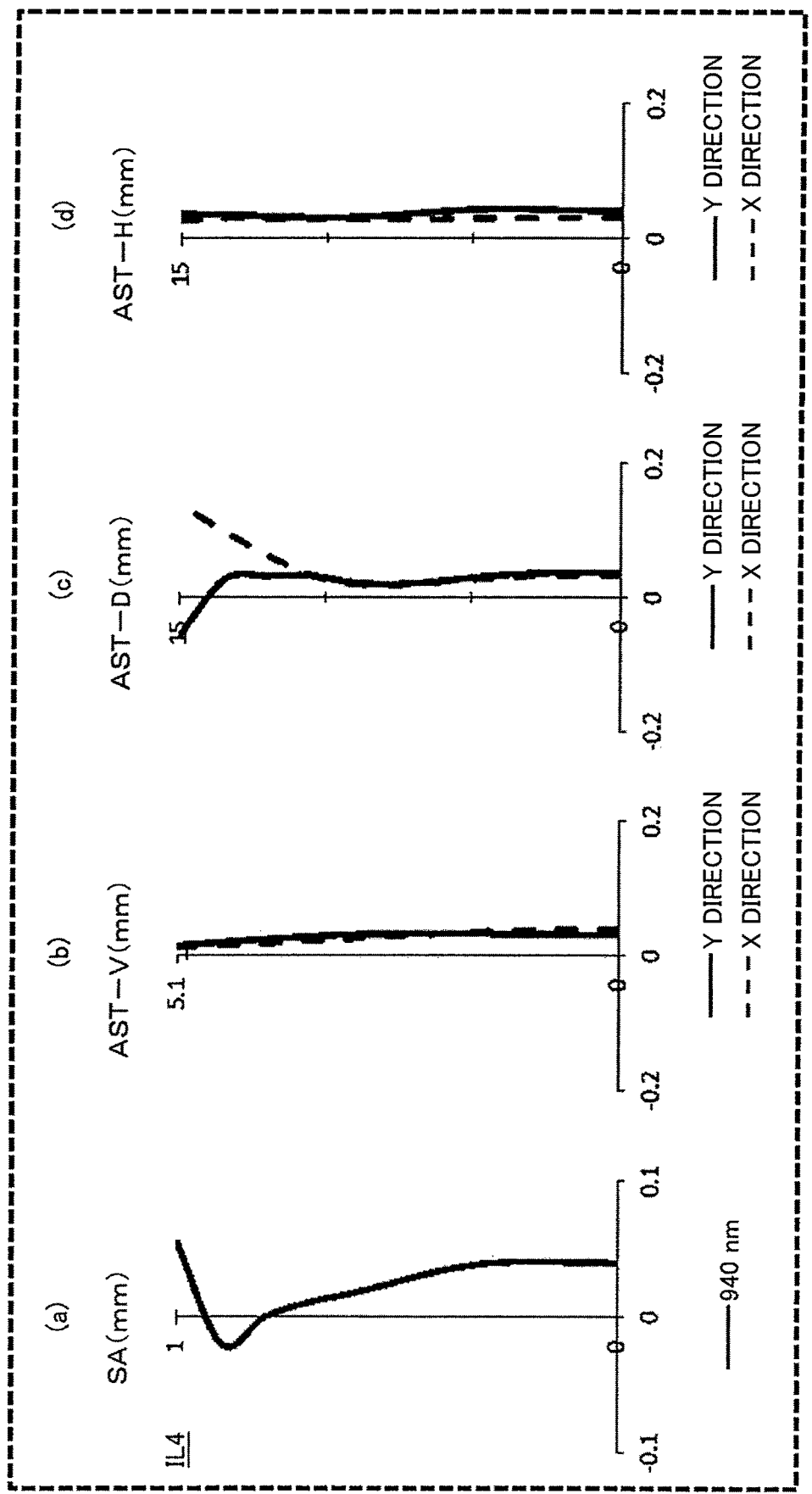
FIG. 60 is an aberration diagram showing various aberrations of the lens system according to the fourth numerical example.

Based on the fourth numerical example described above, FIG. 59 shows the relationship between angle of view and an image point P4 in the lens system IL4 according to the present example. FIG. 60 shows various aberrations of the lens system IL4 according to the present example. FIGS. 60(a), (b), (c), and (d) are aberration diagrams of the lens system IL4 according to the present example, similarly to FIGS. 15(a) to (d).

Figure 61:
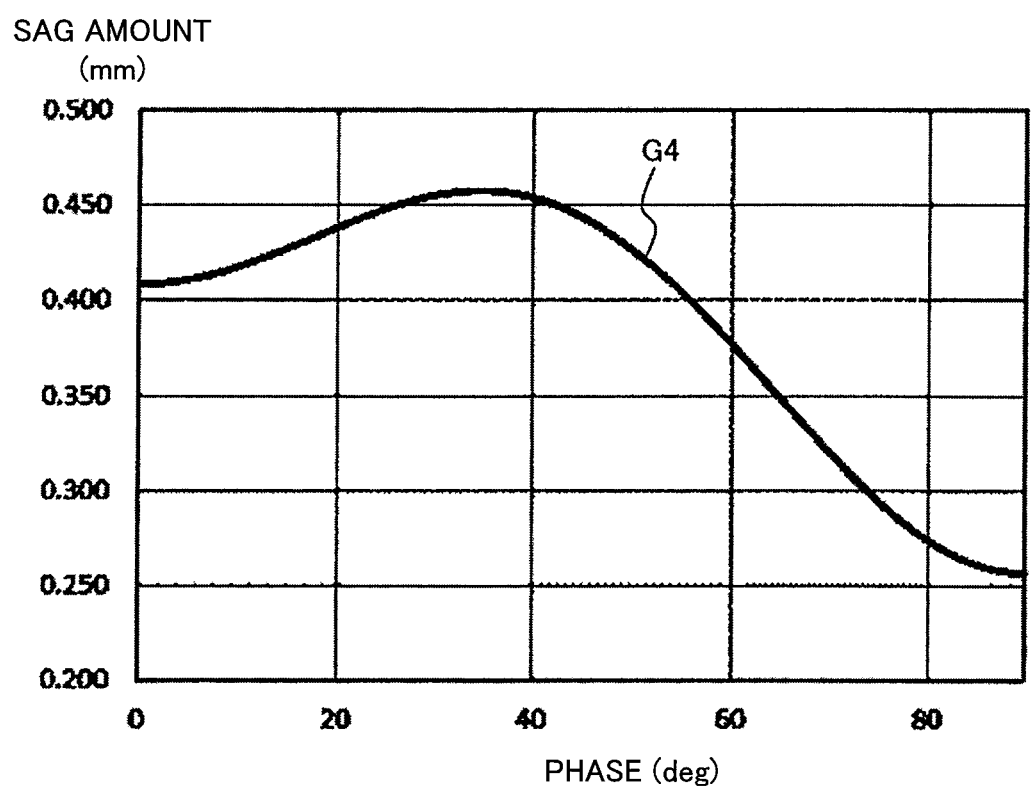
FIG. 61 is a graph showing the relationship between a phase direction and a sag amount in the lens system according to the fourth numerical example.

FIG. 61 illustrates the relationship between a phase direction and a sag amount in the lens system IL4 according to the fourth numerical example. FIG. 61 shows a graph G4 of the sag amount of the image plane side freeform surface of the seventh lens element L7 in the lens system IL4 according to the fourth numerical example in the same manner as in FIG. 19. The lens system IL4 according to the present example can also magnify an image in one direction as in each example described above.

2-6. Fifth Example

The fifth example describes an example of a lens system IL that can use visible light. A lens system IL5 according to the fifth example will be described with reference to FIGS. 62 to 70.

Figure 62:
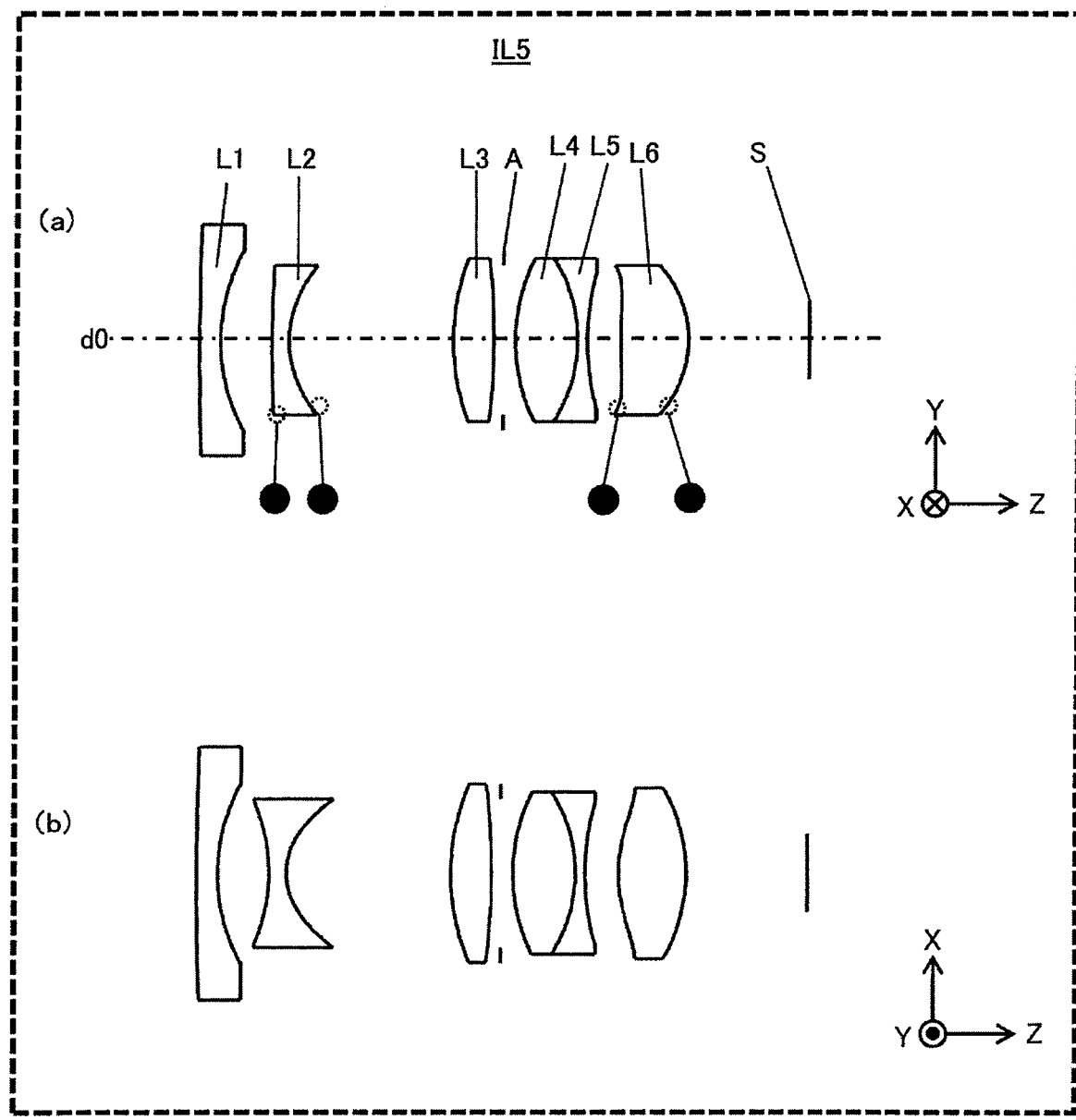
FIG. 62 is a lens layout diagram showing a configuration of a lens system according to a fifth example.
Figure 69:
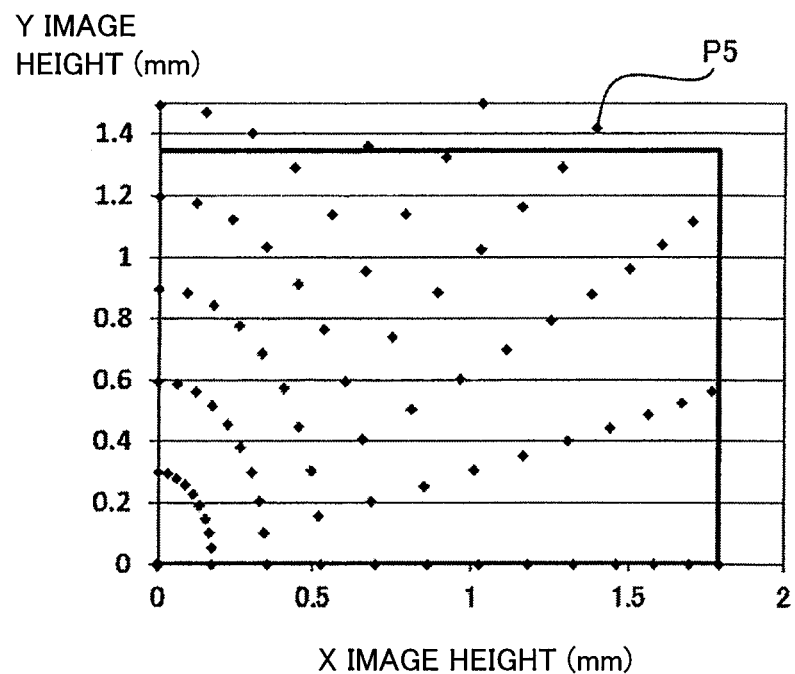
FIG. 69 is a scatter plot showing the relationship between angle of view and an image point in the lens system according to the fifth numerical example.

FIG. 62 shows the configuration of the lens system IL5 according to the fifth example. FIGS. 62(a) and (b) are diagrams showing lens arrangement of the lens system IL5, similarly to FIGS. 3(a) and (b).

The lens system IL5 according to the fifth example includes first to sixth lens elements L1 to L6, which are sequentially arranged as in the first example, and a diaphragm A located between the third and fourth lens elements L3 and L4. In the lens system IL5 according to the present example, the freeform lens located closer to the object than the diaphragm A is the second lens element L2, and freeform lenses located closer to the image plane than the diaphragm A is the sixth lens element L6. In the present example, each of the above freeform lenses has freeform surfaces on both sides.

In the present example, the freeform surface on the object side of the second lens element L2 is convex toward the object in the Y direction and convex toward the image plane in the X direction. The freeform surface of the second lens element L2 on the image plane side is convex toward the object so that the negative power is stronger in the X direction than in the Y direction, for example.

For example, the freeform surface of the sixth lens element L6 on the object side is convex toward the object in the vicinity of the center and changes in the direction of curvature toward a peripheral portion in the Y direction. The freeform surface is convex toward the object in the X direction, for example. The freeform surface of the sixth lens element L6 on the image plane side is convex toward the image plane so that the positive power is stronger in the Y direction than in the X direction, for example.

FIGS. 63 to 68 show a numerical example corresponding to the lens system IL5 according to the fifth example. FIG. 63 is a diagram showing surface data of the lens system IL5 according to the fifth numerical example. FIG. 64 is a diagram showing various kinds of data of the lens system IL5 according to the present example. FIGS. 63 and 64 show respective data as in FIGS. 5 and 6 according to the first numerical example.

FIGS. 65 and 66 are diagrams showing freeform surface data of third and fourth surfaces s3 and s4 in the lens system IL5 according to the present example. Each freeform surface data shows various coefficients of the following equation (E3) that defines the anamorphic spherical surface as a freeform surface for both the surfaces of the second lens element L2.

$$z = \frac{(CUX)x^2 + (CUY)y^2}{1 + \sqrt{1 - (CUX)^2 x^2 - (CUY)^2 y^2}} + \\ AR\{(1-AP)x^2 + (1+AP)y^2\}^2 + BR\{(1-BP)x^2 + (1+BP)y^2\}^3 + \\ CR\{(1-CP)x^2 + (1+CP)y^2\}^4 + DR\{(1-DP)x^2 + (1+DP)y^2\}^5 \quad (E3)$$

In the above equation (E3), CUX, CUY, AR, AP, BR, BP, CR, CP, DR, and DP are coefficients. According to the above equation (E3), a sag amount z at the position of coordinates (x, y) on the target surface is determined. Here, the above equation (E3) has regularity that is based on coordinate variables x and y only in the form of a weighted sum in which $x^2$ and $y^2$ are weighted by the above coefficients. That is, the anamorphic aspherical surface is a freeform surface that is rotationally asymmetric under constraint of regularity of the equation (E3) given above.

FIGS. 67 and 68 are diagrams showing freeform surface data of 11th and 12th surfaces s11 and s12 in the lens system IL5 according to the present example. As described above, each freeform surface data shows various coefficients of the equation (E3) for both surfaces of the sixth lens element L6.

Figure 70:
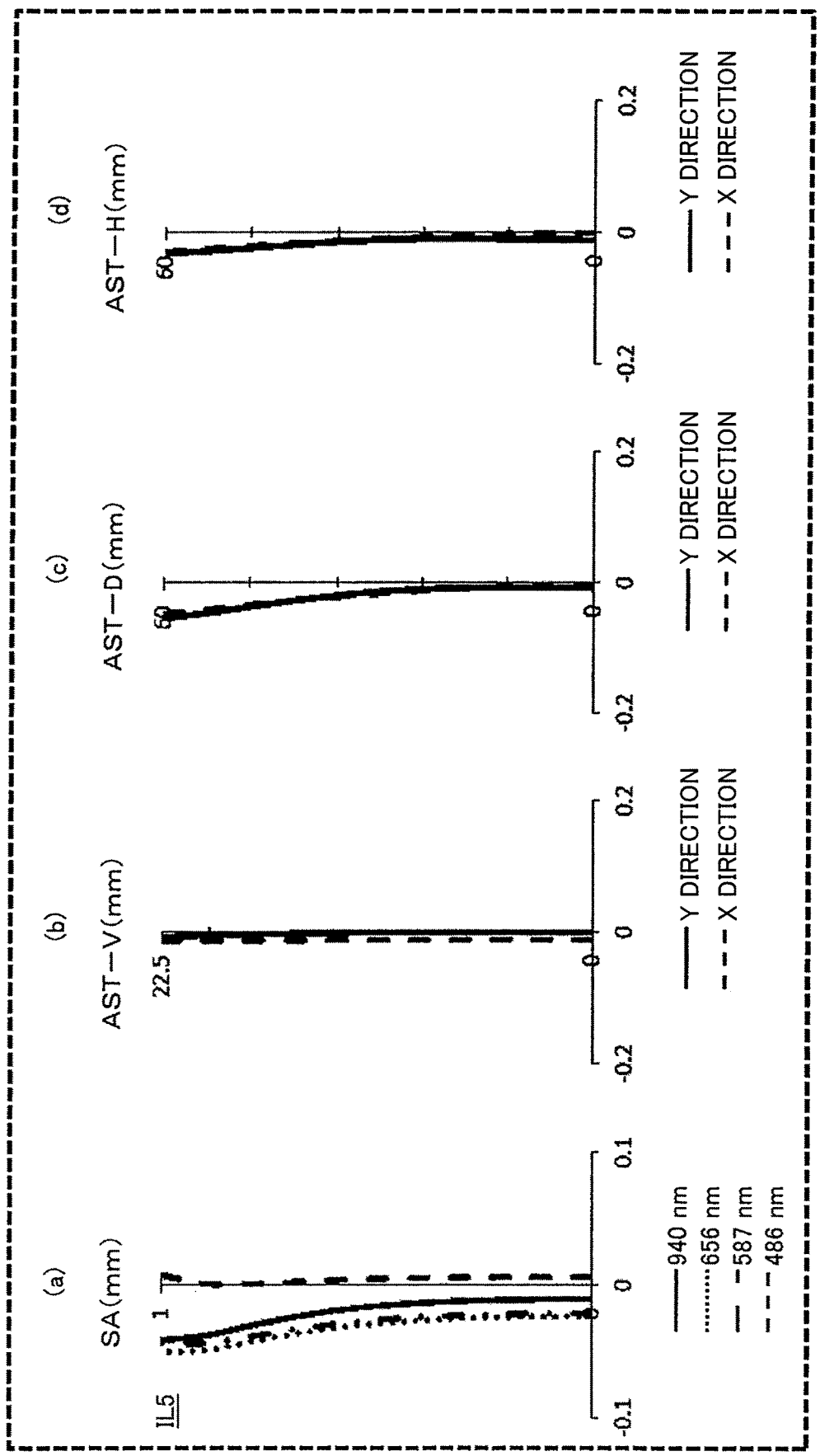
FIG. 70 is an aberration diagram showing various aberrations of the lens system according to the fifth numerical example.

Based on the fifth numerical example described above, FIG. 69 shows the relationship between angle of view and an image point P5 in the lens system IL5 according to the present example. FIG. 70 shows various aberrations of the lens system IL5 according to the present example. FIG. 15(a) shows the characteristic curves of spherical aberration with respect to visible light having wavelengths of 656 nm, 587 nm, and 486 nm, in addition to the same near-infrared light as in FIG. 15(a). FIGS. 70(b), (c), and (d) are aberration diagrams of the lens system IL5 according to the present example, similarly to FIGS. 15(a) to (d). The lens system IL5 according to the present example can also magnify an image in one direction as in each example described above.

2-7. Sixth Example

A lens system IL6 according to the sixth example will be described with reference to FIGS. 71 to 79.

Figure 71:
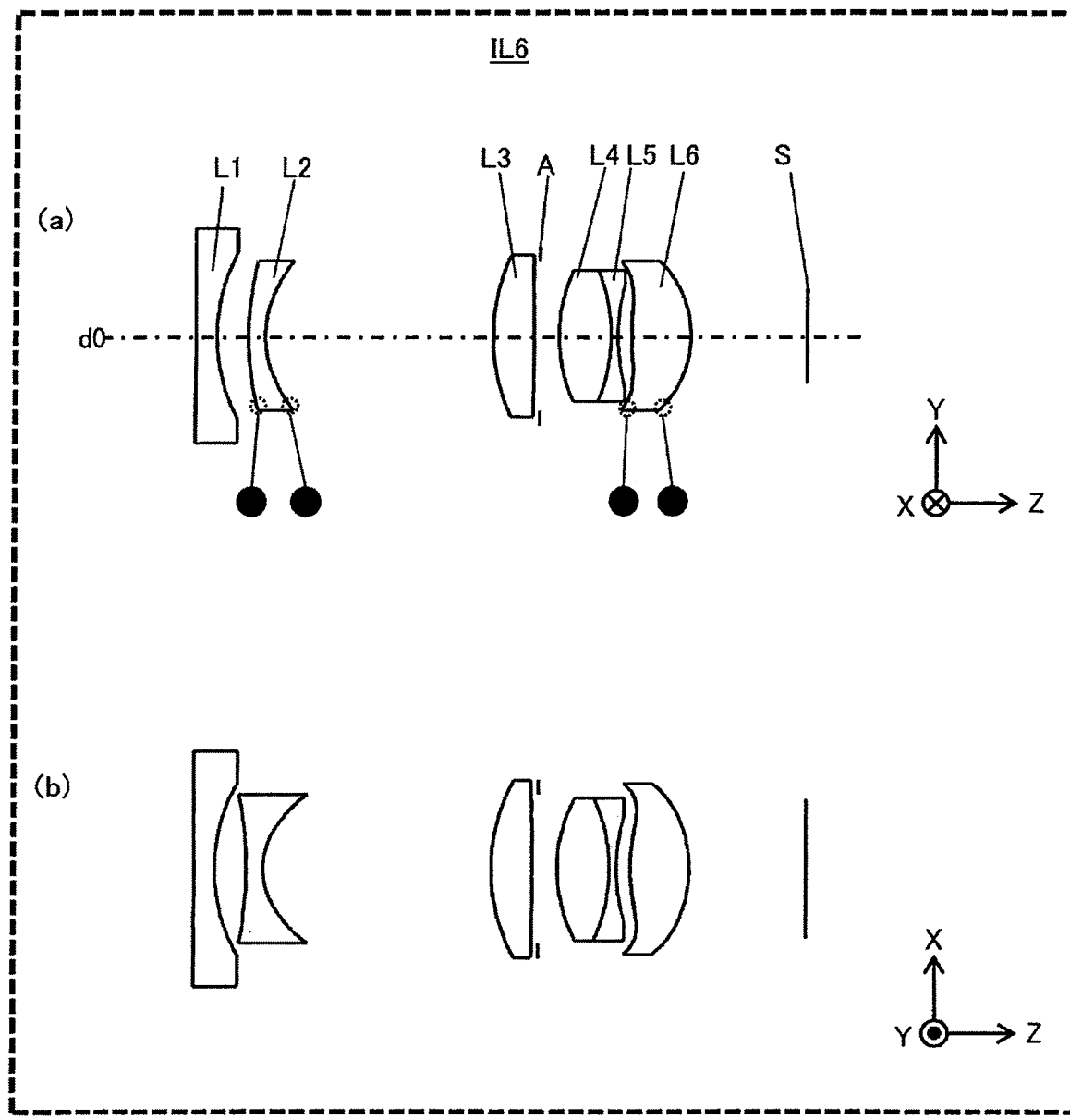
FIG. 71 is a lens layout diagram showing a configuration of a lens system according to a sixth example.
Figure 78:
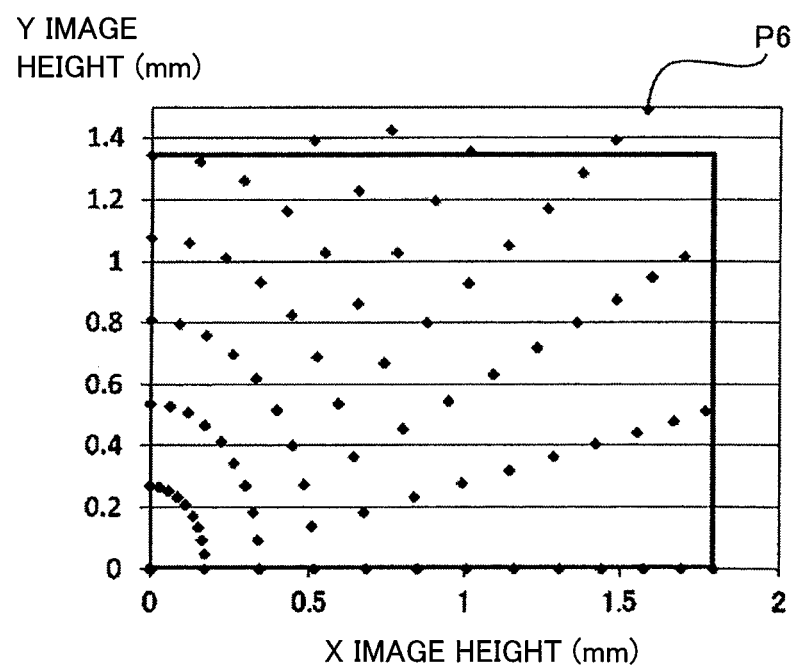
FIG. 78 is a scatter plot showing the relationship between angle of view and an image point in the lens system according to the sixth numerical example.

FIG. 71 shows the configuration of the lens system IL6 according to the sixth example. FIGS. 71(a) and (b) are diagrams showing lens arrangement of the lens system IL2, similarly to FIGS. 3(a) and (b).

The lens system IL6 according to the sixth example has the same configuration as that of the fifth example, but the shapes of various lens elements L1 to L6 are changed. Similar to the fifth example, the freeform lenses in the lens system IL6 according to the present example include one lens closer to the object than a diaphragm A and one lens closer to the image plane than the diaphragm A. FIGS. 72 to 77 show a numerical example corresponding to the lens system IL6 according to the sixth example.

FIG. 72 is a diagram showing surface data of the lens system IL6 according to the sixth numerical example. FIG. 73 is a diagram showing various kinds of data of the lens system IL6 according to the present example. FIGS. 72 and 73 show respective data as in FIGS. 5 and 6 according to the first numerical example.

FIGS. 74 to 77 are diagrams showing freeform surface data of third, fourth, 11th, and 12th surfaces s3, s4, s11, and s12 in the lens system IL6 according to the present example. Similarly to the sixth numerical example, each freeform surface data indicates various coefficients of the equation (E3) for both the surfaces of the second lens element L2 and both the surfaces of the sixth lens element L6.

Figure 79:
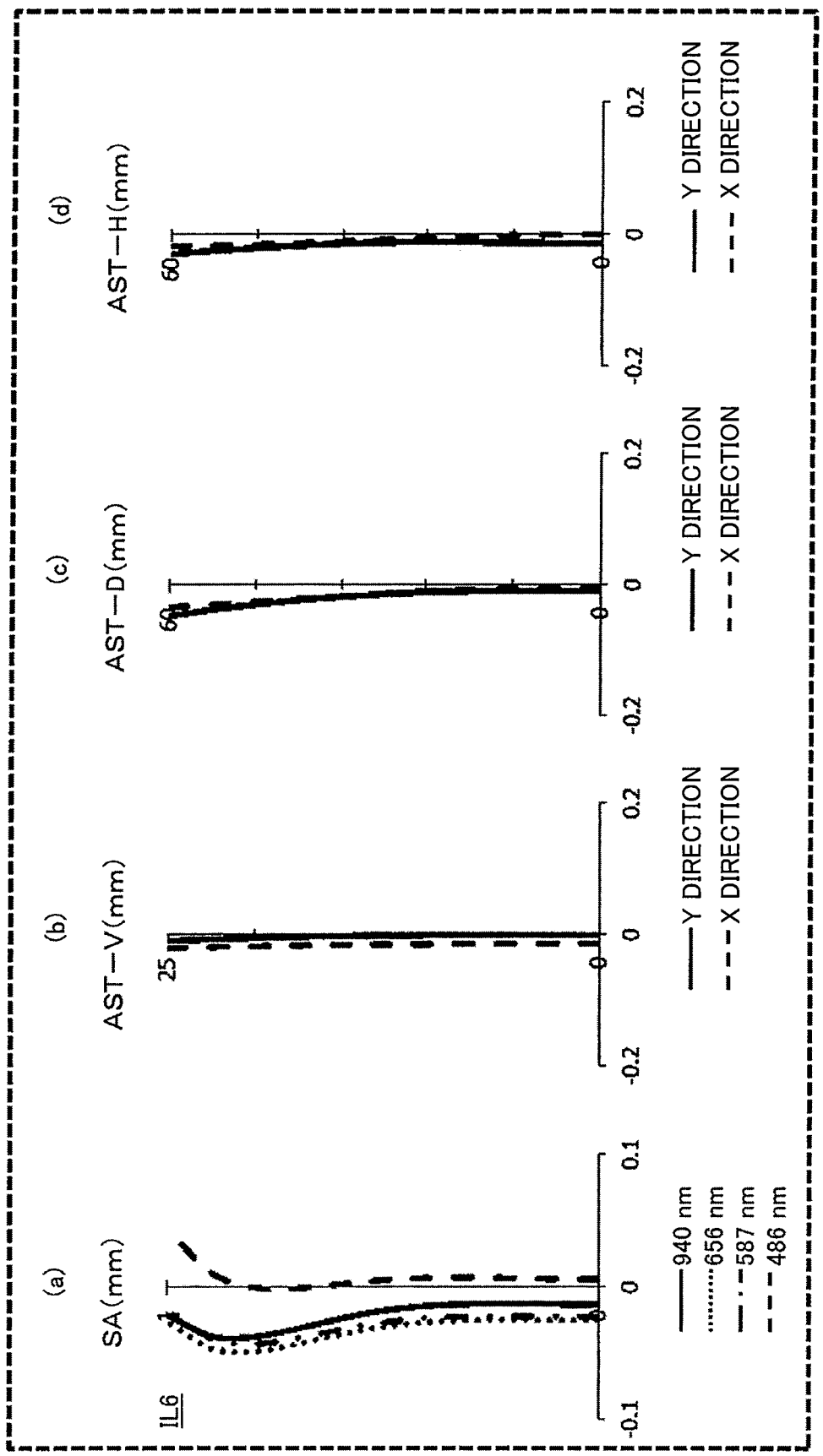
FIG. 79 is an aberration diagram showing various aberrations of the lens system according to the sixth numerical example.

Based on the sixth numerical example described above, FIG. 78 shows the relationship between angle of view and an image point P6 in the lens system IL6 according to the present example. FIG. 79 shows various aberrations of the lens system IL6 according to the present example. FIGS. 79(a), (b), (c), and (d) are aberration diagrams of the lens system IL6 according to the present example, similarly to FIGS. 70(a) to (d). The lens system IL6 of the present example can also magnify an image in one direction as in the fifth example.

Other Embodiments

The first embodiment has been described as an example of the technique disclosed in the present application. However, the technique in the present disclosure is not limited to the above embodiment, and is also applicable to other embodiments including appropriate modifications, substitutions, additions, or omissions. In addition, a new embodiment can be made by combining constituents described in the above embodiments. Accordingly, some other embodiments will be described below.

In the first embodiment described above, the rectangular imaging surface 22 is illustrated in FIG. 2, but the imaging surface of the imaging element 12 is not limited thereto. In the present embodiment, an imaging surface of an imaging element 12 may have various quadrilateral shapes other than the rectangular shape, or may be partially masked. Further, the imaging surface of the imaging element 12 may be curved. With respect to the imaging element 12 described above, the same effect as that of the first embodiment can be obtained by a lens system IL according to the present embodiment.

For example, a long side b and a short side a of the imaging element 12 of the present embodiment do not need to be orthogonal to each other, and may cross at various angles. The imaging element 12 may have two sides having the same length instead of the long side b and the short side a. In the present embodiment, first and second directions of the lens system IL may not be orthogonal to each other and may intersect at various angles. The lengths of the diameters of an image circle 21 in the first and second directions may be different or the same. The image circle 21 is not necessarily distorted from a circle.

In the above embodiments, the XY-polynomial surface and the anamorphic aspherical surface have been illustrated as an example of the freeform surface. In the present embodiment, the freeform surface is not limited to the above surface, and may be a toric surface, for example. The lens system according to the present embodiment may include a freeform surface that is not anamorphic. The non-anamorphic freeform surfaces include XY-polynomial surfaces but do not include anamorphic aspherical surfaces. The non-anamorphic freeform surface may have no symmetric plane, for example.

An imaging system 10 according to the present embodiment is applicable to various uses. For example, the imaging system 10 can be mounted in vehicles. For example, an imaging device 11 may constitute an in-vehicle camera for capturing an image of a scene behind a moving body such as a vehicle. Further, the imaging device 11 serving as an in-vehicle camera may be configured to capture not only a scene behind the moving body but also various scenes in front of the moving body or on the side of the moving body. Further, the imaging system 10 is not limited to be mounted in vehicles for use. For example, the imaging system 10 can be applied to a surveillance camera that monitors various situations or the like.

The embodiment has been described above as an illustration of the technique of the present disclosure. The accompanying drawings and the detailed description are provided for this purpose.

Therefore, components in the accompanying drawings and the detailed description may include not only components essential for solving problems, but also components that are not essential for solving the technical problems but are merely used to illustrate the technology disclosed herein. Therefore, such inessential components should not be readily construed as being essential based on the fact that such inessential components are shown in the accompanying drawings or mentioned in the detailed description.

Furthermore, since the embodiment described above is intended to illustrate the technique in the present disclosure, various changes, substitutions, additions, omissions, and the like can be made within the scope of the claims and the scope of equivalents thereof.

(Summary of Aspects)

Various aspects according to the present disclosure will be described below.

A first aspect according to the present disclosure provides a lens system including a plurality of lens elements arranged from an object side to an image plane side, and a diaphragm arranged between the plurality of lens elements. The plurality of lens elements include a plurality of freeform lenses each having a freeform surface that is asymmetrical with respect to a first direction and a second direction which cross with each other. At least one freeform lens is placed on the image plane side of the diaphragm. At least one freeform lens satisfying a conditional expression (1A) given below is placed on the object side of the diaphragm.

$$T1/T2 < 0.8 \quad (1A)$$

where

T1: a lens thickness in the first direction at a maximum height of an axial ray, and T2: a lens thickness in the second direction at the maximum height of the axial ray.

According to the above lens system, an image can be magnified in one direction by providing a sag difference between the first direction and the second direction of the freeform lens closer to the object than the diaphragm by the conditional expression (1A). For example, even if the lens system is a bright optical system, such unidirectional magnification of the image can be implemented.

The lens system according to the first aspect according to the present disclosure may satisfy a conditional expression (1B) given below, based on the sum for the freeform surfaces of one or more freeform lenses located on the object side of the diaphragm in place of or in addition to the conditional expression (1A) given above.

$$0.0075 < \left| \frac{\sum_{k=1}^{N} \{(SAG1_k - SAG2_k) \times \Delta nd_k\}}{Y2 \times \tan\Theta 1} \right| \quad (1B)$$

where

N: the total number of the freeform surfaces of the freeform lenses located on the object side of the diaphragm, k: a number indicating a freeform surface among the total N freeform surfaces, $SAG1_k$: a sag amount at a position where a height of a k-th freeform surface in the first direction is 40% of an image height in the first direction, $SAG2_k$: a sag amount at a position where the height of the k-th freeform surface in the second direction is 40% of the image height in the first direction, Y2: an image height in the second direction, $\Theta 1$: a full angle of view in the first direction, and $\Delta nd_k$: a difference resulting from subtracting a refractive index on the object side of the k-th freeform surface from a refractive index on the image plane side of the k-th freeform surface.

According to the above lens system, an image can be magnified in one direction by providing a sag difference between the first direction and the second direction of the whole freeform lenses closer to the object than the diaphragm by the conditional expression (1B). For example, even if the lens system is a telephoto optical system, such unidirectional magnification of the image can be implemented.

In a second aspect, the lens system according to the first aspect satisfies a conditional expression (2) given below.

$$2 < AXRh/Y1 < 5 \quad (2)$$

where

AXRh: the maximum height of the axial ray, and
Y1: the image height in the first direction.

This makes it possible to correct aberrations while brightening the lens system.

In a third aspect, in the lens system according to the first or second aspect, the freeform lens located closest to the object side among the plurality of freeform lenses has a freeform surface which is located on the object side and satisfies conditional expression (3) given below.

$$0.005 < (FSAG1 - FSAG2)/AXRh < 0.015 \quad (3)$$

where

FSAG1: a sag amount in the first direction at the height AXRh,
FSAG2: a sag amount in the second direction at the height AXRh, and
AXRh: the maximum height of the axial ray.

This makes it possible to magnify an image in one direction with ensuring the brightness of the lens system.

In a fourth aspect, the lens system according to any one of the first to third aspects satisfies conditional expression (4) given below.

$$1 < (Y1/Y2) \times |\tan\theta 2/\tan\theta 1| < 4 \quad (4)$$

where

Y1: the image height in the first direction,
Y2: the image height in the second direction,
θ1: an angle of view in the first direction, and
θ2: an angle of view in the second direction.

This makes it possible to magnify the image in one direction with avoiding a decrease in resolution.

In a fifth aspect, the lens system according to any one of the first to fourth aspects satisfies conditional expression (5) given below.

$$0.050 < AXRh/OAL < 0.350 \quad (5)$$

where

AXRh: the maximum height of the axial ray, and
OAL: an overall optical length of the lens system.

This makes it possible to correct aberrations with ensuring the brightness of the lens system IL.

In a sixth aspect, the lens system according to any one of the first to fifth aspects satisfies conditional expression (6) given below.

$$0.30 < FFN/FBN < 3.00 \quad (6)$$

where

FFN: the number of freeform lenses on the object side of the diaphragm, and
FBN: the number of freeform lenses on the image plane side of the diaphragm.

This makes it possible to correct various aberrations with avoiding an increase in the size of the lens system.

In a seventh aspect, the lens system according to any one of the first to sixth aspects satisfies conditional expression (7) given below based on the summation for the freeform surfaces of the freeform lenses located on the object side of the diaphragm.

$$0.001 < \left| \frac{\sum_{k=1}^{N} \{(sag1_k - sag2_k) \times \Delta nd_k\}}{AXRh} \right| < 5.000 \quad (7)$$

where

N: the total number of the freeform surfaces of the freeform lenses located on the object side of the diaphragm,
k: a number indicating a freeform surface among the total N freeform surfaces,
$sag1_k$: the sag amount at a position where the height of the k-th freeform surface in the first direction is 40% of AXRh,
$sag2_k$: the sag amount at a position where the height of the k-th freeform surface in the second direction is 40% of AXRh,
AXRh: the maximum height of the axial ray, and
$\Delta nd_k$: the difference resulting from subtracting the refractive index on the object side of the k-th freeform surface from the refractive index on the image plane side of the k-th freeform surface.

This makes it possible to magnify an image in one direction with ensuring the brightness of the lens system and enabling the correction of aberrations.

In an eighth aspect, in the lens system according to any one of the first to seventh aspects, the freeform lens closest to the object side satisfies the above conditional expression (1A). That is, on the freeform lens closest to the object side, the lens thickness in the first direction at the maximum height of the axial ray is smaller than 80% of the lens thickness in the second direction at the maximum height of the axial ray. This makes it possible to facilitate unidirectional magnification of the image by controlling the highest light beam on the object side.

In a ninth aspect, in the lens system according to any one of the first to eighth aspects, a freeform lens arranged on the image plane side of the diaphragm has a freeform surface in which a sag amount at a height of 50% of the maximum height of the axial ray has an extreme value in a phase direction different from the first and second directions among phase directions around the optical axis. This makes it possible to increase the degree of freedom in shape, facilitate obtaining the magnifying effect between the first direction and the second direction, and improve the effect of aberration correction.

In a 10th aspect, in the lens system according to any one of the first to ninth aspects, the number of the plurality of lens elements is five or more. This makes it possible to appropriately correct various aberrations and improve the imaging performance.

In an 11th aspect, in the lens system according to any one of the first to 10th aspects, an F value of the diaphragm is smaller than 2.8. This makes it possible to obtain a bright optical system to improve the detection performance by imaging, for example.

In a 12th aspect, in the lens system according to any one of the first to 11th aspects, the plurality of freeform lenses include a freeform lense having positive power in the first direction and negative power in the second direction. This makes it easy to magnify an image in the first direction with respect to the second direction and improve the resolution.

In a 13th aspect, in the lens system according to any one of the first to 12th aspects, the first direction and the second direction are orthogonal to each other. This makes it easy to utilize a rectangular imaging surface, for example.

In a 14th aspect, the lens system according to any one of the first to 13th aspects is configured to form an image of light having a wavelength of 900 nm or more. This makes it possible to ensure the detection performance with avoiding the influence on the human eye, especially at night.

A 15th aspect provides an imaging device including the lens system according to any one of the first to 14th aspects and an imaging element that captures an image formed by the lens system. According to such an imaging device, an image can be magnified in one direction by the lens system.

In a 16th aspect, in the imaging device according to the 15th aspect, the imaging element has a short side corresponding to the first direction and a long side corresponding to the second direction. This makes it easy to use the imaging device for an application in which the resolution is improved by eliminating an unnecessary image-capturing area in the short side direction.

A 17th aspect provides an imaging system including the imaging device according to the 15th or 16th aspect and an image processor that executes image processing on an image captured by the imaging element of the imaging device. According to such an imaging system, an image can be magnified in one direction by the lens system of the imaging device.

The imaging system according to the present disclosure is applicable to various uses for capturing images and detection, such as an in-vehicle camera, a TOF sensor, a surveillance camera, a web camera, a digital camera, and the like. Further, the lens system according to the present disclosure may be provided in an interchangeable lens device.

The invention claimed is:

1. A lens system with a telephoto angle of view, comprising:
a plurality of lens elements including eight or less lens elements arranged from an object side to an image plane side; and
a diaphragm arranged between the plurality of lens elements,
wherein the plurality of lens elements include a plurality of freeform lenses each having a freeform surface that is asymmetrical with respect to a first direction and a second direction which cross with each other,
at least three lens elements in the plurality of lens elements placed on the image plane side of the diaphragm, wherein the at least three lens elements includes at least one freeform lens in the plurality of freeform lenses and
the lens system satisfies a conditional expression (1) given below, based on a sum for freeform surfaces of one or more freeform lenses located on the object side of the diaphragm;

$$0.0075 < \left| \frac{\sum_{k=1}^{N} \{(SAG1_k - SAG2_k) \times \Delta nd_k\}}{Y2 \times \tan\Theta 1} \right| \quad (1)$$

where
N: a total number of the freeform surfaces of the freeform lenses located on the object side of the diaphragm,
k: a number indicating a freeform surface among the total N freeform surfaces,
$SAG1_k$: a sag amount at a position where a height of a k-th freeform surface in the first direction is 40% of an image height in the first direction,
$SAG2_k$: a sag amount at a position where a height of the k-th freeform surface in the second direction is 40% of the image height in the first direction, Y2: an image height in the second direction,
Θ1: a full angle of view in the first direction, and
$\Delta nd_k$: a difference resulting from subtracting a refractive index on the object side of the k-th freeform surface from a refractive index on the image plane side of the k-th freeform surface with respect to a d-line.

2. The lens system according to claim 1, satisfying a conditional expression (2) given below;

$$2 < AXRh/Y1 < 5 \quad (2)$$

where
AXRh: a maximum height of the axial ray, and
Y1: an image height in the first direction.

3. The lens system according to claim 1, wherein a freeform lens located closest to the object side among the plurality of freeform lenses has a freeform surface on the object side, and satisfies conditional expression (3) given below;

$$0.005 < (FSAG1 - FSAG2)/AXRh < 0.015 \quad (3)$$

where
FSAG1: a sag amount in the first direction at the height AXRh,
FSAG2: a sag amount in the second direction at the height AXRh, and
AXRh: a maximum height of the axial ray.

4. The lens system according to claim 1, satisfying conditional expression (4) given below;

$$1 < (Y1/Y2) \times |\tan\theta 2/\tan\theta 1| < 4 \quad (4)$$

where
Y1: an image height in the first direction,
Y2: an image height in the second direction,
θ1: an angle of view in the first direction, and
θ2: an angle of view in the second direction.

5. The lens system according to claim 1, satisfying conditional expression (5) given below;

$$0.050 < AXRh/OAL < 0.350 \quad (5)$$

where
AXRh: a maximum height of the axial ray, and
OAL: an overall optical length of the lens system.

6. The lens system according to claim 1, satisfying conditional expression (6) given below;

$$0.30 < FFN/FBN < 3.00 \quad (6)$$

where
FFN: a number of freeform lenses on the object side of the diaphragm, and
FBN: a number of freeform lenses on the image plane side of the diaphragm.

7. The lens system according to claim 1, satisfying conditional expression (7) given below, based on sum for freeform surfaces of the freeform lenses located on the object side of the diaphragm;

$$0.001 < \left| \frac{\sum_{k=1}^{N} \{(sag1_k - sag2_k) \times \Delta nd_k\}}{AXRh} \right| < 5.000 \quad (7)$$

where
N: a total number of the freeform surfaces of freeform lenses located on the object side of the diaphragm,
k: a number indicating a freeform surface among the total N freeform surfaces, $sag1_k$: a sag amount at a position where the height of the k-th freeform surface in the first direction is 40% of AXRh, $sag2_k$: a sag amount at a position where the height of the k-th freeform surface in the second direction is 40% of AXRh, AXRh: a maximum height of the axial ray, and $\Delta nd_k$: a difference resulting from subtracting the refractive index on the object side of the k-th freeform surface from the refractive index on the image plane side of the k-th freeform surface with respect to the d-line.

8. The lens system according to claim 1, wherein on a freeform lens closest to the object side, a lens thickness in the first direction at a maximum height of the axial ray is smaller than 80% of a lens thickness in the second direction at a maximum height of the axial ray.

9. The lens system according to claim 1, wherein a freeform lens arranged on the image plane side of the diaphragm has a freeform surface in which a sag amount at a height of 50% of a maximum height of the axial ray has an extreme value in a phase direction different from the first and second directions among phase directions around the optical axis.

10. The lens system according to claim 1, wherein a number of the plurality of lens elements is five or more.

11. The lens system according to claim 1, wherein an F value of the diaphragm is smaller than 2.8.

12. The lens system according to claim 1, wherein the plurality of freeform lenses include a freeform lens having positive power in the first direction and negative power in the second direction.

13. The lens system according to claim 1, configured to form an image by light having a wavelength of 900 nm or more.

14. The lens system according to claim 1, wherein each freeform surface in the plurality of freeform lenses has line symmetry with respect to a first axis and a second axis, the first axis corresponding to the first direction and the second axis corresponding to the second direction.

15. The lens system according to claim 1, wherein a half angle of view in the second direction is equal to or less than 60 degree.

16. The lens system according to claim 1, wherein the half angle of view $\Theta 1$ in the first direction is equal to or less than 50 degree.

17. The lens system according to claim 1, wherein the image height Y2 in the second direction indicates a height of the image plane formed by the imaging system in the second direction.

18. An imaging device comprising:
the lens system according to claim 1; and
an imaging element that captures an image formed by the lens system.

19. The imaging device according to claim 18, wherein the imaging element has a short side corresponding to the first direction and a long side corresponding to the second direction.

20. An imaging system comprising:
the imaging device according to claim 18; and
an image processor that executes image processing on the image captured by the imaging element of the imaging device.

* * * * *